(12) United States Patent
Li et al.

(10) Patent No.: US 11,582,649 B2
(45) Date of Patent: Feb. 14, 2023

(54) COMMUNICATIONS METHOD AND APPARATUS

(71) Applicant: Huawei Technologies Co., Ltd., Shenzhen (CN)

(72) Inventors: Lin Li, Wuhan (CN); Min Wu, Wuhan (CN); Delai Zheng, Shenzhen (CN); Shengyue Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 17/258,997

(22) PCT Filed: Jul. 24, 2019

(86) PCT No.: PCT/CN2019/097565
§ 371 (c)(1),
(2) Date: Jan. 8, 2021

(87) PCT Pub. No.: WO2020/024864
PCT Pub. Date: Feb. 6, 2020

(65) Prior Publication Data
US 2021/0282059 A1  Sep. 9, 2021

(30) Foreign Application Priority Data

Jul. 28, 2018  (CN) .......................... 201810849246.4
Nov. 2, 2018  (CN) .......................... 201811299398.8
Dec. 28, 2018  (CN) .......................... 201811626804.7

(51) Int. Cl.
*H04W 36/00*  (2009.01)
*H04M 1/663*  (2006.01)
*H04M 1/57*  (2006.01)

(52) U.S. Cl.
CPC ......... *H04W 36/0022* (2013.01); *H04M 1/57* (2013.01); *H04M 1/663* (2013.01)

(58) Field of Classification Search
CPC . H04W 36/0022; H04W 76/18; H04W 88/06; H04W 24/04; H04M 1/57;
(Continued)

(56) References Cited

U.S. PATENT DOCUMENTS 8,041,014 B1  10/2011  Daily et al.
2010/0172301 A1  7/2010  Watfa et al.
(Continued)

FOREIGN PATENT DOCUMENTS

CN  105376400 A  3/2016
CN  105450857 A  3/2016
(Continued)

OTHER PUBLICATIONS

Eriscsson, "Preparation for the 5G access," 3GPP SG-CT WG1 Meeting #107 C1-174683, published on Dec. 11, 2017, 334 pages.
(Continued)

*Primary Examiner* — Farid Seyedvosoghi
(74) *Attorney, Agent, or Firm* — Conley Rose, P.C.

(57) ABSTRACT

A communications method includes receiving, by user equipment (UE), a first message from a network side, where the first message is used to indicate to the UE to perform circuit switched fallback (CSFB) as a called party, where the first message includes first information, and where the first information is used to indicate an incoming call number. If it is determined that a preset condition is met, the communications method further includes sending a second message to the network side, where the second message is used to indicate that the CSFB is rejected, and where the preset condition includes at least one of the incoming call number is restricted or the UE is in a mode of automatically rejecting a CSFB incoming call.

20 Claims, 50 Drawing Sheets

(58) Field of Classification Search
CPC ............... H04M 1/663; H04M 1/2535; H04M 1/72469; H04M 1/72454; H04M 1/72484; H04M 2207/185; H04M 7/0057
See application file for complete search history.

(56) References Cited

U.S. PATENT DOCUMENTS

| | | |
|---|---|---|
| 2011/0286427 A1 | 11/2011 | Shirota et al. |
| 2012/0218889 A1 | 8/2012 | Watfa et al. |
| 2016/0262058 A1 | 9/2016 | Jeong et al. |
| 2019/0342857 A1 | 11/2019 | Basu Mallick et al. |

FOREIGN PATENT DOCUMENTS

| | | | | |
|---|---|---|---|---|
| CN | 105657729 A | 6/2016 | | |
| CN | 105704742 A | 6/2016 | | |
| CN | 106506867 A | 3/2017 | | |
| CN | 106973167 A | 7/2017 | | |
| CN | 107124516 A | 9/2017 | | |
| EP | 3035752 A1 | * 6/2016 | ............ | H04W 24/02 |
| EP | 3035752 A1 | 6/2016 | | |
| JP | H09247756 A | 9/1997 | | |
| JP | 2010154079 A | * 7/2010 | | |
| JP | 2010154079 A | 7/2010 | | |
| JP | 2018509787 A | 4/2018 | | |
| KR | 101309983 B1 | 9/2013 | | |
| WO | 2009097811 A1 | 8/2009 | | |
| WO | 2015109506 A1 | 7/2015 | | |
| WO | 2016173538 A1 | 11/2016 | | |

OTHER PUBLICATIONS

3GPP TS 24.301 V15.3.0, "3rd Generation Partnership Project; Technical Specification Group Core Network and Terminals; Non-Access-Stratum (NAS) protocol for Evolved Packet System (EPS); Stage 3 (Release 15)," Jun. 2018, 527 pages.

* cited by examiner

COMMUNICATIONS METHOD AND APPARATUS

CROSS-REFERENCE TO RELATED APPLICATIONS

This application is a U.S. National Stage of International Patent Application No. PCT/CN2019/097565 filed on Jul. 24, 2019, which claims priority to Chinese Patent Application No. 201810849246.4 filed on Jul. 28, 2018, Chinese Patent Application No. 201811299398.8 filed on Nov. 2, 2018, and Chinese Patent Application No. 201811626804.7 filed on Dec. 28, 2018. All of the aforementioned applications are hereby incorporated by reference in their entireties.

TECHNICAL FIELD

This application relates to the mobile communications technologies, and in particular, to a communications method and apparatus.

BACKGROUND

In a current long term evolution (Long Term Evolution. LTE) system, voice over LTE (Voice over LTE, VoLTE) of some operators is not promoted for fully commercial use, or a user disables the VoLTE, or a current network does not support the VoLTE. In an LTE voice solution, a circuit switched fallback (Circuit Switch Fall Back, CSFB) manner is usually used, to fall back an incoming call to a universal mobile telecommunications system (Universal Mobile Telecommunications System, UMTS) for processing. When user equipment (User Equipment, UE) receives a call request on an LTE network, if the user equipment has a packet switched data service, the packet switched data service is to be suspended. Even if the call request is rejected, the packet switched data service is interrupted for a short period of time, and consequently, surfing experience of a user deteriorates.

SUMMARY

Embodiments of this application provide a communications method, apparatus, and system, to more quickly obtain an incoming call number on a network on which a call request is received, and avoid an interruption of a packet switched data service caused when UE refuses to set up a call.

To achieve the foregoing objective, the following technical solutions are used in the embodiments of this application.

According to a first aspect, this application provides a communications method and apparatus.

In a possible design, the method may include: receiving, by user equipment UE, a first message from a network side; and if it is determined that a preset condition is met, sending a second message to the network side. The first message is used to indicate the UE to perform circuit switched fallback CSFB as a called party, the first message includes first information, and the first information is used to indicate an incoming call number. The second message is used to indicate that the CSFB is rejected. The preset condition includes at least one of the following: the incoming call number is restricted, and the UE is in a mode of automatically rejecting a CSFB incoming call. In this implementation, if the UE determines that the preset condition is met, it indicates that the incoming call is an incoming call that needs to be rejected, and the UE may not perform the CSFB, but directly rejects the incoming call on an LTE network. In this way, duration of a process of identifying a to-be-rejected incoming call can be shortened, and an interruption of a packet switched data service caused when the UE refuses to set up a call can be avoided.

In a possible design, the first message is received from the network side through a non-access stratum of the UE, the first message is parsed through the non-access stratum of the UE, to obtain the first information, and the first information is reported to an application layer of the UE.

In a possible design, the application layer of the UE determines that the incoming call number is restricted.

In a possible design, that the incoming call number is restricted includes: the incoming call number belongs to a preset incoming call blacklist, or the calling number does not belong to the preset incoming call whitelist.

In a possible design, when the preset condition is that the UE is in the mode of automatically rejecting a CSFB incoming call, if it is determined that the UE exits the mode of automatically rejecting a CSFB incoming call, the incoming call number is displayed. In this way, after the UE exits the mode of automatically rejecting a CSFB incoming call, a user can view an incoming call missed in the mode of automatically rejecting a CSFB incoming call.

In a possible design, an instruction entered by the user is received, where the instruction entered by the user is used to instruct to set the UE to be in the mode of automatically rejecting a CSFB incoming call, and the UE is set, according to the instruction entered by the user, to be in the mode of automatically rejecting a CSFB incoming call. Alternatively, when it is determined that the UE has a real-time packet switched data service, the UE is set to be in the mode of automatically rejecting a CSFB incoming call. In this implementation, the UE may set, based on the user's instruction or whether the UE has the real-time packet switched data service, the UE to be in the mode of automatically rejecting a CSFB incoming call.

In a possible design, the real-time packet switched data service includes a real-time game service or a network live broadcast service.

In a possible design, the first message includes a circuit switched service notification.

In a possible design, the first information includes a calling line identification field, and the calling line identification field includes a number type, a number display type, and the incoming call number.

Correspondingly, this application further provides a communications apparatus. The apparatus can implement the communications method according to the first aspect. For example, the apparatus may be user equipment, or may be another apparatus that can implement the foregoing communications method. The apparatus may implement the foregoing method by software or hardware, or by executing corresponding software by hardware.

In a possible design, the apparatus may include a processor and a memory. The processor is configured to support the apparatus in performing a corresponding function in the method according to the first aspect. The memory is configured to be coupled to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a receiving module, a determining module, and a sending module.

The receiving module is configured to receive a first message from a network side, where the first message is used to indicate UE to perform circuit switched fallback CSFB as a called party, the first message includes first information, and the first information is used to indicate an incoming call number. The determining module is configured to determine whether a preset condition is met, where the preset condition includes at least one of the following: the incoming call number is restricted, and the UE is in a mode of automatically rejecting a CSFB incoming call. The sending module is configured to: if the determining module determines that the preset condition is met, send a second message to the network side, where the second message is used to indicate that the CSFB is rejected.

In a possible design, the first message is received from the network side through a non-access stratum of the UE, and the apparatus further includes a parsing module. The parsing module is configured to parse the first message through the non-access stratum of the UE, to obtain the first information. The sending module is further configured to report the first information obtained by the non-access stratum of the UE to an application layer of the UE.

In a possible design, the apparatus further includes a display module. When the preset condition is that the UE is in the mode of automatically rejecting a CSFB incoming call, the determining module is further configured to determine whether the UE exits the mode of automatically rejecting a CSFB incoming call, and the display module is configured to display the incoming call number if the determining module determines that the UE exits the mode of automatically rejecting a CSFB incoming call.

In a possible design, the apparatus further includes a setting module. The receiving module is further configured to receive an instruction entered by a user, where the instruction entered by the user is used to instruct to set the UE to be in the mode of automatically rejecting a CSFB incoming call. The determining module is further configured to determine whether the UE has a real-time packet switched data service. The setting module is configured to set, according to the instruction entered by the user, the UE to be in the mode of automatically rejecting a CSFB incoming call, or is configured to: if the determining module determines that the UE has the real-time packet switched data service, set the UE to be in the mode of automatically rejecting a CSFB incoming call.

This application further provides a computer readable storage medium. The computer readable storage medium stores an instruction, and when the instruction is run on a computer, the computer is enabled to perform the method according to any one of the foregoing aspects.

This application further provides a computer program product including an instruction. When the computer program product is run on a computer, the computer is enabled to perform the method according to any one of the foregoing aspects.

This application further provides a chip system. The chip system includes a processor, and may further include a memory, which are configured to implement the method according to any one of the foregoing aspects.

This application provides a communications system, including the apparatus configured to implement the method according to the first aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

BRIEF DESCRIPTION OF DRAWINGS

FIG. 5-1 is a schematic diagram 2 of a communications method according to an embodiment of this application;

FIG. 5-2(*a*) and FIG. 5-2(*b*) are a schematic diagram 3 of a communications method according to an embodiment of this application;

FIG. 6-1 is a schematic diagram 1 of an instance of a display interface of user equipment according to an embodiment of this application;

FIG. 6-1-1 is a schematic diagram 2 of an instance of a display interface of user equipment according to an embodiment of this application;

FIG. 6-2 is a schematic diagram 3 of an instance of a display interface of user equipment according to an embodiment of this application;

FIG. 6-3 is a schematic diagram 4 of an instance of a display interface of user equipment according to an embodiment of this application;

FIG. 6-4 is a schematic diagram 5 of an instance of a display interface of user equipment according to an embodiment of this application;

FIG. 6-5 is a schematic diagram 6 of an instance of a display interface of user equipment according to an embodiment of this application;

FIG. 6-6 is a schematic diagram 7 of an instance of a display interface of user equipment according to an embodiment of this application;

FIG. 6-7 is a schematic diagram 8 of an instance of a display interface of user equipment according to an embodiment of this application;

FIG. 7 is a schematic diagram 11 of an instance of a display interface of user equipment according to an embodiment of this application;

FIG. 9-1 is a schematic diagram 14 of an instance of a display interface of user equipment according to an embodiment of this application;

FIG. 9-2 is a schematic diagram 15 of an instance of a display interface of user equipment according to an embodiment of this application;

FIG. 9-3 is a schematic diagram 16 of an instance of a display interface of user equipment according to an embodiment of this application;

FIG. 9-4 is a schematic diagram 17 of an instance of a display interface of user equipment according to an embodiment of this application;

FIG. 9-5 is a schematic diagram 18 of an instance of a display interface of user equipment according to an embodiment of this application;

DESCRIPTION OF EMBODIMENTS

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner.

"A plurality of" in this application means two or more than two. In this specification, the terms "first" and "second" are intended to distinguish between different objects but do not indicate a particular order of the objects. For example, a first message and a second message are intended to distinguish between different messages but do not indicate a particular order of the messages. The term "and/or" in this specification describes only an association relationship for describing associated objects and represents that three relationships may exist; for example, A and/or B may represent the following three cases: Only A exists, both A and B exist, and only B exists.

The following describes a communications method, apparatus, and system according to the embodiments of this application in detail with reference to the accompanying drawings.

The technical solutions provided in this application may be applied to various communications systems including a CSFB scenario, for example, an LTE system, a 5G new radio (New Radio, NR) system, a future evolved system, or a convergence system of a plurality of types of communication. A plurality of application scenarios may be included, for example, scenarios such as machine-to-machine (Machine To Machine, M2M), D2M, macro-micro communication, enhance mobile broadband (enhance Mobile Broad-Band, eMBB), ultra-high reliability and low-latency communication (Ultra Reliable & Low Latency Communication, uRLLC), and massive machine type communication (massive Machine Type Communication, mMTC). These scenarios may include but are not limited to: a scenario of communication between UEs, a scenario of communication between network devices, a scenario of communication between a network device and UE, and the like.

Figure 1:
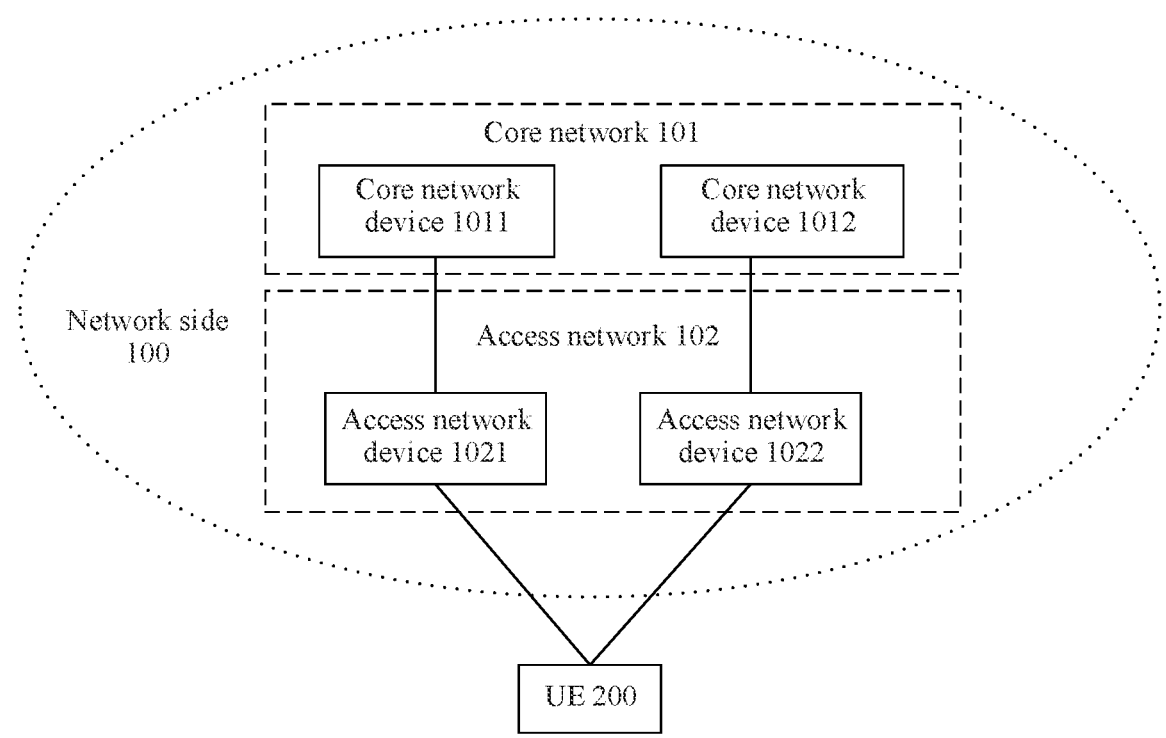
FIG. 1 is a schematic diagram of a system architecture applicable to a technical solution according to an embodiment of this application.

The technical solutions provided in the embodiments of this application may be applied to a system architecture shown in FIG. 1. The communications system may include a network side 100 and UE 200.

The network side 100 includes a core network 101 and an access network 102. The UE 200 accesses the core network 101 through the access network 102. Network elements included in a communications network are connected to and communicate with each other through a predefined interface. This is not limited in the embodiments of this application, and details are not described in the embodiments of this application.

The core network 101 includes a core network device 1011 and a core network device 1012. The core network device mainly provides functions such as user connection, user management, and service bearer. As an interface provided by a bearer network to an external network, the core network device provides functions such as mobility management, call management, route management, and security management of users. The core network device 1011 and the core network device 1012 may be core network devices of different standards. For example, the core network device 1011 is a 3G core network device, and the core network device 1012 is a core network device in an LTE system or a core network device in an NR system.

The access network 102 includes an access network device 1021 and an access network device 1022. The access network device mainly provides an access service for the UE 200, for example, implement functions such as a radio physical control function, resource scheduling and radio resource management, radio access control, and mobility management. The access network device may be a device of a radio access network (Radio Access Network, RAN), for example, a base station (NodeB, NB), an evolved NodeB (evolution NodeB, eNB), or a 5G-AN/5G-RAN node. The 5G-AN/5G-RAN node may be an access node, a next generation NodeB (generation NodeB, gNB), a transmission receive point (Transmission Receive Point, TRP), a transmission point (Transmission Point, TP), or another access node. Specifically, the access network device corresponds to a service coverage area, and UE entering the area may communicate with the access network device through a wireless signal, to accept a wireless access service provided by the access network device. A standard of the access network device 1021 is the same as that of the core network device 1011. For example, the core network device 1011 is a 3G core network device, and the access network device 1021 is a 3G NB. A standard of the access network device 1022 is the same as a standard of the core network device 1012. For example, the core network device 1012 is an LTE core network device, and the access network device 1022 is an LTE eNB, or the core network device 1012 is a core network device in an NR system, and the access network device 1022 is a 5G-AN/5G-RAN node.

The UE 200 may be an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicle-mounted device, a wearable device, a terminal in a future 5G network, a terminal in a future evolved PLMN network, or the like.

It should be noted that the system architecture shown in FIG. 1 is merely an example, and is not intended to limit the technical solutions of this application. A person skilled in the art should understand that, in a specific implementation process, the system architecture may further include another device. In addition, a quantity of core network devices, a quantity of access network devices, and a quantity of UEs may be configured based on a specific requirement, and a core network device and an access network device of a corresponding standard may be configured based on a requirement. In the embodiments of this application, an example in which the core network device 1011 is a 3G core network device, the access network device 1021 is a 3G NB, the core network device 1012 is an LTE core network device, and the access network device 1022 is an LTE eNB is used for description.

The communications method and apparatus provided in the embodiments of this application can be applied to UE, and the UE includes a hardware layer, an operating system layer running above the hardware layer, and an application layer running above the operating system layer. The hardware layer includes hardware such as a central processing unit (Central Processing Unit, CPU), a memory management unit (Memory Management Unit, MMU), and a memory (also referred to as a main memory). The operating system may be any one or more computer operating systems, for example, a Linux operating system, a Unix operating system, an Android operating system, an iOS operating system, or a Windows operating system, that process a service through a process (process). The application layer may include applications such as a call management application responsible for providing a call service for a user, a browser, an address book, word processing software, and instant messaging software.

Figure 2:
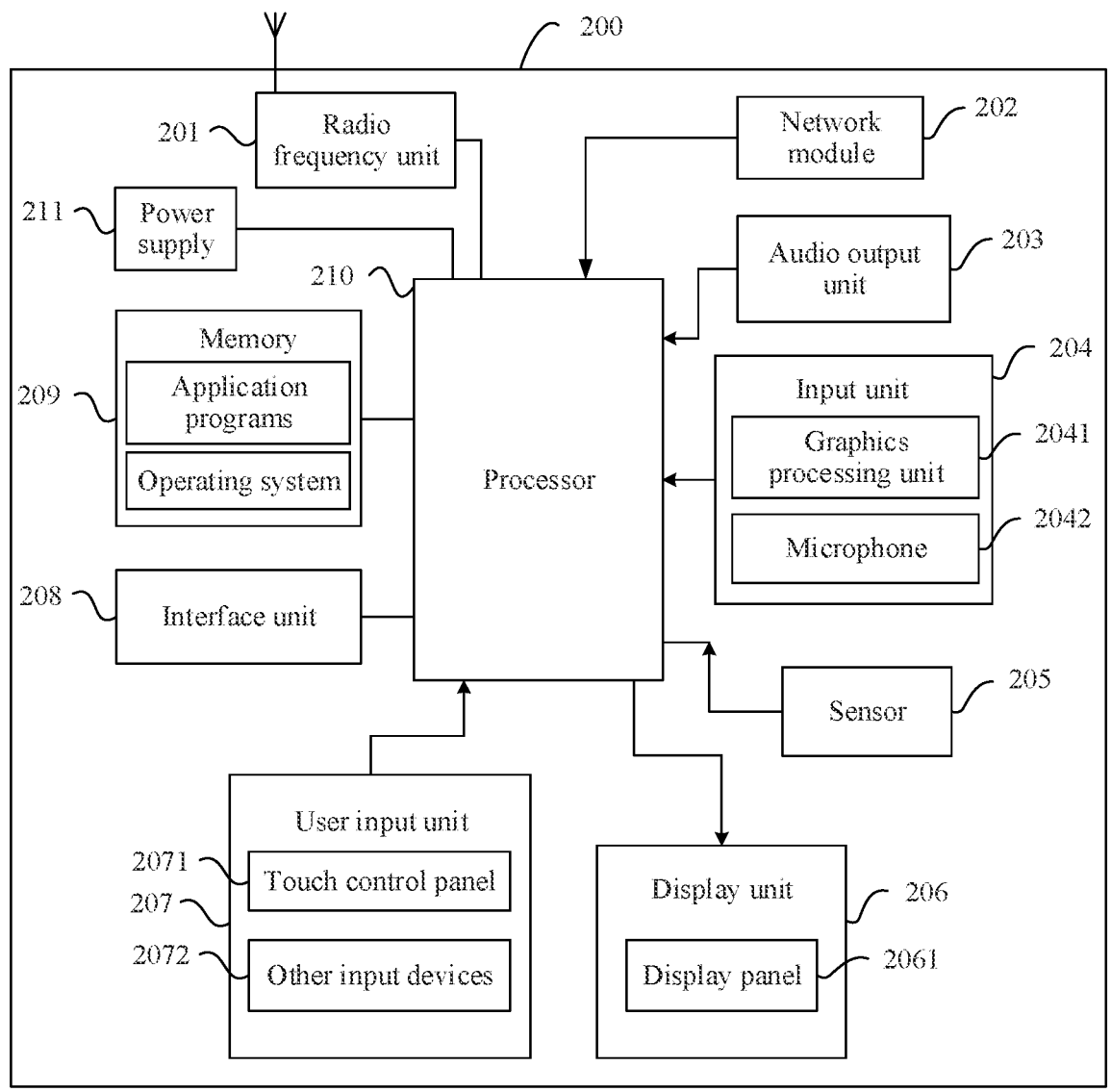
FIG. 2 is a schematic structural diagram 1 of user equipment according to an embodiment of this application.

FIG. 2 is a schematic diagram of a hardware structure of the UE 200 for implementing each embodiment of the present invention. As shown in FIG. 2, the UE 200 includes but is not limited to components such as a radio frequency unit 201, a network module 202, an audio output unit 203, an input unit 204, a sensor 205, a display unit 206, a user input unit 207, an interface unit 208, a memory 209, a processor 210, and a power supply 211. A person skilled in the art may understand that the structure of the UE 200 shown in FIG. 2 does not constitute a limitation on the UE 200, and the UE 200 may include more or fewer components than those shown in the figure, or some components may be combined, or different component configurations may be used. In this embodiment of the present invention, the UE 200 may be but is not limited to a mobile phone, a tablet computer, a notebook computer, a palmtop computer, a vehicle-mounted terminal, a wearable device, a UMPC, a netbook, a PDA, a PC, a TV, an automatic teller machine, a self-service machine, or the like.

It should be understood that, in the embodiments of the present invention, the radio frequency unit 201 may be configured to receive and send information or receive and send a signal during a call. Specifically, after receiving downlink data from an access network device, the radio frequency unit 201 sends the downlink data to the processor 210 for processing, and sends uplink data to the access network device. Usually, the radio frequency unit 201 is but is not limited to an antenna, at least one amplifier, a transceiver, a coupler, a low noise amplifier, a duplexer, or the like. In addition, the radio frequency unit 201 may further communicate with a network and another device through a wireless communications system.

The UE 200 provides wireless broadband internet access for a user through the network module 202, for example, helps the user to receive and send an email, browse a web page, and access streaming media.

The audio output unit 203 may convert audio data received by the radio frequency unit 201 or the network module 202 or audio data stored in the memory 209 into an audio signal, and output the audio signal as a sound. In addition, the audio output unit 203 may further provide an audio output related to a specific function performed by the UE 200. The audio output unit 203 includes a speaker, a buzzer, a receiver, and the like.

The input unit 204 is configured to receive an audio or video signal. The input unit 204 may include a graphics processing unit (Graphics Processing Unit, GPU) 2041 and a microphone 2042. The graphics processing unit 2041 processes image data of a static image or a video that is obtained by an image capture apparatus (for example, a camera) in a video capture mode or an image capture mode.

A processed image frame may be displayed on the display unit 206. An image frame processed by the graphics processing unit 2041 may be stored in the memory 209 (or another storage medium) or sent through the radio frequency unit 201 or the network module 202. The microphone 2042 may receive a sound (for example, receive speech information input by a user), and can process such a sound into audio data. The processed audio data may be converted into a format that can be sent to a mobile communications base station by using the radio frequency unit 201 in a call mode for outputting.

The UE 200 further includes at least one sensor 205, such as a light sensor, a motion sensor, and another sensor. Specifically, the light sensor includes an ambient light sensor and a proximity sensor. The ambient light sensor may adjust luminance of a display panel 2061 based on brightness of ambient light. The proximity sensor may power off the display panel 2061 and/or backlight when the UE 200 approaches an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a posture (such as switching between a landscape screen and a vertical screen, a related game, and magnetometer posture calibration) of the UE 200, a function related to vibration recognition (such as a pedometer and a knock), and the like. The sensor 205 may further include a fingerprint sensor, a pressure sensor, an iris sensor, a molecular sensor, a gyroscope, a barometer, a hygrometer, a thermometer, an infrared sensor, and the like. Details are not described herein.

The display unit 206 may be configured to display information entered by the user or information provided for the user. The display unit 206 may include the display panel 2061, and the display panel 2061 may be configured in a form of a liquid crystal display (Liquid Crystal Display, LCD), an organic light-emitting diode (Organic Light-Emitting Diode, OLED), or the like.

The user input device 207 may be configured to receive input digital or character information, and generate a key signal input related to user setting and function control of the UE 200. Specifically, the user input device 207 includes a touch panel 2071 and other input devices 2072. The touch panel 2071 is also referred to as a touchscreen, and may collect a touch operation performed by a user on or near the touch panel 2071 (such as an operation performed by a user on the touch panel 2071 or near the touch panel 2071 by using any proper object or accessory, such as a finger or a stylus). The touch panel 2071 may include two parts: a touch detection apparatus and a touch controller. The touch detection apparatus detects a touch location of the user, detects a signal generated by the touch operation, and transfers the signal to the touch controller. The touch controller receives touch information from the touch detecting apparatus, converts the touch information into touch coordinates, then transmits the touch coordinates to the processor 210, and receives and executes a command sent from the processor 210. In addition, the touch panel 2071 may be implemented in a plurality of types, such as a resistive type, a capacitive type, an infrared type, and a surface acoustic wave type. In addition to the touch panel 2071, the user input unit 207 may further include the other input devices 2072. Specifically, the other input devices 2072 may include but are not limited to a physical keyboard, a functional button (such as a volume control button or a power on/off button), a trackball, a mouse, a joystick, and the like. Details are not described herein.

Figure 3:
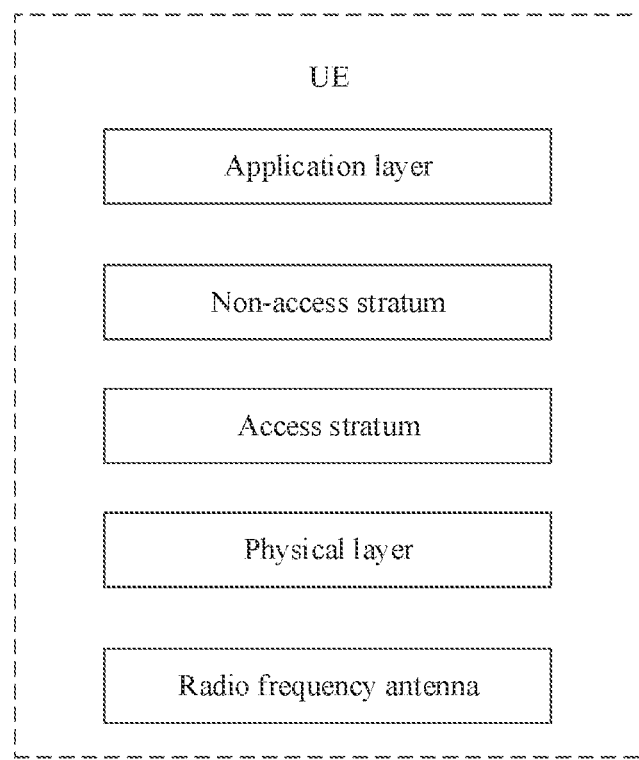
FIG. 3 is a schematic structural diagram 2 of user equipment according to an embodiment of this application.

Further, the touch panel 2071 may cover the display panel 2061. After detecting a touch operation on or near the touch panel 2071, the touch panel 2071 sends the touch operation to the processor 210 to determine a type of a touch event. Then the processor 210 provides corresponding visual output on the display panel 2061 based on the type of the touch event. In FIG. 3, although the touch panel 2071 and the display panel 2061 serve as two independent parts to implement input and output functions of the UE 200, in some embodiments, the touch panel 2071 and the display panel 2061 may be integrated to implement the input and output functions of the UE 200. This is not limited herein.

The interface unit 208 is an interface for connecting an external apparatus and the UE 200. For example, the external apparatus may include a wired or wireless headset port, an external power port, a wired or wireless data port, a memory card port, a port configured to connect to an apparatus having an identification module, an audio input/output (I/O) port, a video I/O port, an earphone port, and the like. The interface unit 208 may be configured to receive an input (for example, data information and electricity) from an external apparatus and transmit the received input to one or more elements within the UE 200 or may be configured to transmit data between the UE 200 and the external apparatus.

The memory card port may be configured to connect to a SIM card. A SIM card may be inserted into a SIM card interface or detached from the SIM card interface, to implement contact with or separation from the UE 200. The UE 200 may support one or N SIM card interfaces, where N is a positive integer greater than 1. The SIM card interface may support a nano-SIM card, a micro-SIM card, a SIM card, and the like. A plurality of cards may be inserted into a same SIM card interface at the same time. The plurality of cards may be of a same type or different types. The SIM card interface may also be compatible with different types of SIM cards, and the SIM card interface may also be compatible with an external storage card. The UE 200 interacts with a network by using a SIM card, to implement functions such as calling and data communication. In some embodiments, the UE 200 uses an eSIM, namely, an embedded SIM card. The eSIM card may be embedded in the UE 200, and cannot be separated from the UE 200.

The memory 209 may be configured to store a software program and various data. The memory 209 may mainly include a program storage area and a data storage area. The program storage area may store an operating system, an application program required by at least one function (such as a sound play function and an image play function), and the like. The data storage area may store data (such as audio data and a phone book) created based on use of a mobile phone, and the like. In addition, the memory 209 may include a high speed random access memory, and may further include a nonvolatile memory, for example, at least one magnetic disk storage device, a flash memory, or another volatile solid-state storage device.

The processor 210 is a control center of the UE 200, is connected to all parts of the entire UE 200 by using various interfaces and lines, and executes various functions of the UE 200 and performs data processing by running or executing a software program and/or a module stored in the memory 209 and by invoking data stored in the memory 209, to perform overall monitoring on the UE 200. The processor 210 may include one or more processing units.

Optionally, the processor 210 may integrate an application processor and a modem processor. The application processor mainly processes an operating system, a user interface, an application program, and the like. The modem processor mainly processes wireless communication. It may be understood that the modem processor may alternatively be not integrated into the processor 210.

The UE 200 further includes the power supply 211 (such as a battery) that supplies power to the components. Optionally, the power supply 211 may be logically connected to the processor 210 through a power supply management system, so that functions such as charging, discharging, and power consumption management are implemented by using the power supply management system.

In addition, the UE 200 may further include some function modules that are not shown, for example, a motor that may generate a vibration prompt. The motor may be used for an incoming call vibration prompt, or may be used for a touch vibration feedback. For example, touch operations performed on different applications (for example, photographing and audio playing) may correspond to different vibration feedback effects. The motor may also correspond to different vibration feedback effects for touch operations performed on different areas of the display panel 2061. Different application scenarios (for example, a time reminder, information receiving, an alarm clock, and a game) may also correspond to different vibration feedback effects. Customization of a touch vibration feedback effect may further be supported. For example, an indicator may be an indicator light that may be configured to indicate a charging status and a power change, or may be configured to indicate a message, a missed call, a notification, and the like.

In a possible implementation, the UE 200 in FIG. 1 and FIG. 2 may alternatively be of a structure shown in FIG. 3. As shown in FIG. 3, the UE includes an application layer, a non-access stratum (Non-access Stratum, NAS), an access stratum (Access Stratum, AS), a physical layer (Physical, PHY), and a radio frequency antenna. The application layer is a general term for user interface (User Interface, UI) application programs, and is application programs for interacting with a user. As a function layer between the core network and the UE, the NAS supports signaling and data transmission between the core network and the UE, for example, may support functions such as authorization, authentication, security control, mobility management in idle mode, and paging initiation in idle mode. The access stratum is responsible for processing information between the UE and the access network device, for example, may support broadcast, paging, link management, radio bearer control, mobility, encryption and integrity protection, segmentation and connection, retransmission processing, sequential transmission of higher layer data, and protocol data unit (Protocol Data Unit, PDU) packet assembly and demultiplexing. The physical layer is responsible for encoding and decoding, modulation and demodulation, multi-antenna mapping, and other telecom physical layer functions. The radio frequency antenna is responsible for signal receiving, transmitting, and processing.

In the embodiments of this application, a specific structure of an execution body of the communications method is not particularly limited in the embodiments of this application, provided that a program that records code of the communications method in the embodiments of this application can be run to perform communication according to the communications method in the embodiments of this application. For example, the communications method provided in the embodiments of this application may be performed by UE, a function module that can invoke a program and execute the program in the UE, or a communications apparatus applied to the UE, for example, a chip. This is not limited in this application.

In an LTE system, VoLTE of some operators is not promoted for fully commercial use, or a user disables VoLTE, or a current network does not support VoLTE. In this case, LTE voice is usually processed through CSFB. For example, a CSFB process may include the method shown in FIG. 4. Step 1: UE receives, on an LTE network, a paging message from a network side, where the paging message is used to request the UE to perform CSFB. Step 2: The UE sends, on the LTE network, a paging response to the network side, to respond that the UE agrees to perform the CSFB. Step 3: The network side sends indication information to the UE, to indicate the UE to perform the CSFB and fall back a circuit switched domain to a UMTS for processing. For example, the UMTS may be a global system for mobile communications (Global System for Mobile communication, GSM) or a wideband code division multiple access (Wideband Code Division Multiple Access, WCDMA) system. Step 4: The UE performs synchronization with the UMTS (for example, the UE searches for and camps on a cell on a UMTS network) and accesses the UMTS cell. Step 5: The UE sends, on the UMTS network, a paging response to the network side. Step 6: The network side sends, in the UNITS, an incoming call request to the UE, where the incoming call request includes an incoming call number. For example, the incoming call request is a call setup (Call Setup) message, and the incoming call number may be included in a calling party BCD number field. The UE may determine, based on the incoming call request, whether the incoming call number belongs to a list of rejected incoming calls. If the incoming call number does not belong to the list of rejected incoming calls, step 7a is performed: The UE rings, and may set up a call in response to a user's answer operation. After the call ends, step 8 is performed: The UE returns to the LTE network. If the incoming call number belongs to the list of rejected incoming calls, step 7b is performed: The UE may send an incoming call rejection message to the network side, and does not set up a call. Step 8: The UE returns to the LTE network. The list of rejected incoming calls may be a blacklist. In an implementation, the blacklist is a phone number list stored by the UE based on an incoming call blacklist set by the user on an interface. If the UE determines that a phone number belongs to the blacklist, the UE may reject an incoming call from the phone number. In another implementation, the blacklist is a phone number or a list of phone numbers determined by the network side. The network side may mark, in a message sent to the UE, whether a phone number belongs to the blacklist, or the UE may search the blacklist provided by the network side, and determine whether a phone number belongs to the blacklist.

After the UE accesses the UMTS cell, the UE obtains the incoming call number from the incoming call request received in the UMTS. Consequently, the incoming call number is obtained at a relatively late occasion. If the UE refuses to set up a call (for example, if a nuisance call occurs when the user uses a packet switched data service on the LTE network), the UE needs to first fall back to the UNITS, extract the incoming call number, reject the incoming call, and then return to the LTE network. For example, in the processing process from step 1 to step 8, the packet switched data service is suspended and is interrupted for a short period of time. This deteriorates surfing experience of the user.

An embodiment of this application provides a communications method, and the communications method may be applied to the systems or devices shown in FIG. 1 to FIG. 3. In this method, when UE receives the first paging message on an LTE network (step 1 in FIG. 4), the UE extracts an incoming call number, and determines whether to reject an incoming call. This can avoid an interruption of a packet switched data service caused by a CSFB process. As shown in FIG. 5, the method may include S101 to S105.

S101. A network side sends a first message to UE.

When UE on a network initiates a voice call to another UE, the network side may determine the called UE based on a call request of the calling UE. If the called UE is on an LTE network, the first message is sent to the called UE on the LTE network. The first message is used to request the UE to perform CSFB as a called party. The CSFB is circuit switched fallback, and means that when the UE covered by the LTE network needs to process a CS service, the UE falls back to a 2G or 3G CS network to complete service processing. It should be noted that this embodiment of this application is described by using an example of circuit switched fallback of the UE on the LTE network to a 3G network. In actual use, the method provided in this embodiment of this application is further applicable to another scenario of handover (for example, circuit switched fallback) between networks of different standards. For example, UE covered by a 5G NR network receives a call request on the NR network, and falls back a voice call service to the LTE network for service processing. Alternatively, UE covered by the 5G NR network receives a call request on the NR network, falls back a CS service to the LTE network, and then falls back the CS service from the LTE network to a 2G or 3G network for service processing. Alternatively, UE covered by the 5G NR network receives a call request on the NR network, and falls back a CS service to a 2G or 3G network for service processing. For example, alternatively, UE covered by a future evolved system may fall back a CS service to a network of an earlier standard for service processing. This is not limited in this application.

In an implementation, the first message may be a paging message. For example, the paging message is a circuit switched service notification (CS Service Notification). Certainly, the paging message may alternatively be another message. For example, a connection status of the UE may include a connected mode and an idle mode. The connected mode indicates a mode in which a radio resource control (radio resource control, RRC) connection of the UE has been set up, and the idle mode indicates a mode in which the UE does not have an RRC connection. If the called UE is in connected mode, the first message is a circuit switched service notification. If the called UE is in idle mode, the first message is a paging message for the UE in idle mode. For example, the paging message is paging (Paging). A specific form of the first message is not limited in this application. For example, the first message may be the paging message sent by the network side to the UE in LTE in step 1 in FIG. 4.

The first message includes first information, and the first information is used to indicate an incoming call number. For example, the first information may be content of a calling line identification (Calling Line Identification, CLI) field, and the calling line identification field includes the incoming call number. For example, the calling line identification field includes three parts: a number type, a number display type, and the incoming call number. For example, the calling line identification field is 21811032547698F1, where the number type is 21, the number display type is 81, and an incoming call number field is 1032547698F1. High bytes and low bytes of the incoming call number field are arranged in reverse order, to obtain the incoming calling number: 01234567891.

S102. The UE receives the first message.

The UE receives the first message on the LTE network. In an implementation, the UE is in the connected mode when receiving the first message.

In an optional implementation, after receiving the first message, the UE may parse the first message to obtain the first information in the first message, so as to obtain the incoming call number.

In an implementation, as shown in FIG. 5-1, a baseband chip of the UE receives the first message, and parses the first message to obtain the incoming call number. Further, the baseband chip of the UE reports the obtained incoming call number to a blacklist/whitelist identification module of the UE.

S103. The UE determines whether a preset condition is met. If the UE determines that the preset condition is met, S104 is performed. If the UE determines that the preset condition is not met, S105 is performed.

Specifically, if the UE determines that the preset condition is met, that is, the UE determines to reject the incoming call, S104 is performed. If the UE determines that the preset condition is not met, that is, if the UE determines not to reject the incoming call, S105 is performed.

The preset condition may include at least one of the following: the incoming call number is restricted, and the UE is in a mode of automatically rejecting a CSFB incoming call.

(1) The preset condition is that the incoming call number is restricted.

The UE obtains the first information, that is, obtains the incoming call number, and may determine, based on the first information, that the incoming call number is restricted.

In an implementation, an incoming call blacklist may be preset in the UE (for example, the blacklist may be a group of phone numbers that are set to be not allowed to access). If an incoming call number belongs to the incoming call blacklist, it is determined that the incoming call number is restricted. In another implementation, an incoming call whitelist may be preset in the UE (for example, the whitelist may be a group of phone numbers that are set to be allowed to access). If an incoming call number does not belong to the incoming call whitelist, it is determined that the incoming call number is restricted.

In an implementation, the UE may further add a phone number to the blacklist, or add a phone number to the whitelist, or delete a phone number from the blacklist, or delete a phone number from the whitelist based on a user operation.

Figures 1, 6:
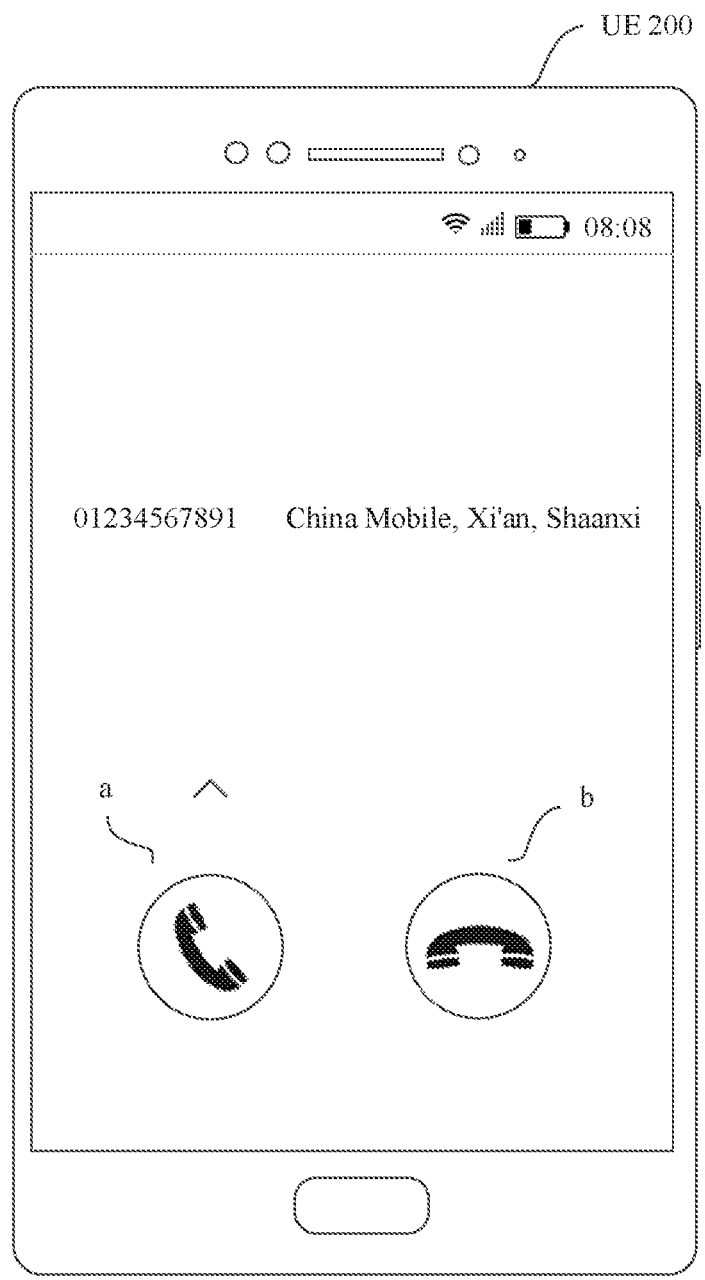
Figures 1, 6:
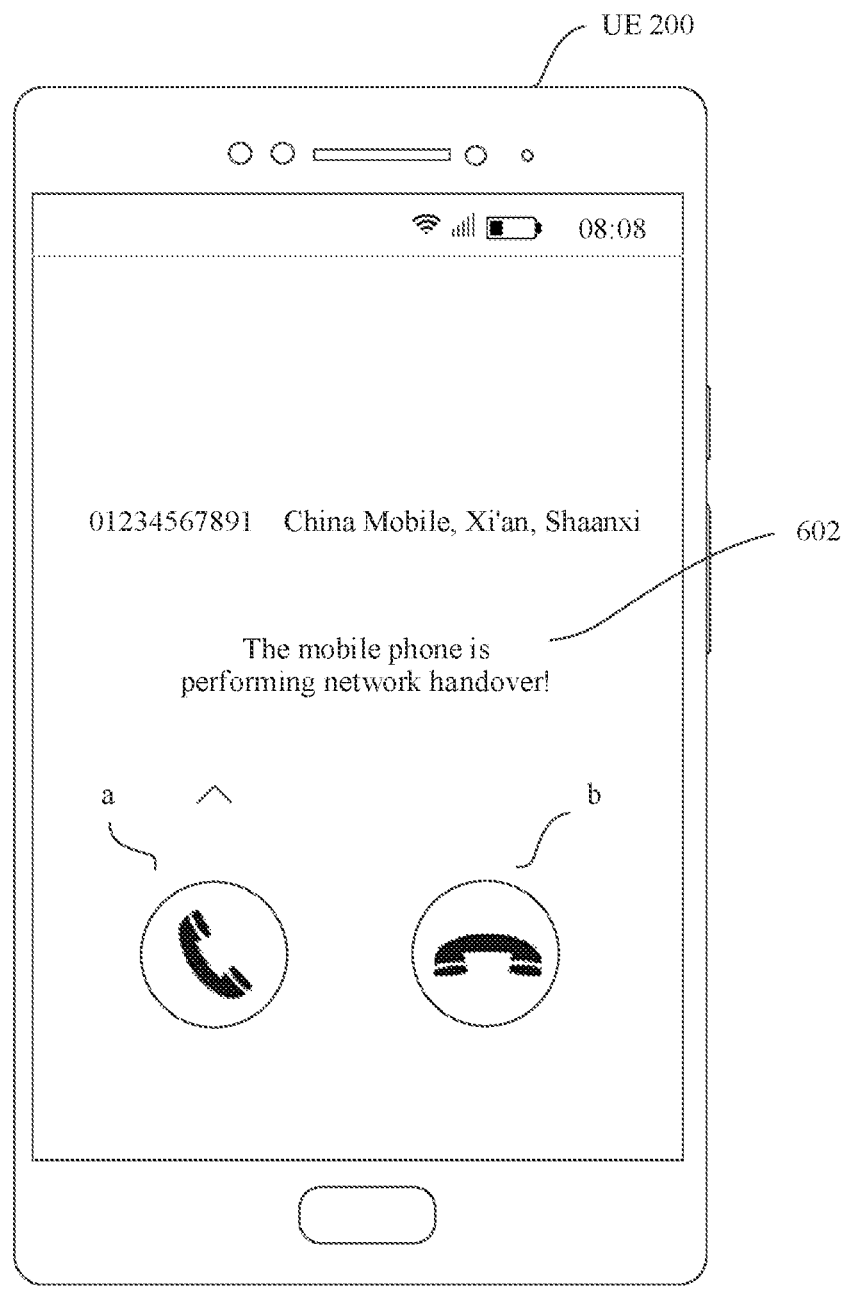
Figures 2, 6:
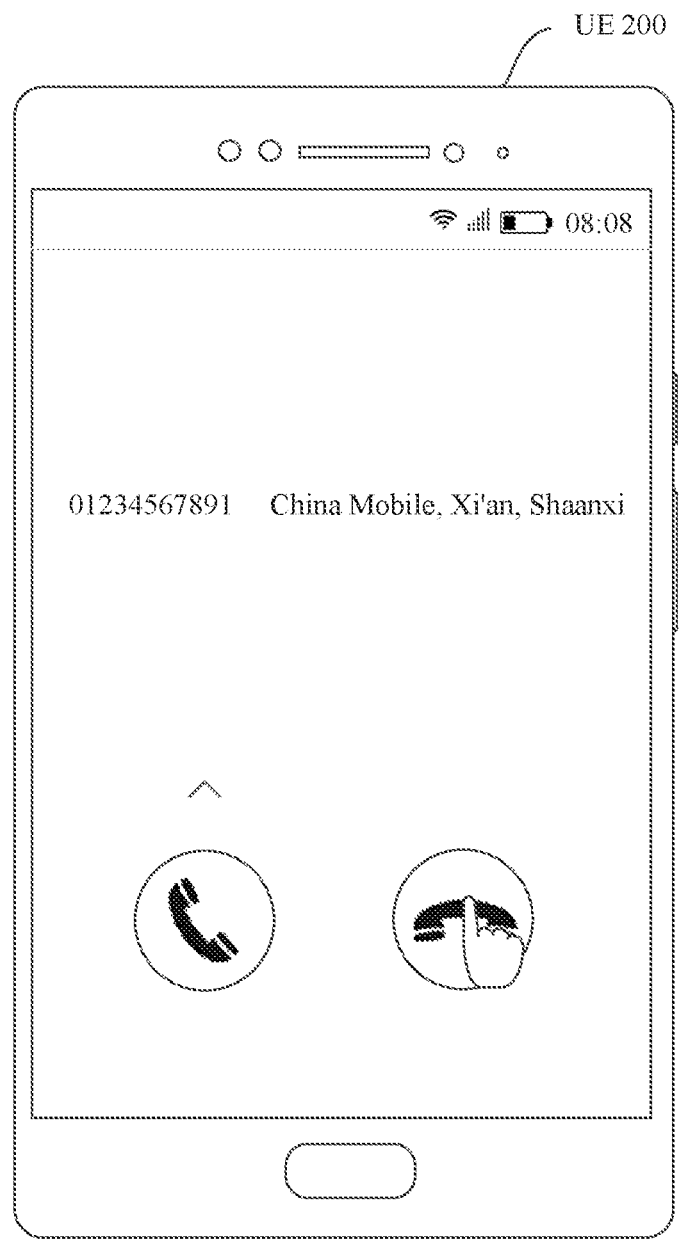
Figures 3, 6:
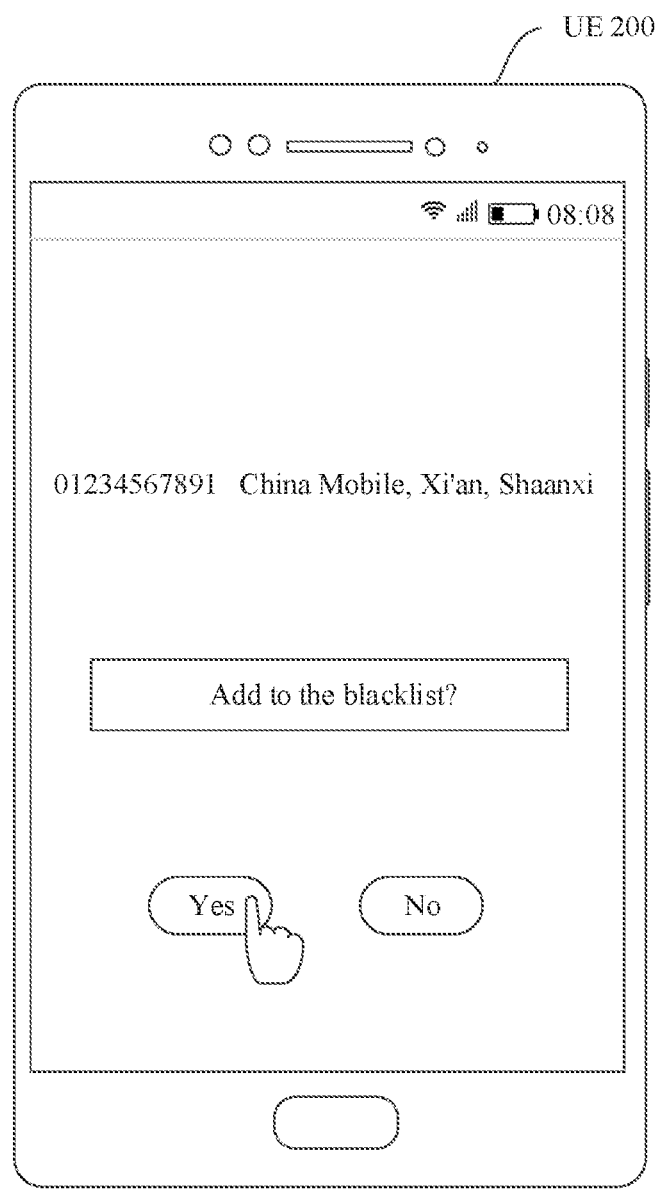
Figures 4, 6:
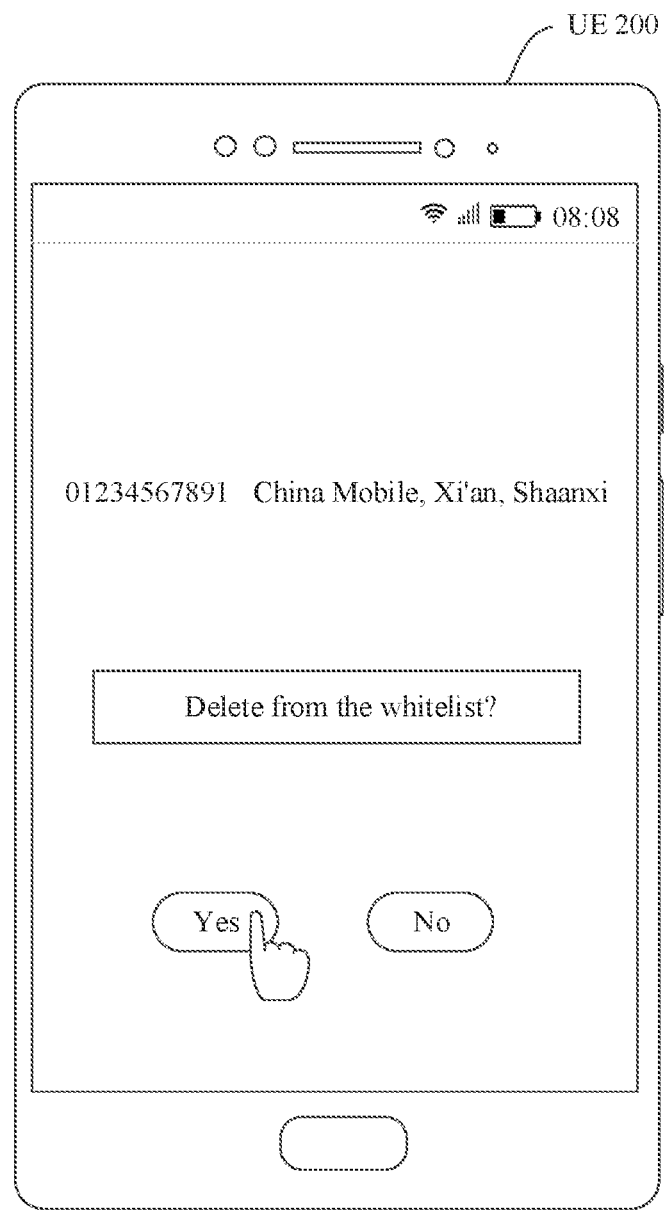
Figures 5, 6:
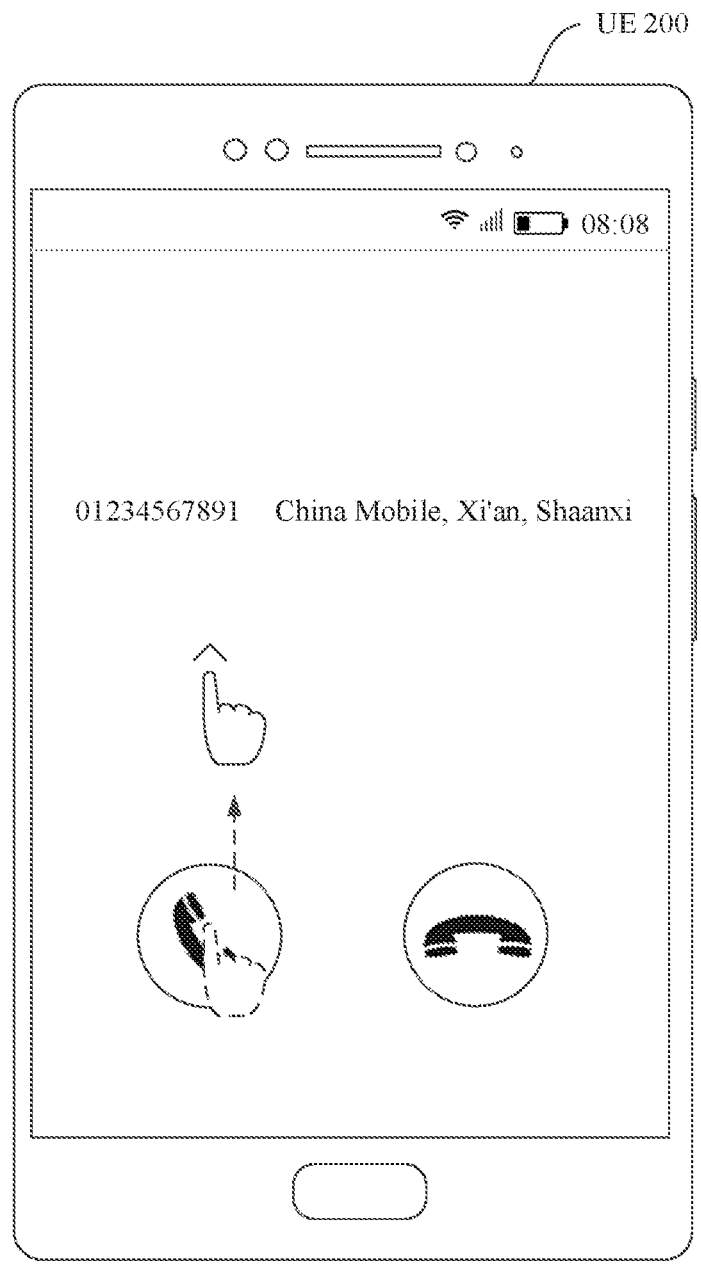
Figure 6:
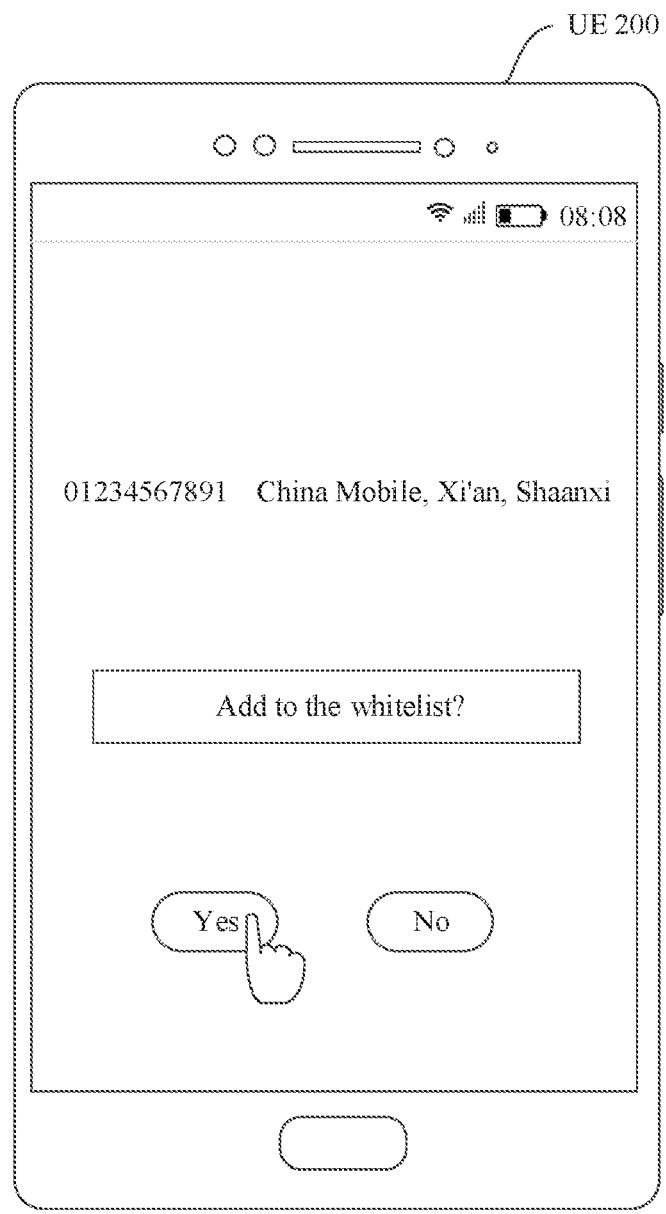

For example, the UE receives an incoming call from the phone number 01234567891, and displays an interface shown in FIG. 6-1, where a is an answer key, and b is a reject key. If the user rejects the call, for example, as shown in FIG. 6-2, if the UE detects that the user selects the reject key, the UE displays an interface shown in FIG. 6-3, to ask the user whether to add the rejected incoming call number to the blacklist. If the UE detects that the user selects "Yes", the UE adds the incoming call number to the blacklist. For example, if the UE determines that the incoming call number is in the whitelist, the UE may display an interface shown in FIG. 6-4, to ask the user whether to delete the rejected incoming call number from the whitelist. If the UE detects that the user selects "Yes", the UE deletes the incoming call number from the whitelist.

For example, the UE receives an incoming call from the phone number 01234567891, and displays an interface shown in FIG. 6-1, where a is an answer key, and b is a reject key. For example, as shown in FIG. 6-5, if the UE detects that the user taps the answer key and swipes up, it is determined that the user chooses to answer the call. In an implementation, if the UE determines that a quantity of times that an incoming call number is answered is greater than a specified quantity of times, for example, if the incoming call number is answered twice within 24 hours, and the incoming call number is not in the whitelist, the UE displays an interface shown in FIG. 6-6, to ask the user whether to add the incoming call number to the whitelist. If the UE detects that the user selects "Yes", the UE adds the incoming call number to the whitelist. In another implementation, if the UE determines that a quantity of times that the incoming call number is answered is greater than a specified quantity of times, and the incoming call number is not in the whitelist, the UE adds the incoming call number to the whitelist.

For example, the UE determines that the user dials the phone number 01234567891, and the phone number is in the blacklist. After determining that the call ends, the UE may display an interface shown in FIG. 6-7, to ask the user whether to delete the phone number from the blacklist. If the UE detects that the user selects "Yes", the UE deletes the incoming call number from the blacklist.

In an implementation, as shown in FIG. 5-1, the blacklist/whitelist identification module of the UE determines whether the incoming call number belongs to the incoming call blacklist. If the blacklist/whitelist identification module determines that the incoming call number belongs to the incoming call blacklist, the blacklist/whitelist identification module transfers the incoming call number to a call processing module of the UE, and indicates that the incoming call number belongs to the blacklist. The call processing module of the UE may mark the incoming call number as a missed blacklist incoming call. Further, the blacklist/whitelist identification module notifies the baseband chip that the incoming call number is restricted.

Figure 5:
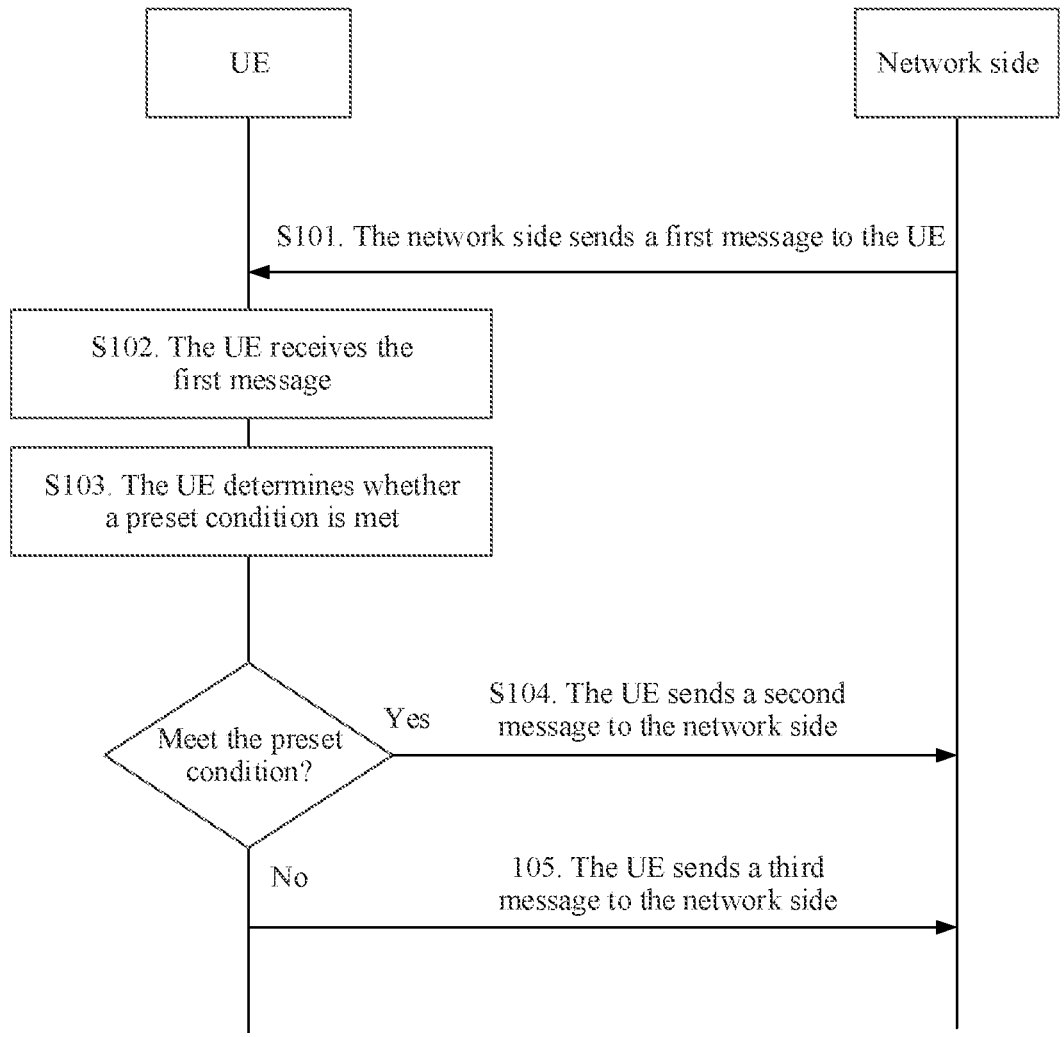
FIG. 5 is a schematic diagram 1 of a communications method according to an embodiment of this application.
Figures 1, 5:
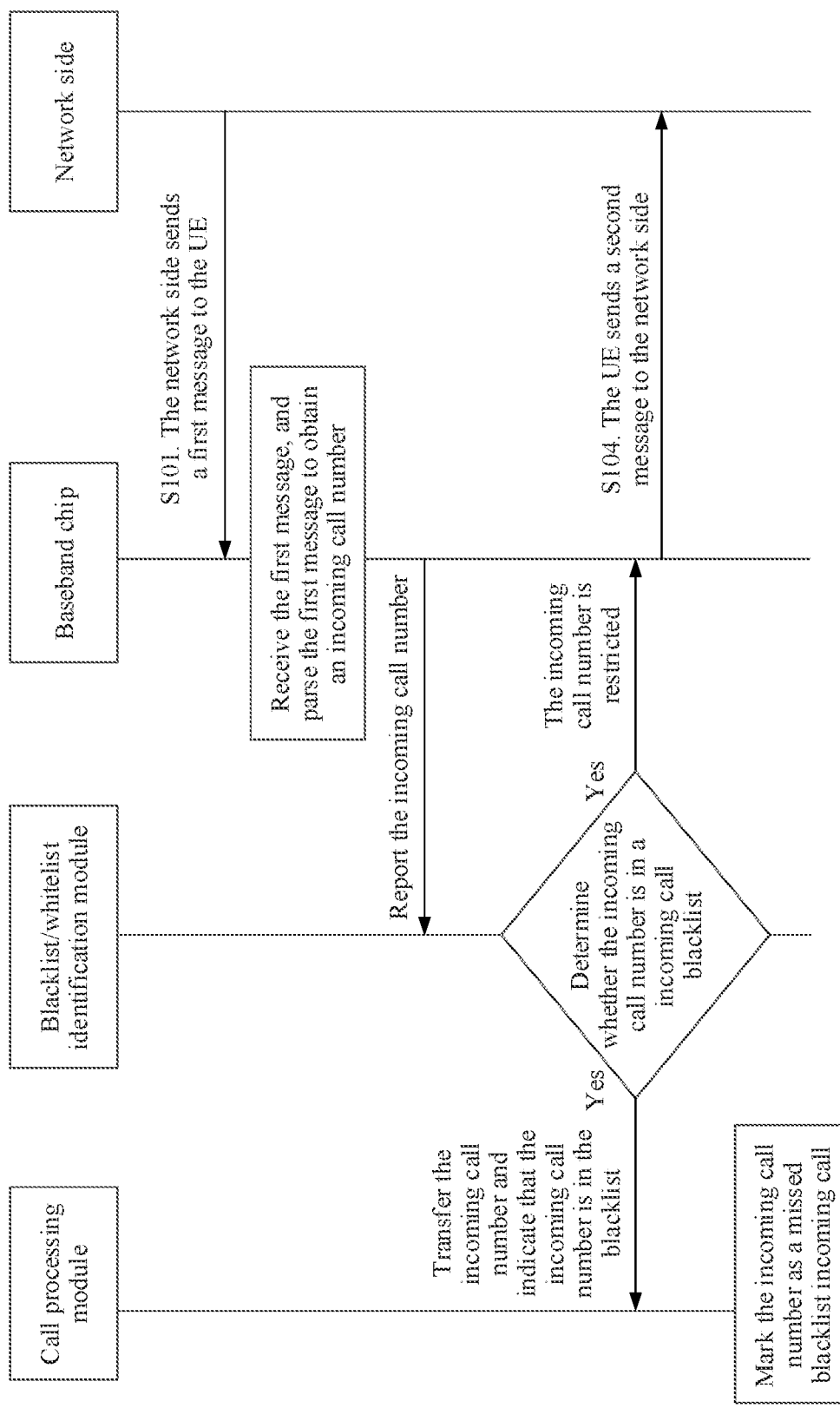
Figures 2A, 5:
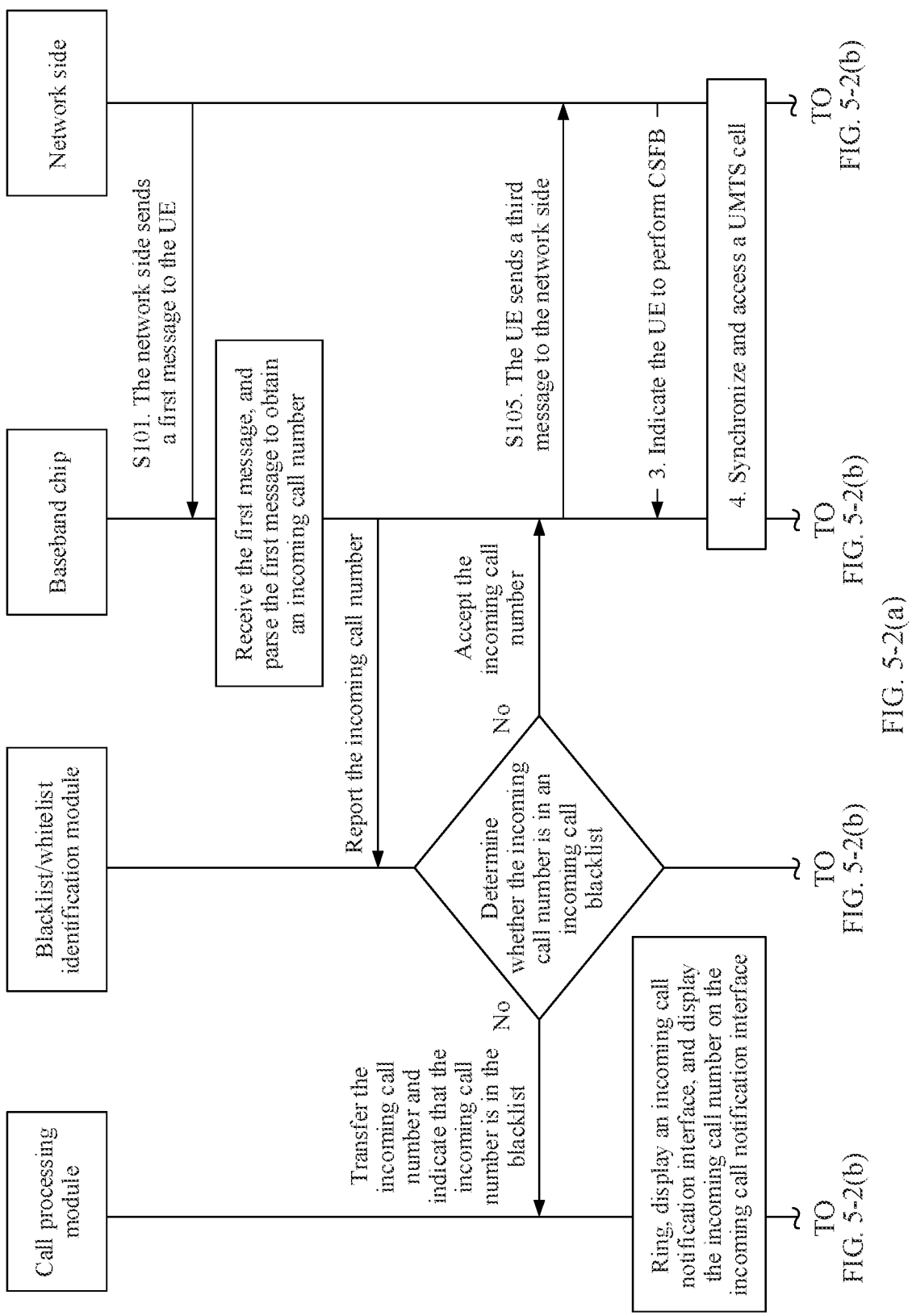
Figure 5:
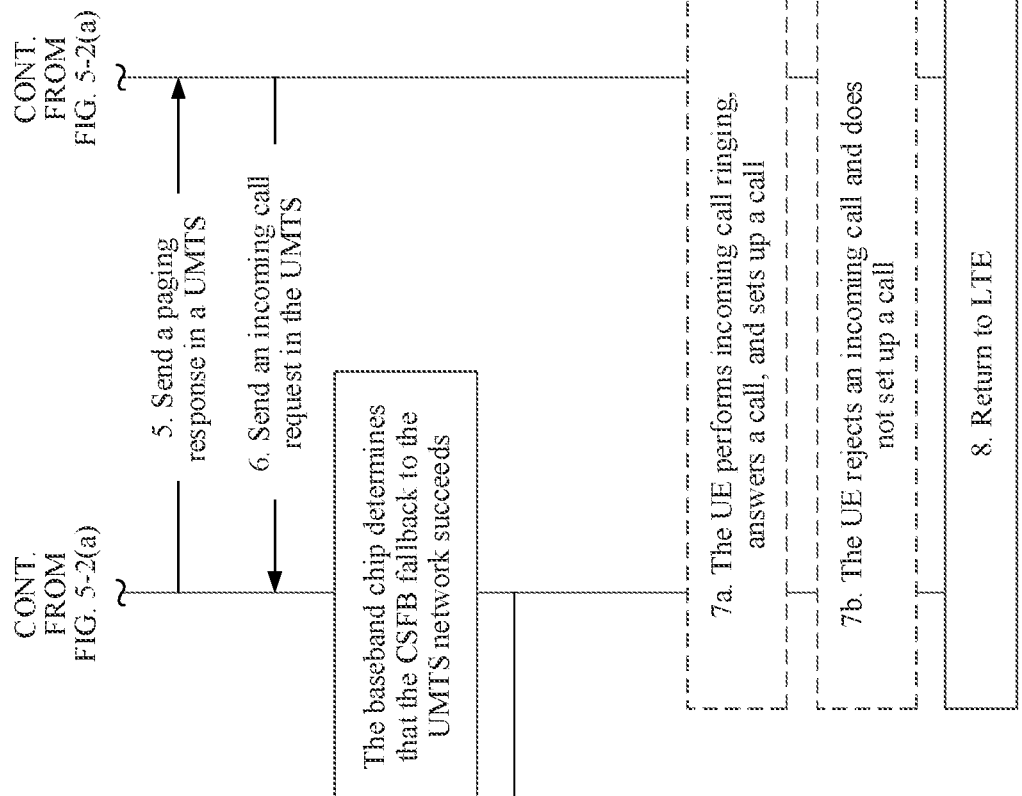
Figure 2B:
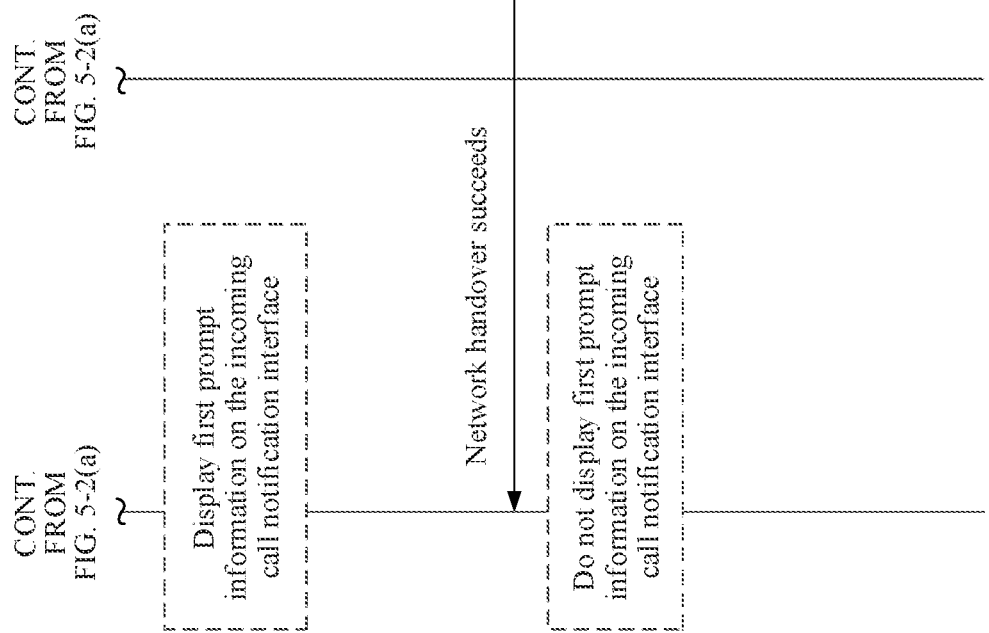

In an implementation, as shown in FIG. 5-2(a) and FIG. 5-2(b), the blacklist/whitelist identification module of the UE determines whether the incoming call number belongs to the incoming call blacklist. If the blacklist/whitelist identification module determines that the incoming call number does not belong to the incoming call blacklist, the blacklist/whitelist identification module transfers the incoming call number to the call processing module of the UE, and indicates that the incoming call number does not belong to the blacklist. The call processing module of the UE rings, displays an incoming call notification interface, and displays the incoming call number on the incoming call notification interface. For example, the incoming call number is 01234567891, and the incoming call notification interface of the UE is shown in FIG. 6-1, where a is an answer key, and b is a reject key. Further, the blacklist/whitelist identification module notifies the baseband chip to accept the incoming call number.

In an implementation, the UE may further display first prompt information on the incoming call notification interface. The first prompt information is used to indicate that the UE is performing a network handover. For example, as shown in FIG. 6-1-1, the UE may display the first prompt information 602 "The mobile phone is performing a network handover!" on the incoming call notification interface.

In an implementation, when the UE displays an interface shown in FIG. 6-1-1, the answer key a and the reject key b cannot be operated. In this case, the UE does not respond to a user operation. In another implementation, the UE saves selection content of the user in response to an operation of tapping the answer key a by the user or in response to an operation of tapping the reject key b by the user. For example, the UE sets a user selection identifier, and sets the user selection identifier to 1 in response to the operation of tapping the answer key a by the user, or sets the user selection identifier to 2 in response to the operation of tapping the reject key b by the user.

(2) The preset condition is that the UE is in the mode of automatically rejecting a CSFB incoming call.

The UE determines whether the UE is in the mode of automatically rejecting a CSFB incoming call, and if the UE is in the mode of automatically rejecting a CSFB incoming call, the UE rejects all CSFB incoming calls. In this case, in an implementation, the UE may answer a VoLTE incoming call.

For example, the UE may identify, by setting a mode identifier, whether the UE is currently in the mode of automatically rejecting a CSFB incoming call. For example, if the mode identifier is set to 1, it indicates that the UE is in the mode of automatically rejecting a CSFB incoming call; if the mode identifier is set to 0, it indicates that the UE is not in the mode of automatically rejecting a CSFB incoming call. The UE determines, based on the mode identifier, whether the UE is in the mode of automatically rejecting a CSFB incoming call. Certainly, the UE may alternatively identify, in another manner, whether the UE is in the mode of automatically rejecting a CSFB incoming call. This is not limited in this embodiment of this application.

A manner in which the UE enters the mode of automatically rejecting a CSFB incoming call may include:

1. The UE receives a first operation of the user, and sets, in response to the first operation, the UE to be in the mode of automatically rejecting a CSFB incoming call. The first operation may be a gesture that is set by the user for the mode of automatically rejecting a CSFB incoming call, or may be selecting, by the user, a button for setting the mode of automatically rejecting a CSFB incoming call, or may be tapping, by the user, a button for setting the mode of automatically rejecting a CSFB incoming call. This is not limited in this embodiment of this application.

Figures 6, 7:
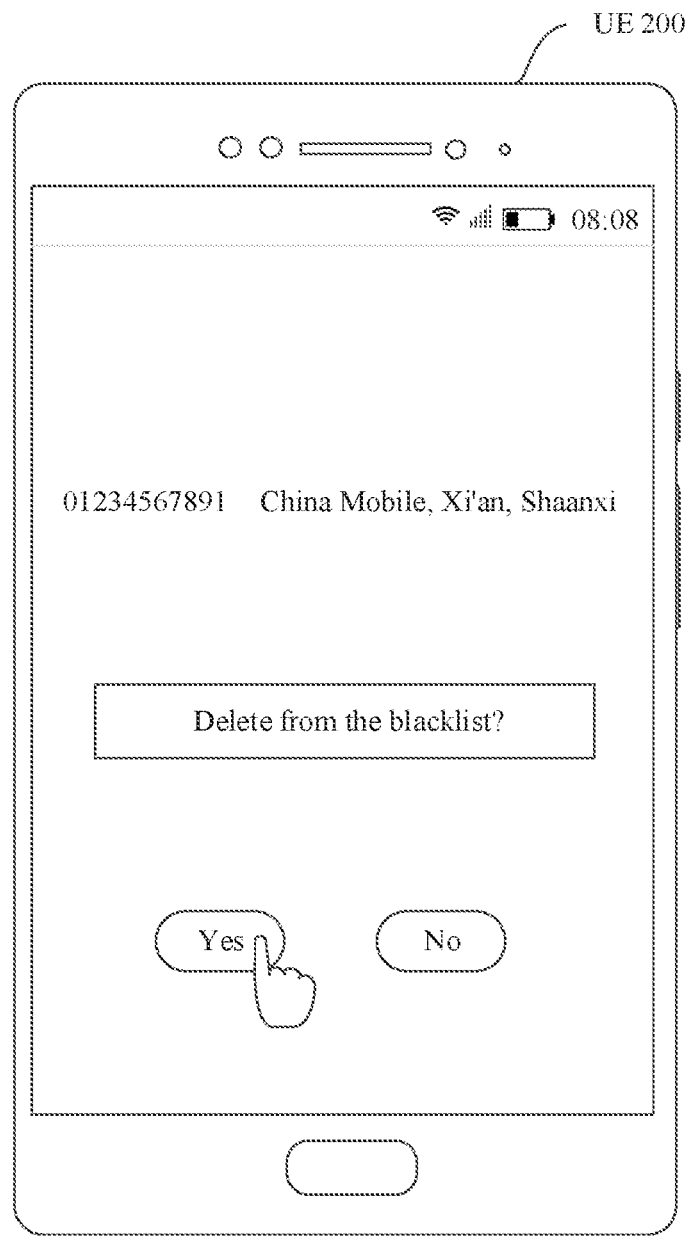
Figure 6A:
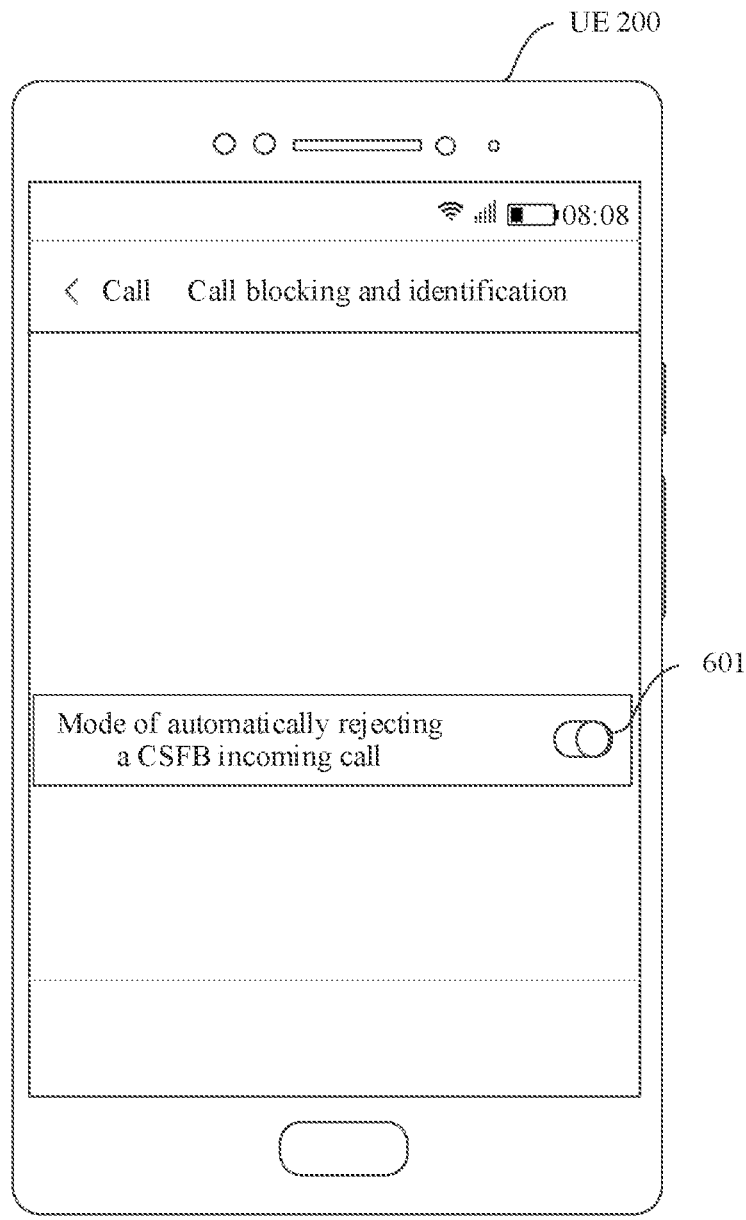
FIG. 6*a* is a schematic diagram 9 of an instance of a display interface of user equipment according to an embodiment of this application.
Figure 6B:
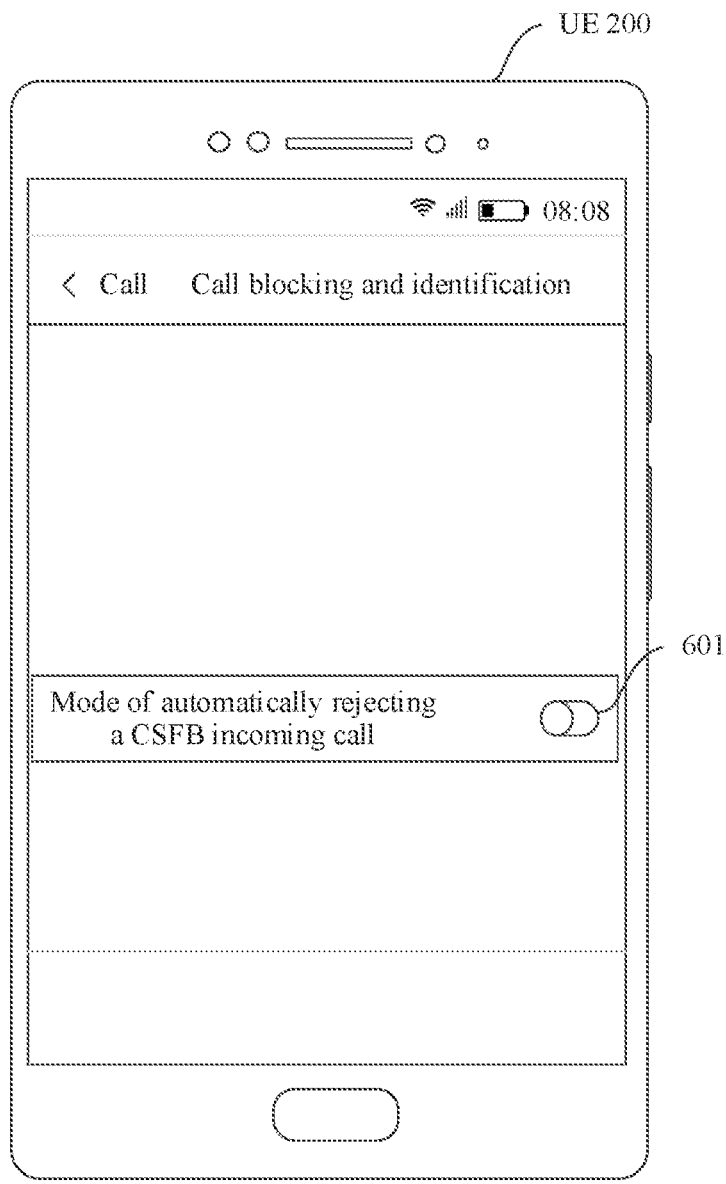
FIG. 6*b* is a schematic diagram 10 of an instance of a display interface of user equipment according to an embodiment of this application.
Figure 7:
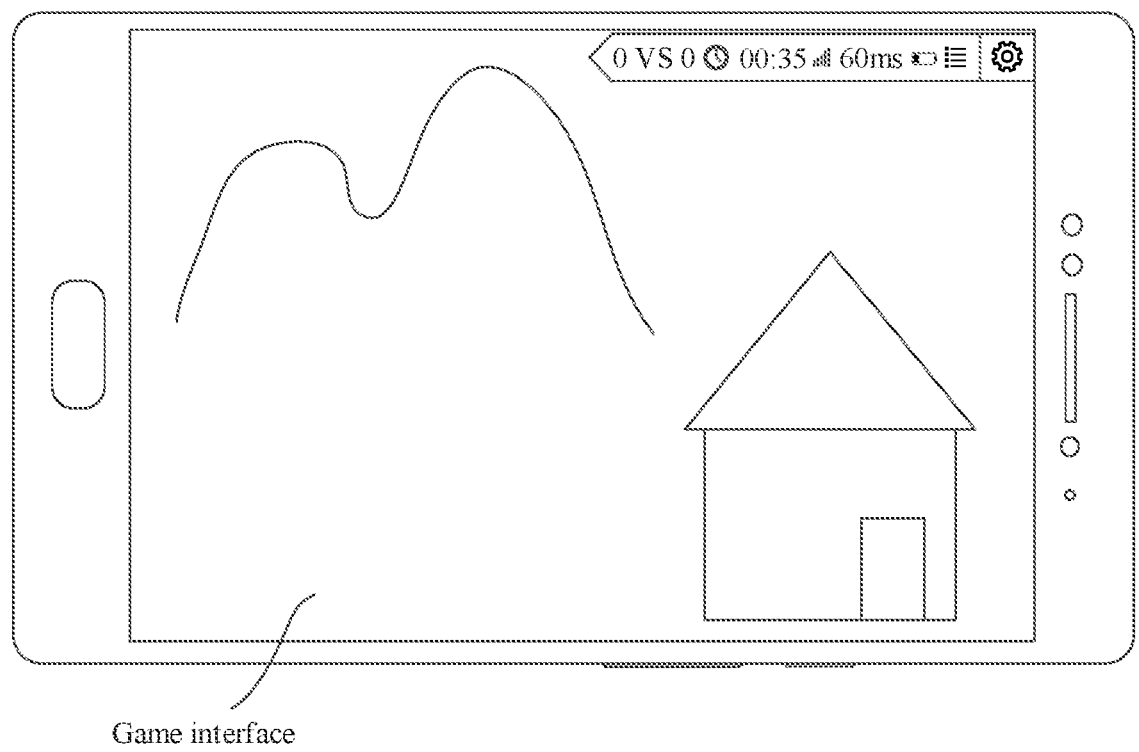

For example, as shown in FIG. 6a and FIG. 6b, on a display interface of the UE, a setting interface includes a call setting option. For example, the first operation may be that the user taps a selection button 601, and the button 601 is used to enable or disable the mode of automatically rejecting a CSFB incoming call. For example, as shown in FIG. 6a, when the selection button 601 is slid to the right side, it indicates that the mode of automatically rejecting a CSFB incoming call is enabled.

2. The UE determines, based on whether the UE has a real-time packet switched data service, whether the UE enters the mode of automatically rejecting a CSFB incoming call. If the UE determines that the UE has the real-time packet switched data service, the UE is set to be in the mode of automatically rejecting a CSFB incoming call. The real-time packet switched data service is a latency-sensitive packet switched data service. The real-time packet switched data service requires fast interaction between the UE and the network side and requires a relatively low latency, for example, a latency between 50 ms and 150 ms. For example, the real-time packet switched data service may include a voice/video session, a real-time game service, an interactive game, or a network live broadcast service. A non-real-time packet switched data service may include a non-conversational video (for example, buffered streaming media) or a transmission control protocol (Transmission Control Protocol, TCP)-based service.

In an implementation, the UE may determine, based on whether the UE has a real-time game service, whether the UE enters the mode of automatically rejecting a CSFB incoming call. For example, the UE may preset a game application list, and the game application list includes preset latency-sensitive game applications. If it is detected that a game application in the game application list is started for running, it is determined that the UE has a real-time game service, and it is determined that the UE enters the mode of automatically rejecting a CSFB incoming call.

3. The UE determines, based on real-time traffic, whether the UE enters the mode of automatically rejecting a CSFB incoming call. For example, the UE may set a traffic threshold. If it is detected that the real-time traffic of the UE is greater than the traffic threshold, the UE is set to be in the mode of automatically rejecting a CSFB incoming call.

S104. The UE sends a second message to the network side.

The UE determines to reject the incoming call, and sends, on the LTE network, the second message to the network side. The second message is used to indicate that the CSFB is rejected. For example, the second message may be a paging response message, for example, an extended service request (Extended Service Request). The extended service request includes second information, and the second information is that the UE rejects the CSFB (CS Fallback Rejected by the UE).

In an implementation, as shown in FIG. 5-1, the baseband chip of the UE sends the second message to the network side.

Then, the UE stays on the LTE network and does not set up a call in a UMTS.

S105. The UE sends a third message to the network side.

The UE determines not to reject the incoming call, and sends the third message to the network side. The third message is used to indicate that the CSFB is accepted. For example, the third message may be a paging response message, for example, an extended service request (Extended Service Request). The extended service request includes third information, and the third information is that the UE accepts the CSFB (CS Fallback Accept by the UE).

In an implementation, as shown in FIG. 5-2(*a*) and FIG. 5-2(*b*), the baseband chip of the UE sends the third message to the network side.

After receiving the third message, the network side performs a CSFB process to fall back a voice service of the UE to the UMTS for processing. For example, the UE and the network side may perform step 3 to step 7a shown in FIG. 4. If the call processing module of the UE rings in S103, incoming call ringing is not performed in step 7a.

Figure 4:
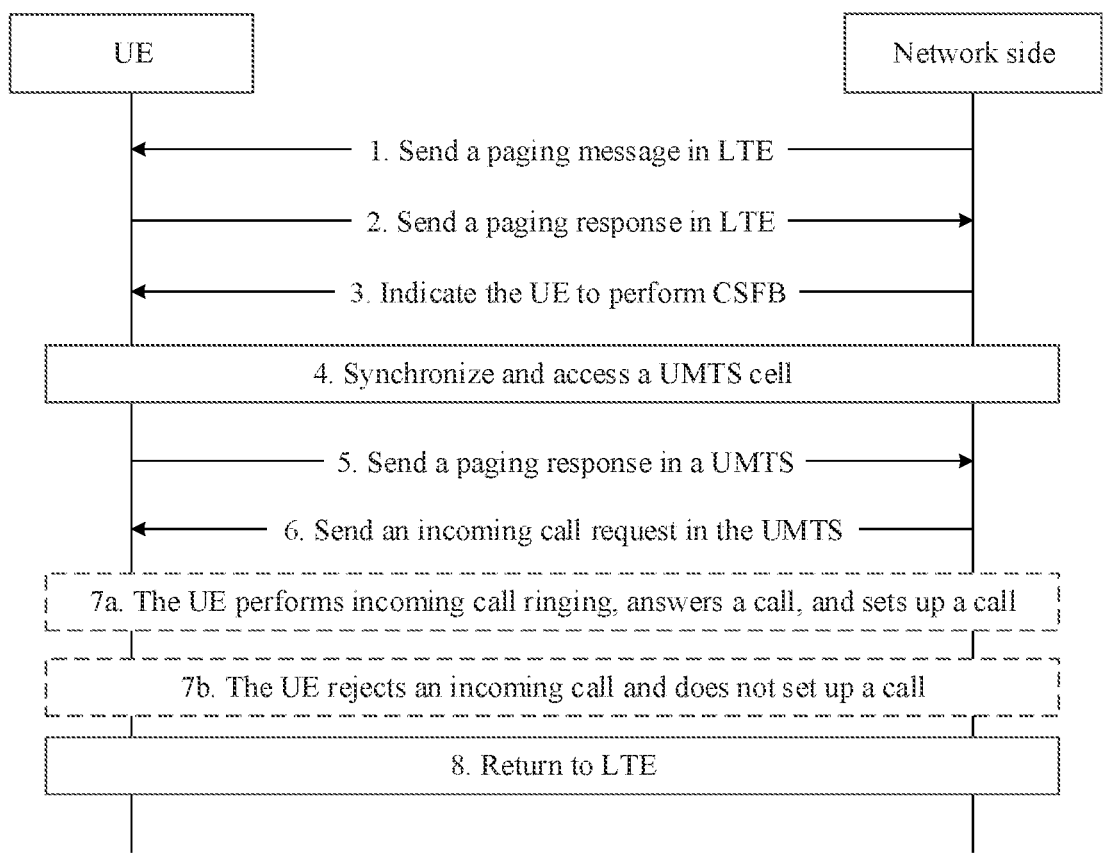
FIG. 4 is a schematic diagram of a CSFB process.

In an implementation, in step 6 in FIG. 4, the network side sends the incoming call request in the UMTS, and the baseband chip of the UE receives the incoming call request. As shown in FIG. 5-2(*a*) and FIG. 5-2(*b*), the baseband chip determines that CSFB to the UTMS succeeds. Further, in an implementation, the baseband chip notifies the call processing module of the UE that the network handover succeeds. In response to the information, the display interface of the UE is switched from the interface shown in FIG. 6-1-1 to the interface shown in FIG. 6-1, and the first prompt information is not displayed on the incoming call display interface. The answer key a or the reject key b on the interface shown in FIG. 6-1 may be tapped. Further, a call is set up in response to an operation of tapping the answer key a by the user, or the incoming call is rejected in response to an operation of tapping the reject key b by the user, and a call is not set up.

In another implementation, the UE determines, based on stored selection content of the user, to set up a call or reject the incoming call. For example, if a saved user selection identifier is 1, it is determined that a user operation is tapping the answer key a, a call is set up. If a saved user selection identifier is 2, and it is determined that a user operation is tapping the reject key b, the incoming call is rejected, and a call is not set up.

In an implementation, if the UMTS network is a WCDMA network, after a call is set up on the UMTS network, a data service suspended during fallback from the LTE network to the UMTS network may be resumed on the UMTS network.

Then, if the voice call of the UE ends, the UE returns to the LTE network. In an implementation, if the UE has a data service, the data service is restored on the LTE network.

Further, in an implementation, after receiving the first message from the network side in S102, the UE obtains the first information in the first message, to obtain the incoming call number. In an implementation, the UE may store the first information or the incoming call number. Further, the method may further include S106.

S106. The UE displays the incoming call number.

Figure 8A:
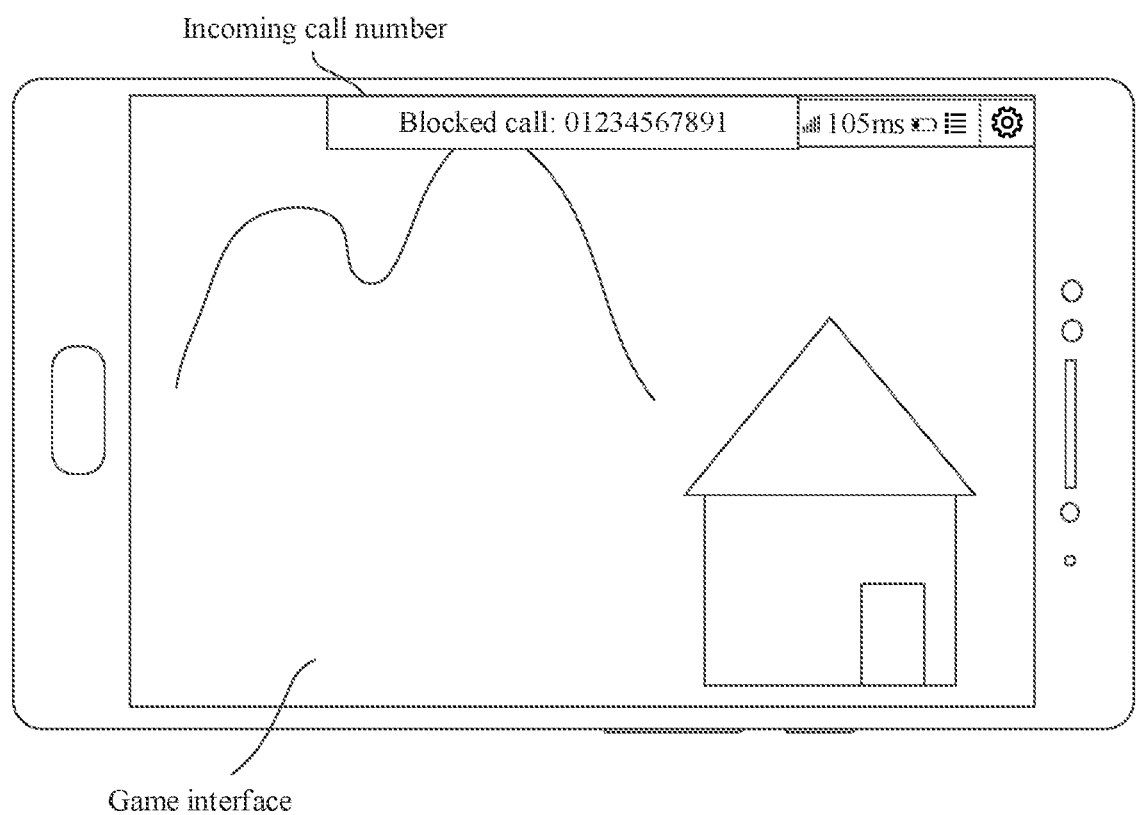
FIG. 8*a* is a schematic diagram 12 of an instance of a display interface of user equipment according to an embodiment of this application.

In an implementation, the UE may immediately display the incoming call number on an interface when obtaining the incoming call number in S102. For example, the UE performs a real-time game service through an LTE network resource, a display interface of the UE is a game interface, and the UE displays an interface shown in FIG. 7. In a process of performing the real-time game service, the UE receives a call request (for example, S102 is performed, and the UE receives the first message from the network side) as a called party, and the UE displays the incoming call number on the game interface. For example, the UE displays an interface shown in FIG. 8*a*.

Figure 8B:
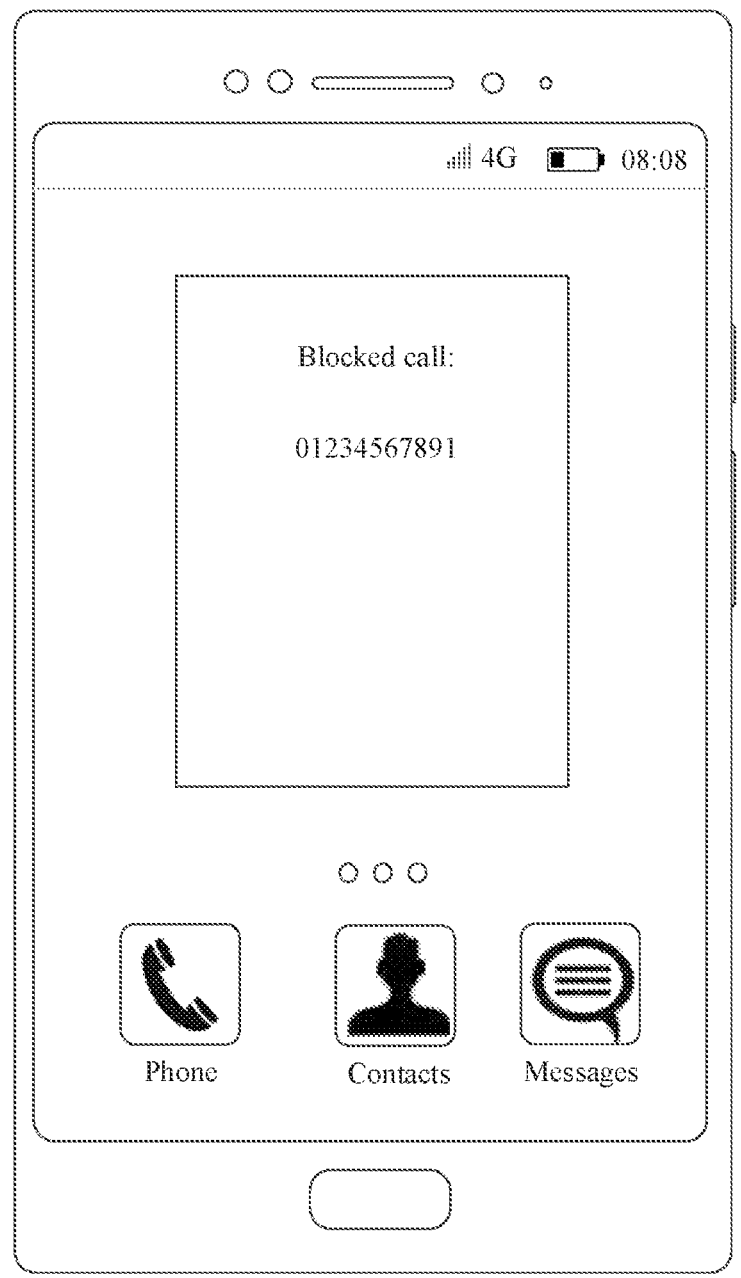
FIG. 8*b* is a schematic diagram 13 of an instance of a display interface of user equipment according to an embodiment of this application.

In an implementation, when the preset condition is that the UE is in the mode of automatically rejecting a CSFB incoming call, if the UE determines to exit the mode of automatically rejecting a CSFB incoming call, the incoming call number is displayed on the display interface. For example, the UE performs a real-time game service through an LTE network resource, the UE is in the mode of automatically rejecting a CSFB incoming call, a display interface of the UE is a game interface, and the UE displays an interface shown in FIG. 7. In a process of performing the real-time game service, the UE receives a call request (for example, S102 is performed, and the UE receives the first message from the network side) serves as a called party, and the UE still displays the game interface shown in FIG. 7. When the UE exits the real-time game service, the incoming call number rejected in the process of performing the real-time game service is displayed on the display interface. For example, the UE displays an interface shown in FIG. 8*b*.

A manner in which the UE exits the mode of automatically rejecting a CSFB incoming call may include:

1. The UE receives a second operation of the user, and sets, in response to the second operation, the UE to exit the mode of automatically rejecting a CSFB incoming call. The second operation may be a gesture that is set by the user for exiting the mode of automatically rejecting a CSFB incoming call, or may be selecting a button by the user to exit the mode of automatically rejecting a CSFB incoming call, or may be tapping a button by the user to exit the mode of automatically rejecting a CSFB incoming call. This is not limited in this embodiment of this application.

For example, the second operation may be tapping, by the user, the selection button 601 on the display interface shown in FIG. 6b, to exit the mode of automatically rejecting a CSFB incoming call. For example, when the selection button 601 is slid to the left side, it indicates that the mode of automatically rejecting a CSFB incoming call is disabled.

2. The UE determines, based on whether the UE has a real-time packet switched data service, whether the UE exits the mode of automatically rejecting a CSFB incoming call. If the UE determines that the UE does not have a real-time packet switched data service, the UE is set to be not in the mode of automatically rejecting a CSFB incoming call. In an implementation, the UE determines whether the UE has a real-time game service, and further determines whether the UE exits the mode of automatically rejecting a CSFB incoming call. If it is determined that no game application in the game application list is started, it is determined that the UE does not perform a real-time game service. For example, an operating system of the UE may determine that the UE does not have the real-time game service, and notify an application layer of the UE that the UE does not have the real-time game service. The application layer of the UE notifies a NAS of the UE that the UE does not have the real-time game service, and the NAS of the UE may further determine that the UE exits the mode of automatically rejecting a CSFB incoming call.

3. The UE determines, based on real-time traffic, whether the UE exits the mode of automatically rejecting a CSFB incoming call. For example, the UE sets a traffic threshold. If it is detected that the real-time traffic of the UE is less than or equal to the traffic threshold, the UE is set to be not in the mode of automatically rejecting a CSFB incoming call.

In an implementation, if the UE determines to exit the mode of automatically rejecting a CSFB incoming call, the UE sets the mode identifier to 0, to indicate that the UE is not in the mode of automatically rejecting a CSFB incoming call.

In an implementation, if the UE determines to exit the mode of automatically rejecting a CSFB incoming call, the UE displays, on the interface, all incoming call numbers stored by the UE in the mode of automatically rejecting a CSFB incoming call. In this way, after the UE exits the mode of automatically rejecting a CSFB incoming call, the user can view a missed incoming call.

Figures 1, 9:
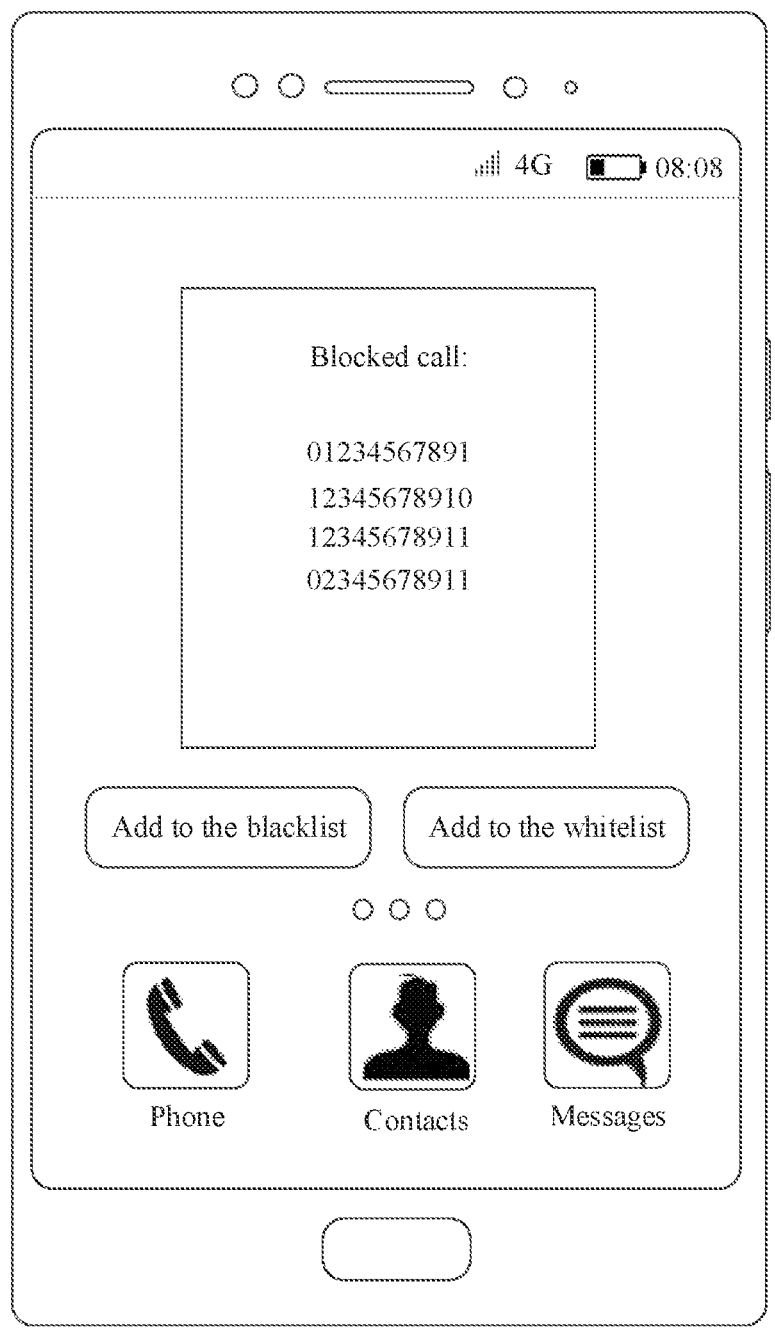
Figures 2, 9:
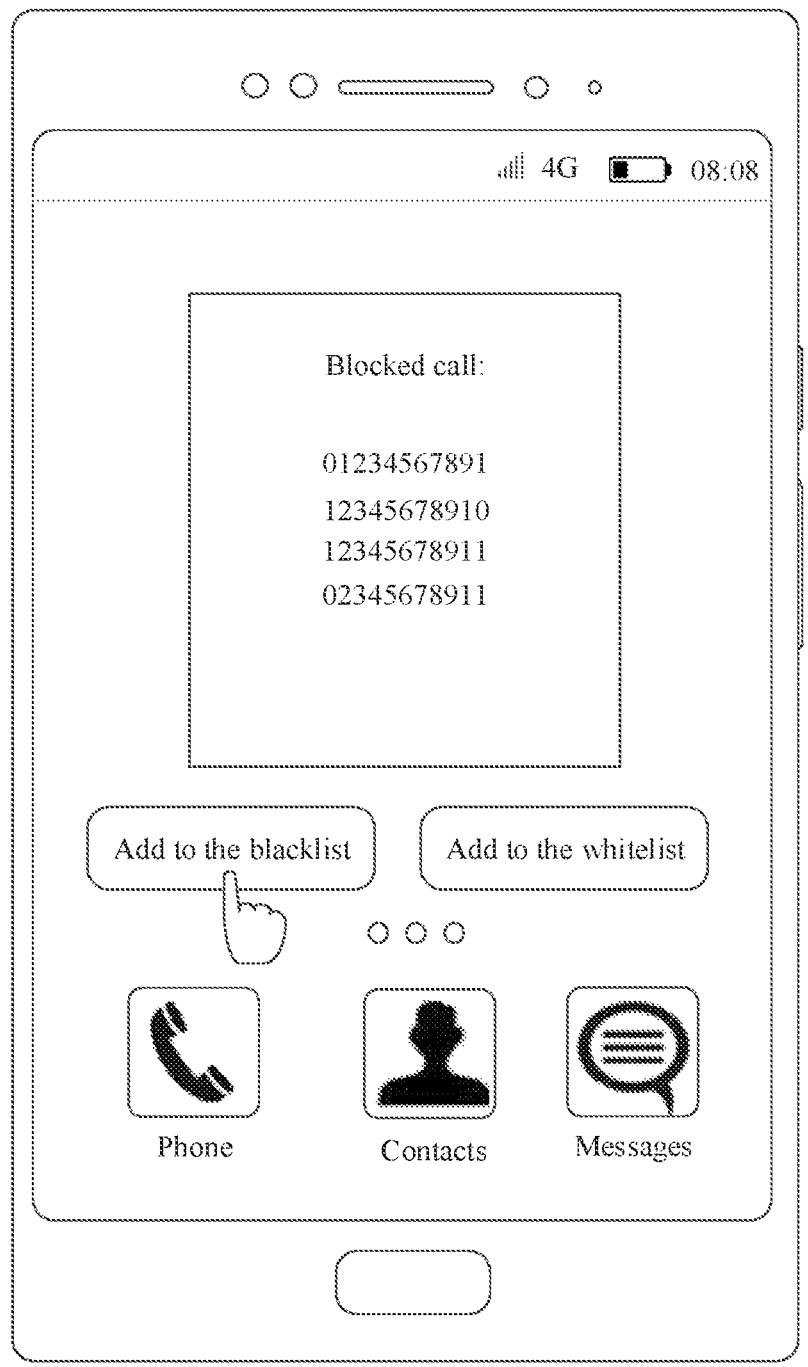
Figures 3, 9:
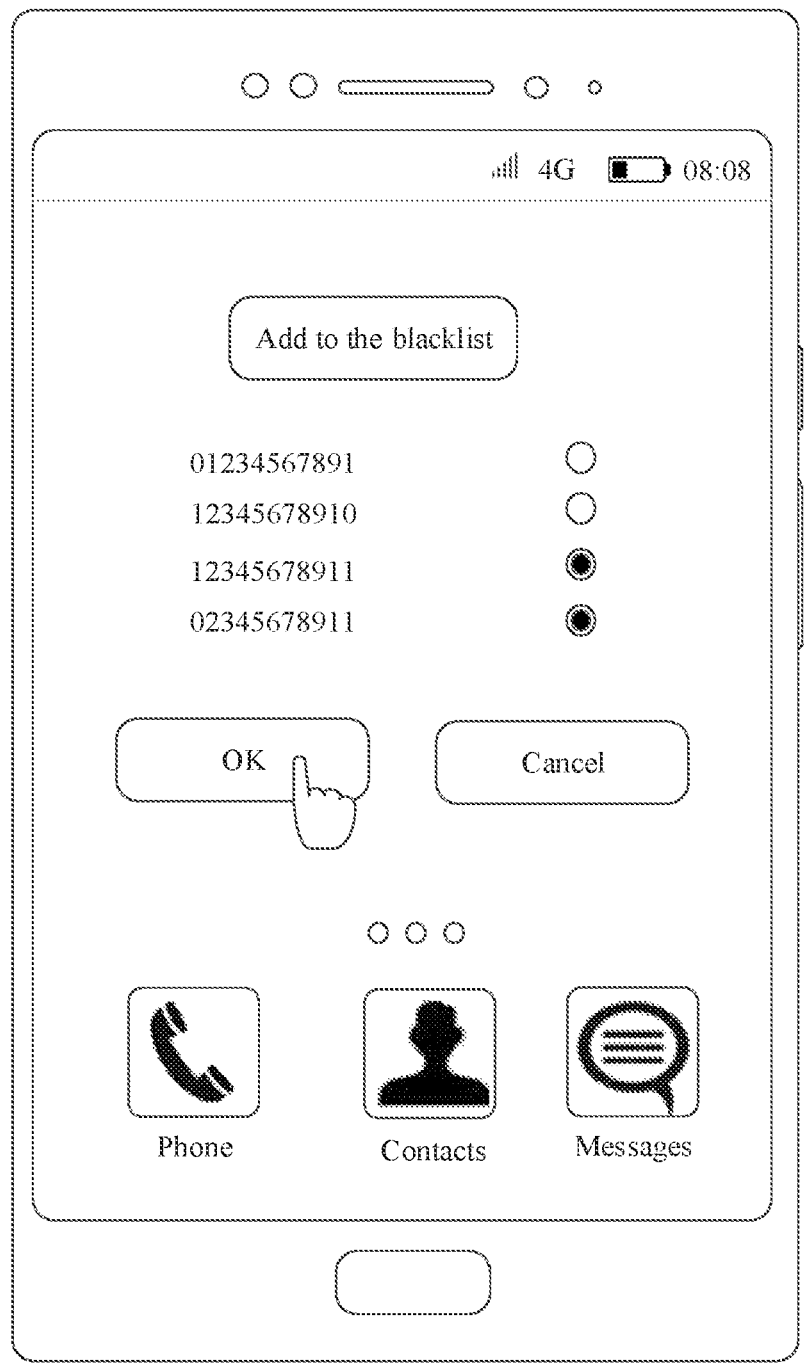
Figures 4, 9:
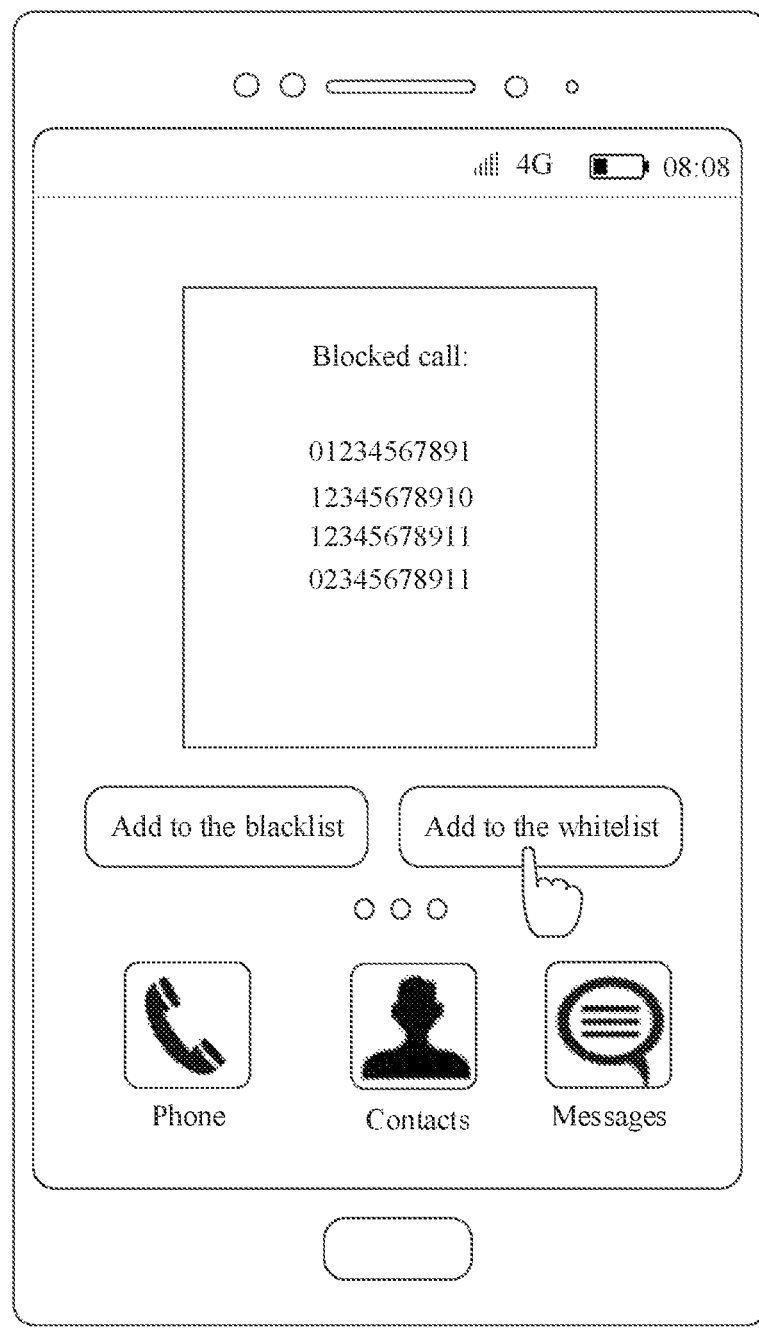
Figures 5, 9:
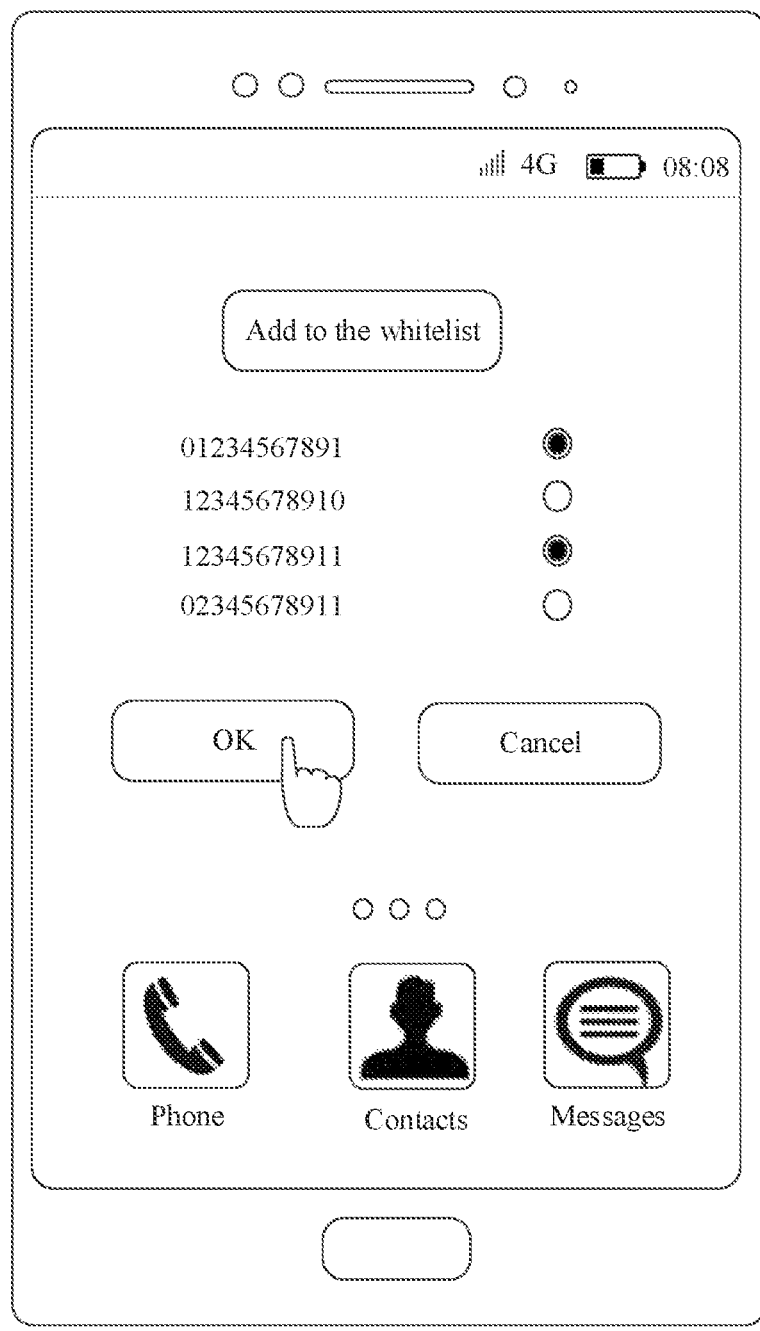

In an implementation, the UE determines to exit the mode of automatically rejecting a CSFB incoming call, displays, on the interface, all incoming call numbers stored by the UE in the mode of automatically rejecting a CSFB incoming call, and adds some or all of the displayed incoming call numbers to the blacklist or the whitelist based on the user's selection operation. For example, after exiting the mode of automatically rejecting a CSFB incoming call, the UE displays an interface shown in FIG. 9-1. If the user chooses to add an incoming call number to the blacklist, for example, as shown in FIG. 9-2, if the UE detects that the user selects an option "add to the blacklist", the UE performs a step of adding an incoming call number to the blacklist. For example, as shown in FIG. 9-3, on a display interface of adding an incoming call number to the blacklist, the UE detects that the user selects two phone numbers 12345678911 and 02345678911 and selects an option "OK". Then, the UE adds the two phone numbers 12345678911 and 02345678911 to the blacklist. If the user chooses to add an incoming call number to the whitelist, for example, as shown in FIG. 9-4, if the UE detects that the user selects an option "add to the whitelist", the UE performs a step of adding an incoming call number to the whitelist. For example, as shown in FIG. 9-5, on a display interface of adding an incoming call number to the whitelist, the UE detects that the user selects two phone numbers 01234567891 and 12345678911 and selects an option "OK". Then, the UE adds the two phone numbers 01234567891 and 12345678911 to the whitelist.

Further, after exiting the mode of automatically rejecting a CSFB incoming call, if the UE receives the first message from the network side, in an implementation, the UE may perform, according to the communications method provided in this application, the steps S102 to S105 shown in FIG. 5, and perform a CSFB process based on whether the preset condition that the incoming call number is restricted is met. Alternatively, in another implementation, the method shown in FIG. 4 may be performed to perform a CSFB process. This is not limited in this application.

According to the communications method provided in this embodiment of this application, after receiving, on the LTE network from the network side, the message indicating to perform the CSFB, the UE parses the incoming call number in the message, and directly replies, on the LTE network to the network side based on the preset condition, that CSFB is performed or that the CSFB is rejected. Compared with a method in which after receiving, from the network side, the message indicating to perform the CSFB, the UE replies, to the network side, that the CSFB is accepted, the UE then falls back from the LTE network to the UMTS network, accesses a UMTS cell, and determines, based on the phone number in the incoming call request, whether to answer the call, according to the communications method provided in this embodiment of this application, after receiving the message indicating to perform the CSFB, the UE can immediately and quickly determine whether to reject the incoming call without falling back to the UMTS. If it is determined to reject the incoming call, the UE replies, on the LTE network to the network side, that the CSFB is rejected. In a scenario in which the UE rejects the incoming call, compared with a processing method of falling back to the UMTS, according to the communications method provided in this embodiment of this application, the UE can more quickly determine to reject the incoming call, to avoid that a latency caused by fallback of the UE to the UMTS affects the packet switched data service of the UE. In this way, a short interruption of the packet switched data service caused by automatically rejecting an incoming call can be eliminated, and surfing experience of the user can be improved.

Figure 10:
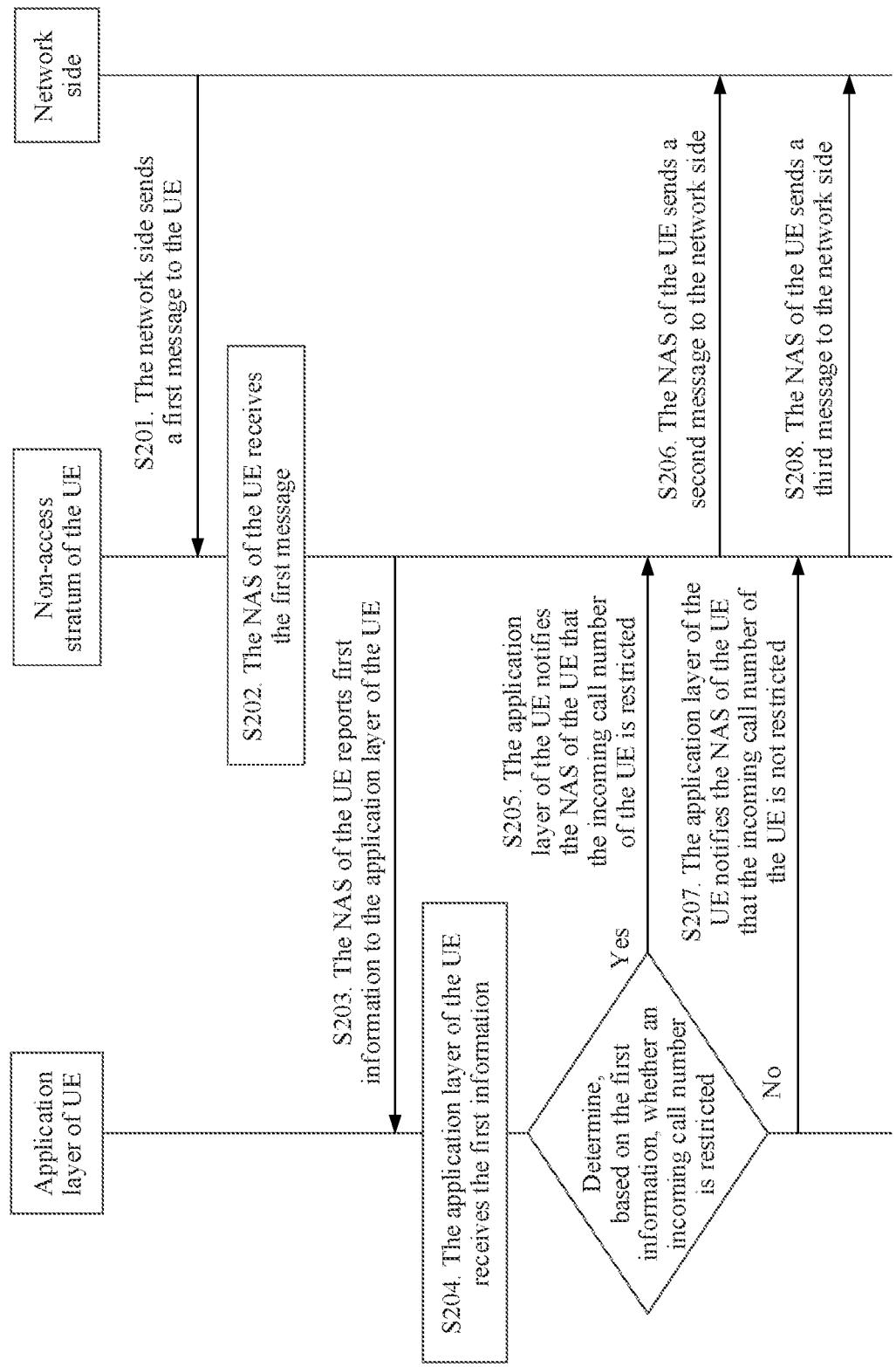
FIG. 10 is a schematic diagram 4 of a communications method according to an embodiment of this application.

An embodiment of this application provides a communications method, and the communications method may be applied to the systems or devices shown in FIG. 1 to FIG. 3. As shown in FIG. 10, the method may include S201 to S208.

S201. A network side sends a first message to UE.

For a specific description of S201, refer to S101. Details are not described herein again.

S202. A NAS of the UE receives the first message.

The NAS of the UE in connected mode receives the first message, and parses the first message to obtain first information, so as to obtain an incoming call number.

S203. The NAS of the UE reports the first information to an application layer of the UE.

The NAS of the UE reports the obtained first information to the application layer of the UE.

S204. The application layer of the UE receives the first information. If it is determined that the incoming call number is restricted, S205 is performed. If it is determined that the incoming call number is not restricted, S207 is performed.

The application layer of the UE determines, based on the first information, whether the incoming call number is restricted. If the incoming call number is restricted, S205 is performed to notify the NAS of the UE that the incoming call number is restricted. If the incoming call number is not restricted, S207 is performed to notify the NAS of the UE that the incoming call number is not restricted.

For a method in which the application layer of the UE determines whether the incoming call number is restricted, refer to the description in S103. Details are not described herein again.

S205. The application layer of the UE notifies the NAS of the UE that the incoming call number of the UE is restricted.

S206. The NAS of the UE sends a second message to the network side.

For a specific description of S206, refer to S104. Details are not described herein again.

S207. The application layer of the UE notifies the NAS of the UE that the incoming call number of the UE is not restricted.

S208. The NAS of the UE sends a third message to the network side.

For a specific description of S208, refer to S105. Details are not described herein again.

According to the communications method provided in this embodiment of this application, after receiving, on the LTE network from the network side, the message indicating to perform the CSFB, the UE parses the incoming call number in the message, and directly replies, to the network side if the incoming call number is restricted, that the CSFB is rejected. Compared with the prior art in which after receiving, from the network side, the message indicating to perform the CSFB, the UE replies, to the network side, that the CSFB is accepted, the UE then falls back from the LTE network to the UMTS network, accesses a UMTS cell, and rejects the incoming call, according to the communications method provided in this embodiment of this application, after receiving the message indicating to perform the CSFB, the UE can immediately and quickly determine whether to answer the incoming call without falling back to the UMTS. If it is determined to reject the incoming call, the UE replies, on the LTE network to the network side, that the CSFB is rejected. In a scenario in which the UE rejects the incoming call, compared with a prior-art method, according to the communications method provided in this embodiment of this application, the UE can more quickly determine to reject the incoming call, to avoid that a latency caused by fallback of the UE to the UMTS affects a packet switched data service of the UE. In this way, a short interruption of the packet switched data service caused by rejection of an incoming call can be eliminated, and surfing experience of a user can be improved.

Figure 11A:
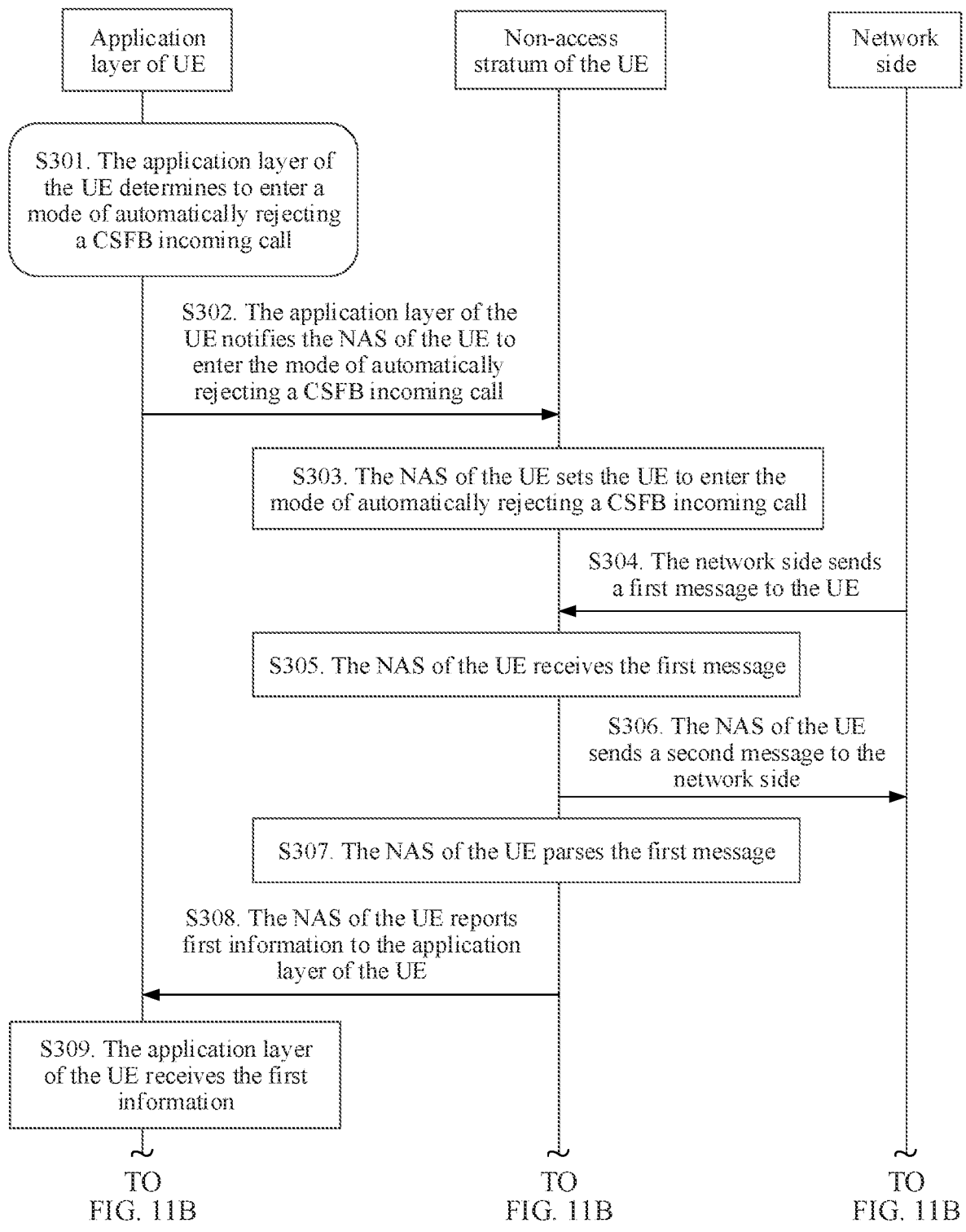
FIG. 11A and FIG. 11B are a schematic diagram 5 of a communications method according to an embodiment of this application.

An embodiment of this application provides a communications method, and the communications method may be applied to the systems or devices shown in FIG. 1 to FIG. 3. As shown in FIG. 11A and FIG. JI B, the method may include S301 to S309.

S301. An application layer of UE determines to enter a mode of automatically rejecting a CSFB incoming call.

For a specific method in which the application layer of the UE determines to enter the mode of automatically rejecting a CSFB incoming call, refer to the method in which the UE determines to enter the mode of automatically rejecting a CSFB incoming call in S103. Details are not described herein again.

For example, an operating system of the UE may determine and notify the application layer of the UE that the UE has a real-time game service. The application layer of the UE determines that the UE enters the mode of automatically rejecting a CSFB incoming call.

S302. An application layer of the UE notifies a NAS of the UE to enter the mode of automatically rejecting a CSFB incoming call.

S303. The NAS of the UE sets the UE to enter the mode of automatically rejecting a CSFB incoming call.

For example, the NAS of the UE sets a mode identifier to indicate that the UE is currently in the mode of automatically rejecting a CSFB incoming call. For example, when the mode identifier is set to 1, it indicates that the UE is in the mode of automatically rejecting a CSFB incoming call; or when the mode identifier is set to 0, it indicates that the UE is not in the mode of automatically rejecting a CSFB incoming call. In this case, the mode identifier is set to 1.

S304. A network side sends a first message to the UE.

The network side sends the first message to the UE on an LTE network. For a specific description of sending the first message to the UE by the network side, refer to S101. Details are not described herein again.

S305. The NAS of the UE receives the first message.

For example, the NAS of the UE in connected mode receives the first message.

S306. The NAS of the UE sends a second message to the network side.

The NAS of the UE determines that the UE is in the mode of automatically rejecting a CSFB incoming call, and the NAS of the UE sends the second message to the network side. For a specific description of sending the second message to the network side, refer to S104. Details are not described herein again.

S307. The NAS of the UE parses the first message.

The NAS of the UE parses the first message to obtain first information, so as to obtain an incoming call number.

It should be noted that a sequence of S306 and S307 is not limited in this embodiment of this application.

S308. The NAS of the UE reports the first information to the application layer of the UE.

S309. The application layer of the UE receives the first information.

In an implementation, after receiving the first information, the application layer of the UE may buffer the first information.

In another implementation, after receiving the first information, the application layer of the UE may display the obtained incoming call number on a display interface of the UE.

Further, the method may further include S310 to S313.

S310. The application layer of UE determines to exit the mode of automatically rejecting a CSFB incoming call.

For a specific method in which the application layer of the UE determines to exit the mode of automatically rejecting a CSFB incoming call, refer to the method in which the UE determines to exit the mode of automatically rejecting a CSFB incoming call in S103. Details are not described herein again.

For example, the operating system of the UE may determine and notify the application layer of the UE that the UE exits the real-time game service and does not have the real-time game service. The application layer of the UE determines that the UE exits the mode of automatically rejecting a CSFB incoming call.

S311. The application layer of the UE notifies the NAS of the UE to exit the mode of automatically rejecting a CSFB incoming call.

S312. The NAS of the UE sets the UE to exit the mode of automatically rejecting a CSFB incoming call.

For example, the NAS of the UE sets the mode identifier to indicate that the UE is currently not in the mode of automatically rejecting a CSFB incoming call. For example, when the mode identifier is set to 1, it indicates that the UE is in the mode of automatically rejecting a CSFB incoming call; or when the mode identifier is set to 0, it indicates that the UE is not in the mode of automatically rejecting a CSFB incoming call. In this case, the mode identifier is set to 0.

S313. The application layer of the UE displays the incoming call number.

The application layer of the UE displays, based on the first information buffered in S309, the incoming call number rejected by the UE in the mode of automatically rejecting a CSFB incoming call.

Further, the method may further include S314 to S316.

S314. The network side sends a first message to the UE.

The network side sends the first message to the UE on the LTE network. For a specific description of sending the first message to the UE by the network side, refer to S101. Details are not described herein again.

S315. The NAS of the UE receives the first message.

For example, the NAS of the UE in connected mode receives the first message.

S316. The NAS of the UE sends a third message to the network side.

The NAS of the UE determines that the UE is not in the mode of automatically rejecting a CSFB incoming call, and the NAS of the UE sends the third message to the network side. For a specific description of sending the third message by the UE to the network side, refer to S105. Details are not described herein again.

Then, both the UE and the network side perform a CSFB process to fall back a voice service of the UE to a UMTS network for processing. For example, step 3 to step 7a shown in FIG. 4 may be performed.

Then, if the voice call of the UE ends, the UE returns to the LTE network.

According to the communications method provided in this embodiment of this application, when the UE receives, on the LTE network from the network side, the message indicating to perform the CSFB, if the UE is in the mode of automatically rejecting a CSFB incoming call, the UE directly replies, on the LTE network to the network side, that the CSFB is rejected. Compared with the prior art in which after receiving, from the network side, the message indicating to perform the CSFB, the UE replies, to the network side, that the CSFB is accepted, the UE then falls back from the LTE network to the UMTS network, accesses a UMTS cell, and rejects the incoming call, according to the communications method provided in this embodiment of this application, after receiving the message indicating to perform the CSFB, the UE can quickly reply, on the LTE network to the network side without falling back to the UMTS, that the CSFB is rejected. Compared with a prior-art method, according to the communications method provided in this embodiment of this application, the UE can more quickly determine to reject the incoming call, to avoid that a latency caused by fallback of the UE to the UMTS affects a packet switched data service of the UE. In this way, a short interruption of the packet switched data service caused by rejection of an incoming call can be eliminated, and surfing experience of a user can be improved. In addition, when exiting the mode of automatically rejecting a CSFB incoming call, an incoming call number rejected by the UE in the mode of automatically rejecting a CSFB incoming call may be displayed on the interface, to notify the user of a missed call.

The following describes, with reference to an application scenario and beneficial effects of the embodiments of this application, the communications method provided in the embodiments of this application.

Scenario 1:

A user starts a real-time game application on UE, and the UE enters a mode of automatically rejecting a CSFB incoming call. In a process in which the UE performs a real-time game service through an LTE network resource, a display interface of the UE is a game interface, and the UE displays an interface shown in FIG. 7. A network latency is displayed in the upper right corner of the interface shown in FIG. 7, and indicates quality of network communication between the UE and a game server. A smaller network latency indicates better quality of network communication between the UE and the game server and better user experience. For example, the network latency in FIG. 7 is 60 ms, and it indicates that the quality of network communication between the UE and the game server is good. In this case, the user plays the game smoothly, and no frame freezing occurs.

Figure 12A:
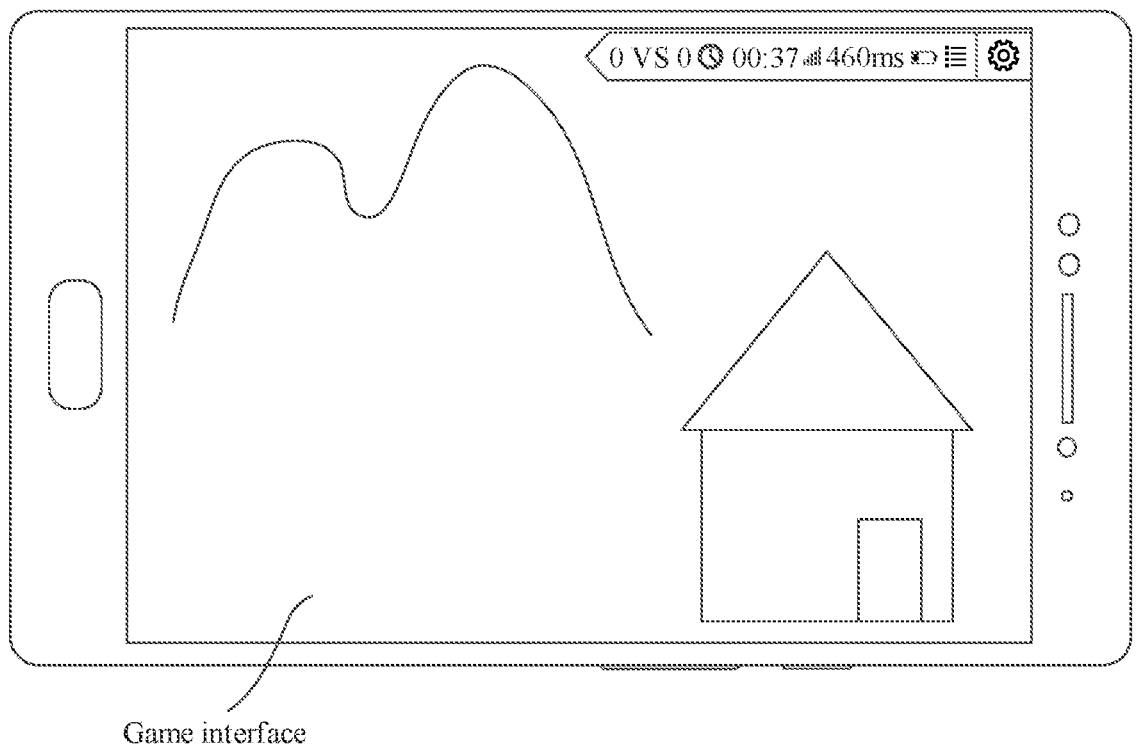
FIG. 12a is a schematic diagram 19 of an instance of a display interface of user equipment according to an embodiment of this application.

During a real-time game, the UE receives a call request as a called party. If a method of falling back to a UMTS (for example, 3G WCDMA) to perform a CSFB process is used, the UE falls back from an LTE network to the UMTS, rejects an incoming call after accessing a UMTS cell, and then returns to the LTE network, and the real-time gaming service of the UE is interrupted for a short period of time. For example, after receiving the call request, the UE displays an interface shown in FIG. 12a. A network latency in FIG. 12a is 460 ms, and it indicates that quality of network communication between the UE and the game server is very poor. In this case, the user cannot play the game, and frame freezing occurs on the game interface. After short freezing (for example, 3 s to 5 s), the UE displays the interface shown in FIG. 7. In this case, the user plays the game smoothly, and no frame freezing occurs.

Figure 12B:
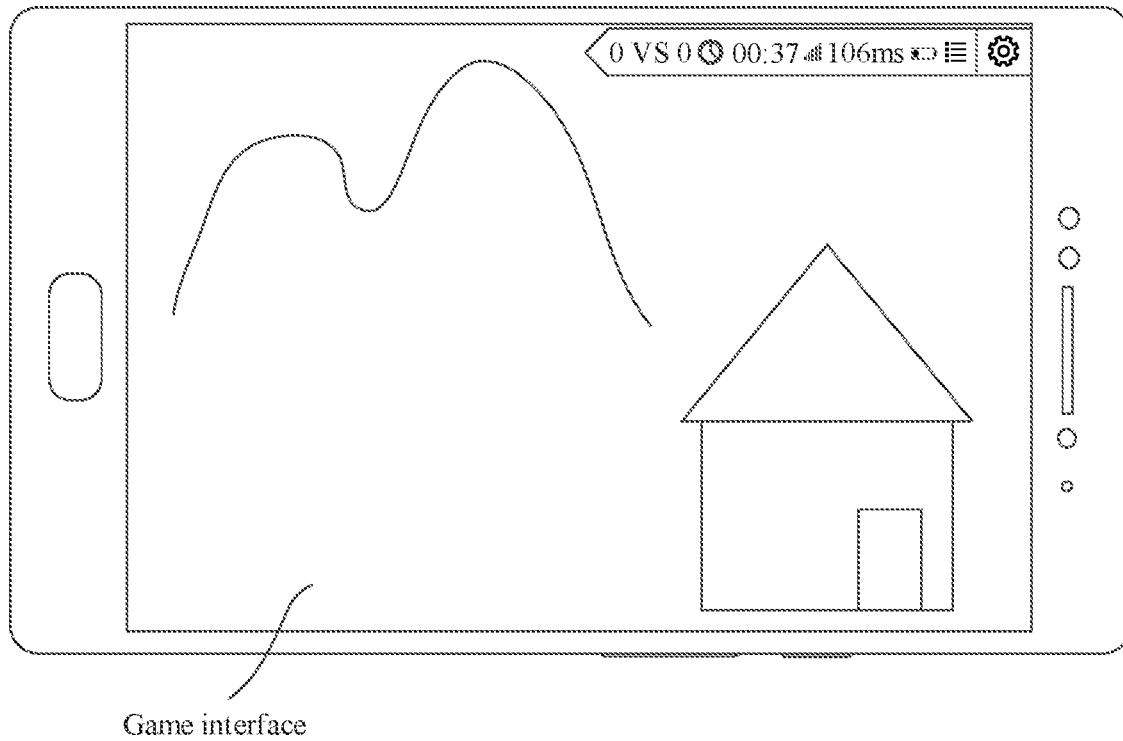
FIG. 12b is a schematic diagram 20 of an instance of a display interface of user equipment according to an embodiment of this application.

If the communications method provided in this application is used, the UE is in the mode of automatically rejecting a CSFB incoming call. After receiving the call request as a called party, the UE directly rejects the incoming call on the LTE network. For example, after receiving the call request, the UE displays an interface shown in FIG. 12b. A network latency in FIG. 12b is 106 ms, and it indicates that quality of network communication between the UE and the game server is relatively good. In this case, the user plays the game smoothly, and no frame freezing occurs.

Figure 13A:
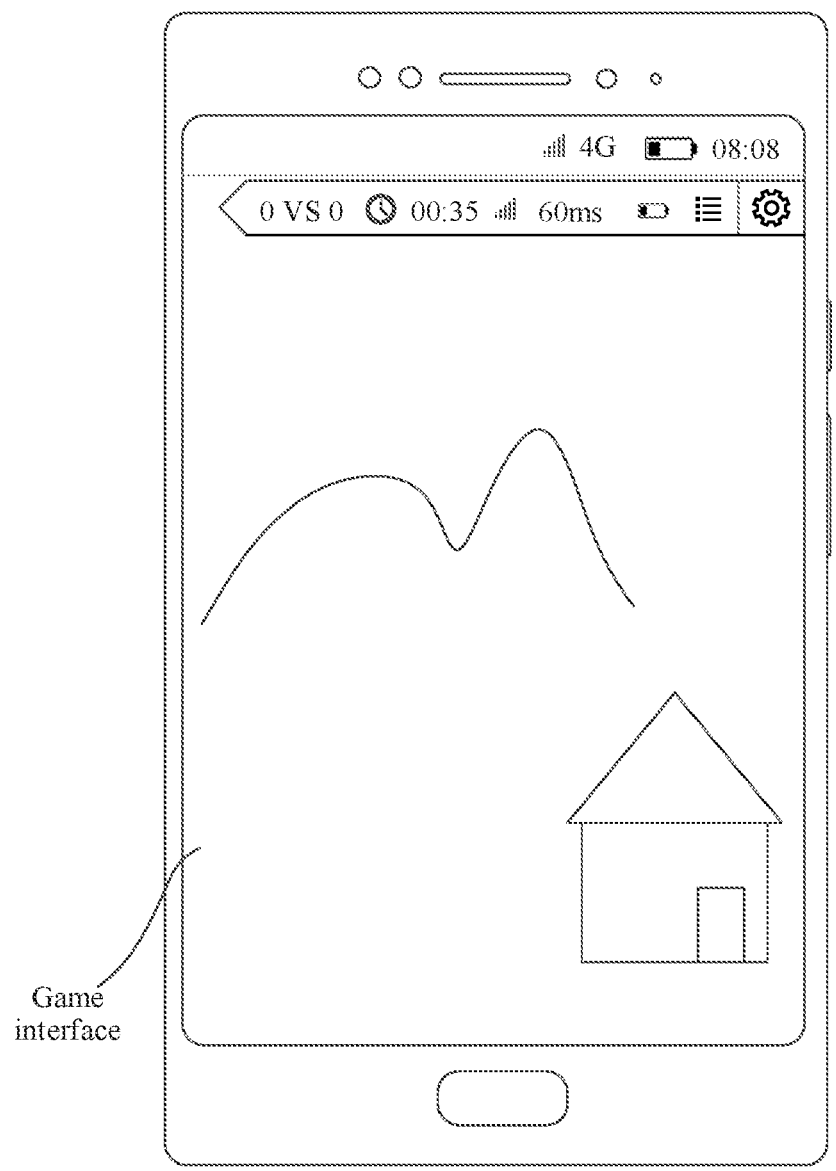
FIG. 13a is a schematic diagram 21 of an instance of a display interface of user equipment according to an embodiment of this application.

Scenario 2:

A user starts a real-time game application on UE, and the UE enters a mode of automatically rejecting a CSFB incoming call. In a process in which the UE performs a real-time game service by using an LTE network resource, a display interface of the UE is a game interface, the UE displays an interface shown in FIG. 13a, and the upper right corner of the interface shown in FIG. 13a indicates that a currently used network is a 4G network.

Figure 13B:
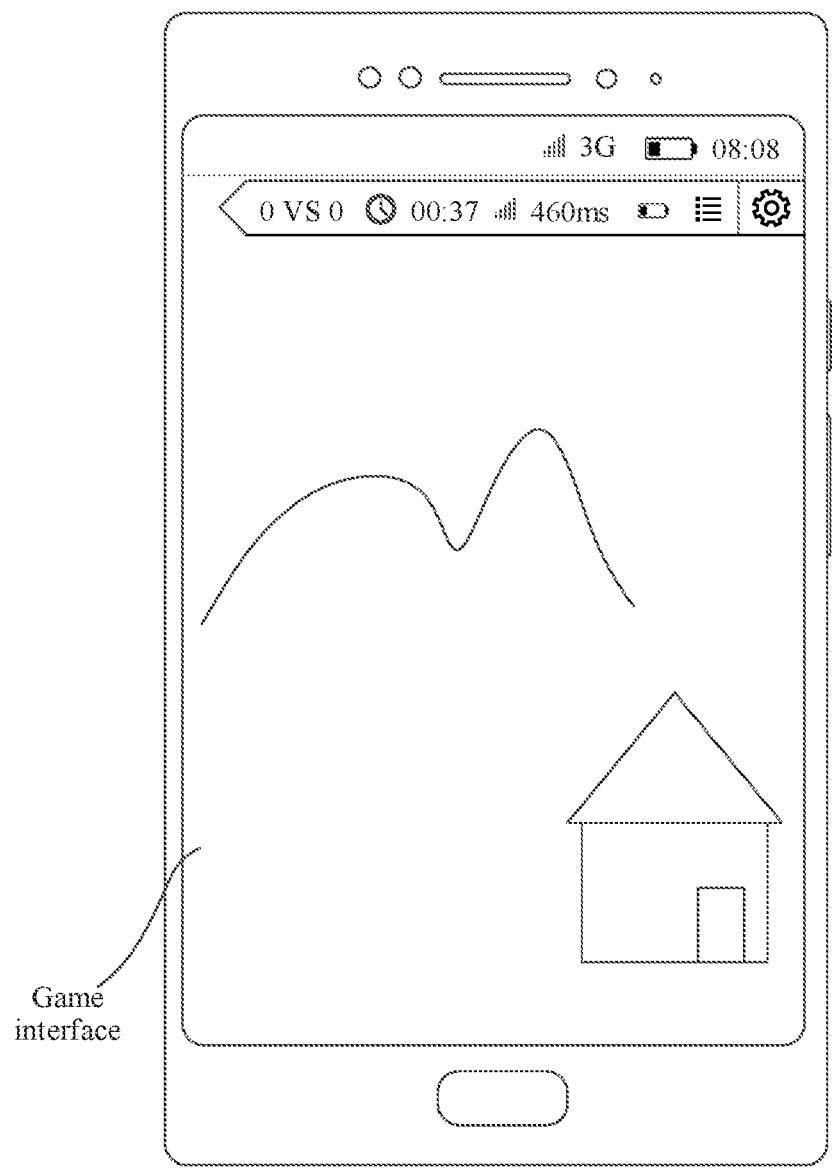
FIG. 13b is a schematic diagram 22 of an instance of a display interface of user equipment according to an embodiment of this application.

During a real-time game, the UE receives a call request as a called party. If a method of falling back to a UMTS (for example, 3G WCDMA) to perform a CSFB process is used, the UE receives the call request on an LTE network, and displays the interface shown in FIG. 13a. The upper right corner of the interface indicates that the currently used network is the 4G network. Then, the network falls back to the UMTS. After accessing a UMTS cell, the UE rejects an incoming call. In this process, the UE displays an interface shown in FIG. 13b, and the upper right corner of the interface indicates that a currently used network is a 3G network. Then, the UE returns to the LTE network, and displays the interface shown in FIG. 13a. The upper right corner of the interface shows that a currently used network is 4G.

Figure 13C:
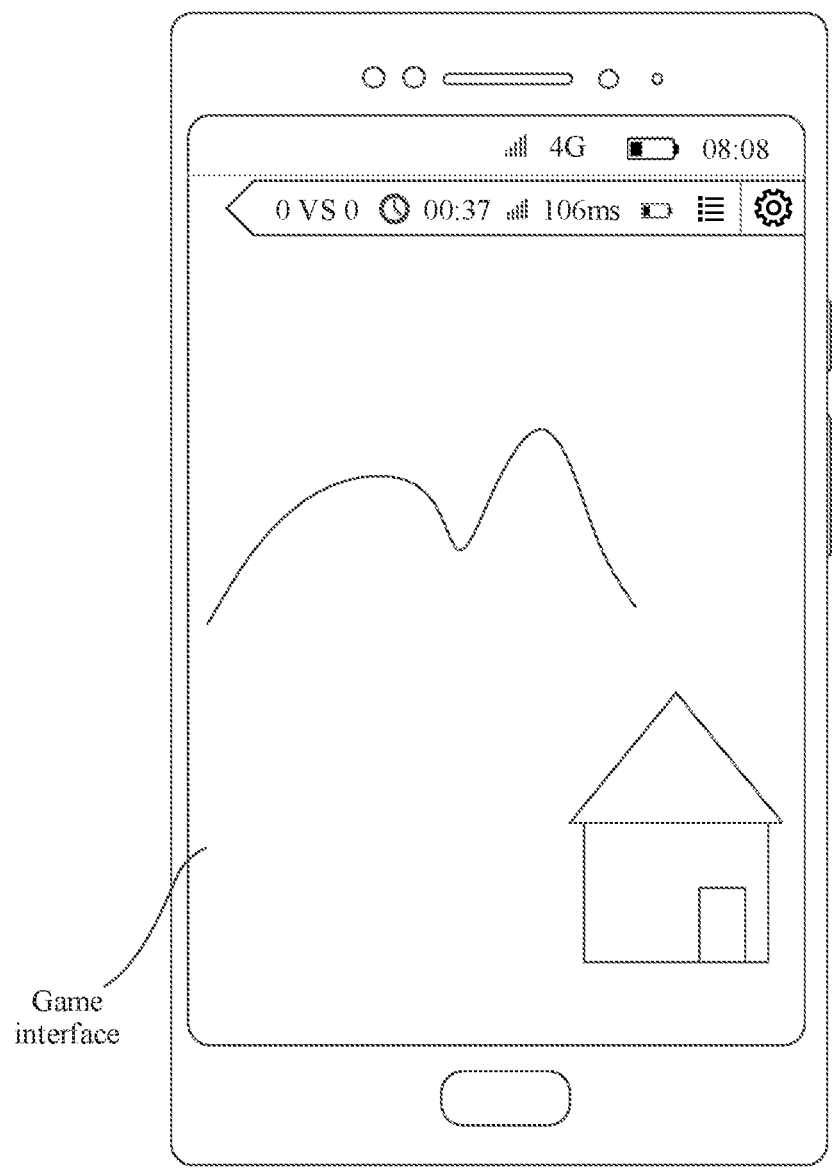
FIG. 13c is a schematic diagram 23 of an instance of a display interface of user equipment according to an embodiment of this application.

If the communications method provided in this application is used, the UE is in the mode of automatically rejecting a CSFB incoming call. After receiving the call request as a called party, the UE directly rejects the incoming call on the LTE network. For example, in a process from receiving the call request by the UE to rejecting the incoming call by the UE, the UE displays an interface shown in FIG. 13c, and the upper right corner of the interface indicates that a currently used network is 4G. The interface on which the upper right corner indicates that a currently used network is 3G shown in FIG. 13b does not appear.

Scenario 3:

A user intends to watch a live network broadcast, and to avoid being disturbed by a nuisance call, the user sets UE to be in a mode of automatically rejecting a CSFB incoming call. For example, on the display interface shown in FIG. 6a, the user taps the selection button 601, and slides the selection button 601 to the right side to enable the mode of automatically rejecting a CSFB incoming call.

Figure 14A:
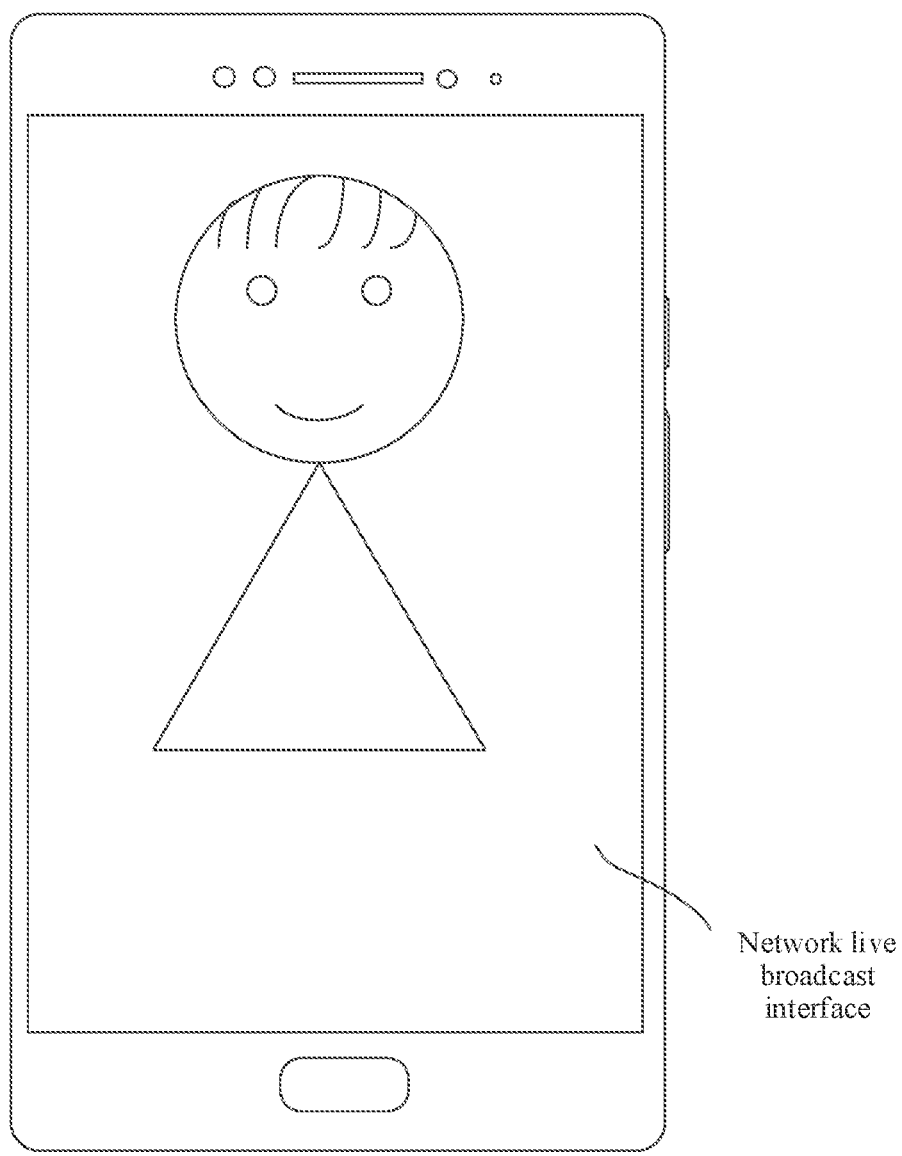
FIG. 14a is a schematic diagram 24 of an instance of a display interface of user equipment according to an embodiment of this application.

When the user watches the network live broadcast, the UE displays a network live broadcast interface shown in FIG. 14a. When network quality is good, pictures on the network live broadcast interface are smooth, and no frame freezing occurs.

Figure 14B:
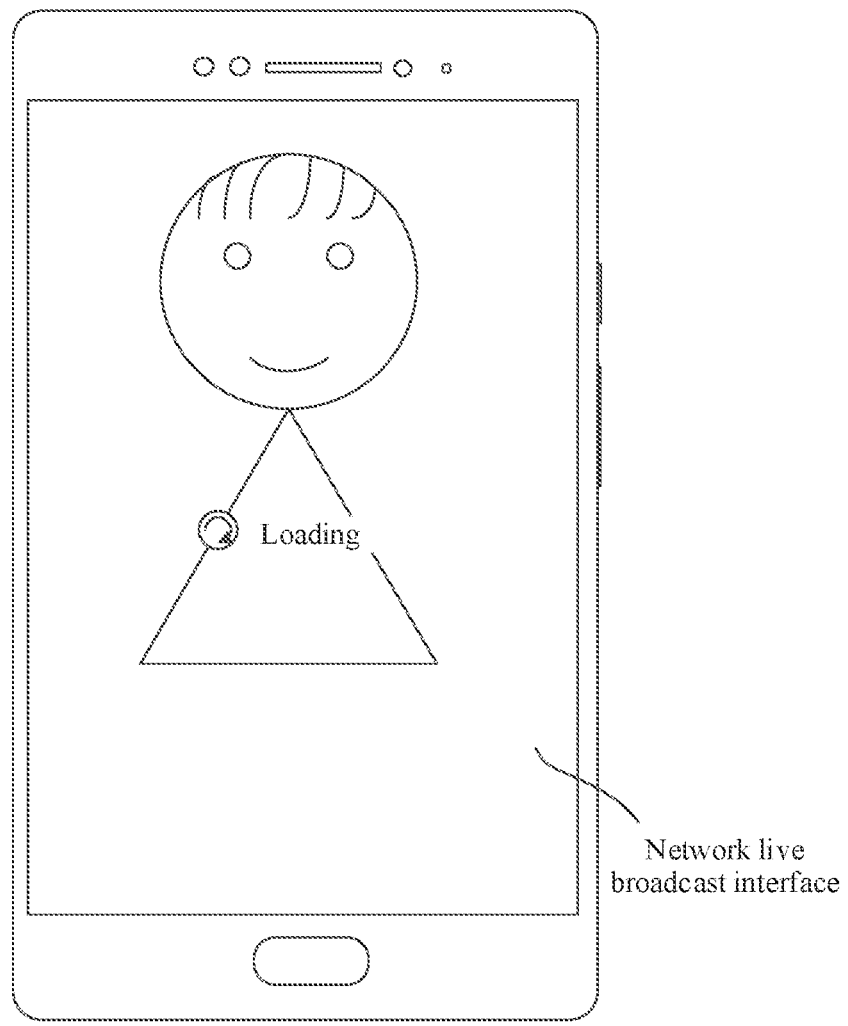
FIG. 14b is a schematic diagram 25 of an instance of a display interface of user equipment according to an embodiment of this application.

In a process in which the user watches the network live broadcast, the UE receives a call request as a called party. If a method of falling back to a UMTS (for example, 3G WCDMA) to perform a CSFB process is used, the UE falls back from an LTE network to the UMTS, rejects an incoming call after accessing a UMTS cell, and then returns to the LTE network, and a network live broadcast service of the UE is interrupted for a short period of time. For example, after receiving the call request, the UE displays an interface shown in FIG. 14b, the network live broadcast interface pauses, and an icon "loading" appears. After short freezing (for example, 3 s to 5 s), the UE resumes displaying the interface shown in FIG. 14a, and the user may continue to watch the network live broadcast smoothly.

If the communications method provided in this application is used, the UE is in the mode of automatically rejecting a CSFB incoming call. After receiving the call request as a called party, the UE directly rejects the incoming call on the LTE network. The UE may watch the network live broadcast smoothly on the interface shown in FIG. 14a, and the interface shown in FIG. 14b does not appear.

Further, in an implementation, in the methods described in the foregoing embodiments and scenarios, the UE that performs the foregoing methods may be UE including one SIM (Subscriber Identification Module) card. The SIM card of the UE works on an LTE network resource, and is used to process both a circuit switched service and a packet switched data service. After receiving, on an LTE network, a message indicating to perform CSFB, the UE does not fall back to a UMTS, and immediately and quickly determines whether to answer an incoming call, to eliminate a short interruption of the packet switched data service caused by rejection of the incoming call.

In another implementation, in the methods described in the foregoing embodiments and scenarios, the UE that performs the foregoing methods may be UE including two SIM cards and may be UE including a dual SIM dual standby mode. A card 1 of the UE is a primary card and works on the LTE network to process a packet switched data service. A card 2 is a secondary card, works on a non-LTE network resource, for example, works on a 3G network resource to process a circuit switched service. The circuit switched service of the card 2 may be forwarded, according to a user instruction, to the card 1 for processing. In this way, because the card 1 works on the LTE network resource, after receiving, on the LTE network, a message indicating to perform CSFB, the communications method provided in this application may be used, and the UE does not fall back to a UMTS. Instead, the UE immediately and quickly determines whether to answer an incoming call on the LTE network, to eliminating a short interruption of the packet switched data service caused by rejection of the incoming call.

Figure 15A:
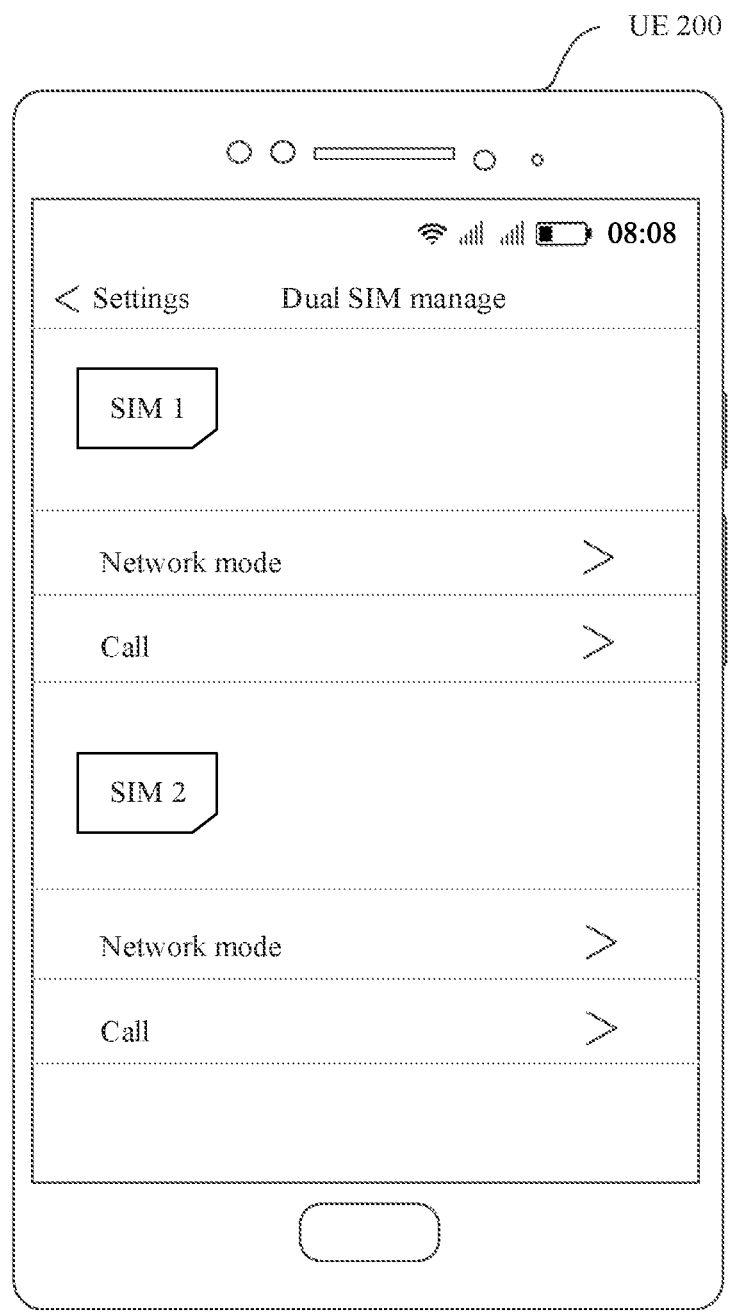
FIG. 15a is a schematic diagram 26 of an instance of a display interface of user equipment according to an embodiment of this application.
Figure 15B:
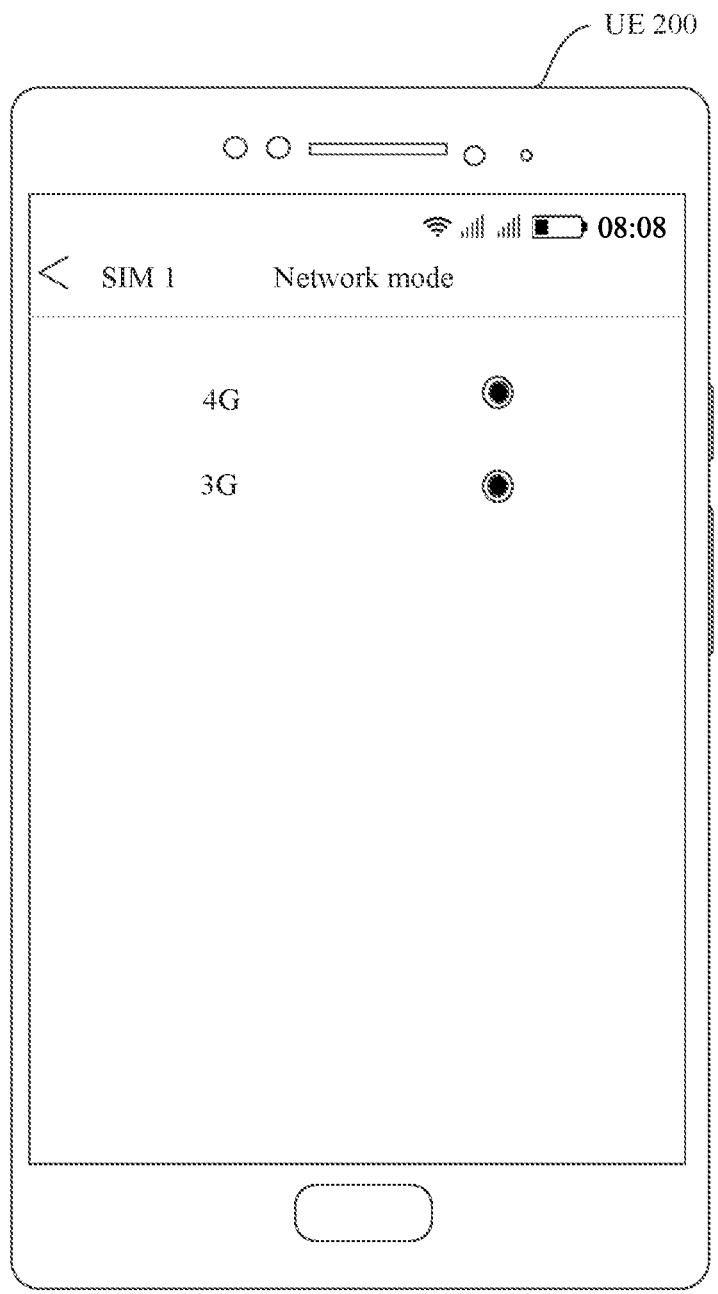
FIG. 15b is a schematic diagram 27 of an instance of a display interface of user equipment according to an embodiment of this application.
Figure 15C:
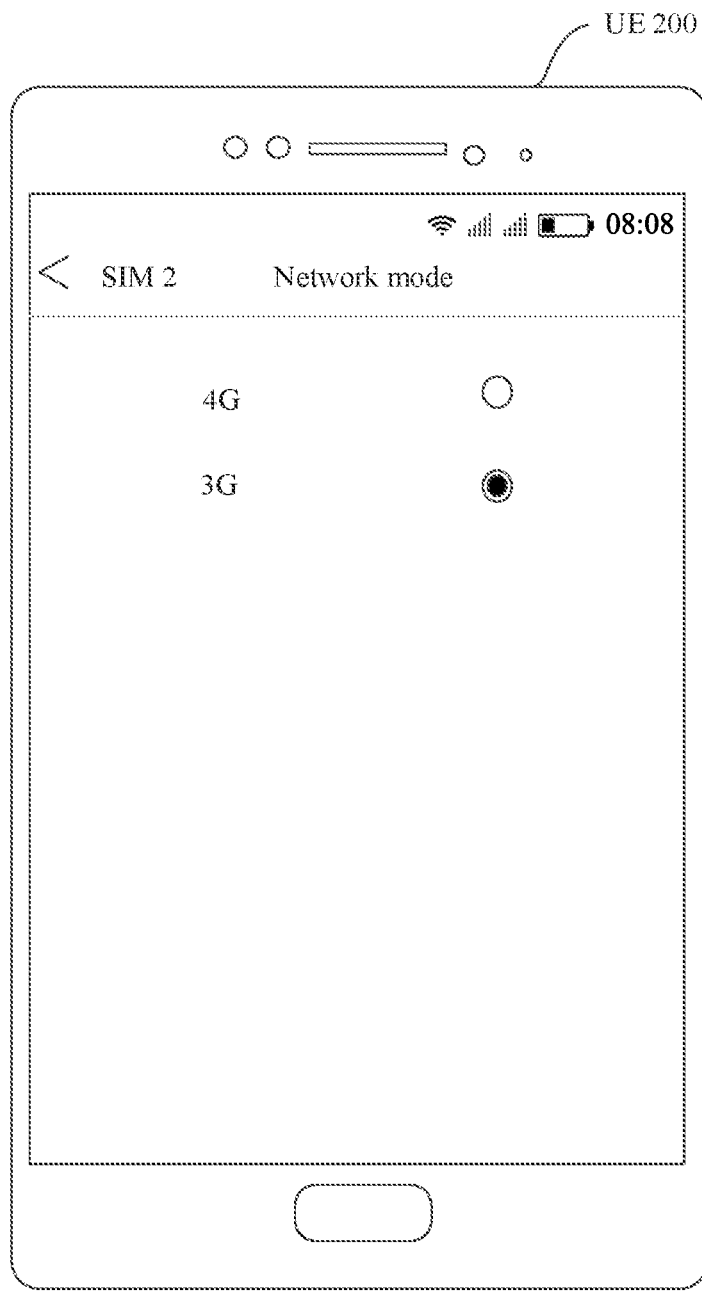
FIG. 15c is a schematic diagram 28 of an instance of a display interface of user equipment according to an embodiment of this application.
Figure 15D:
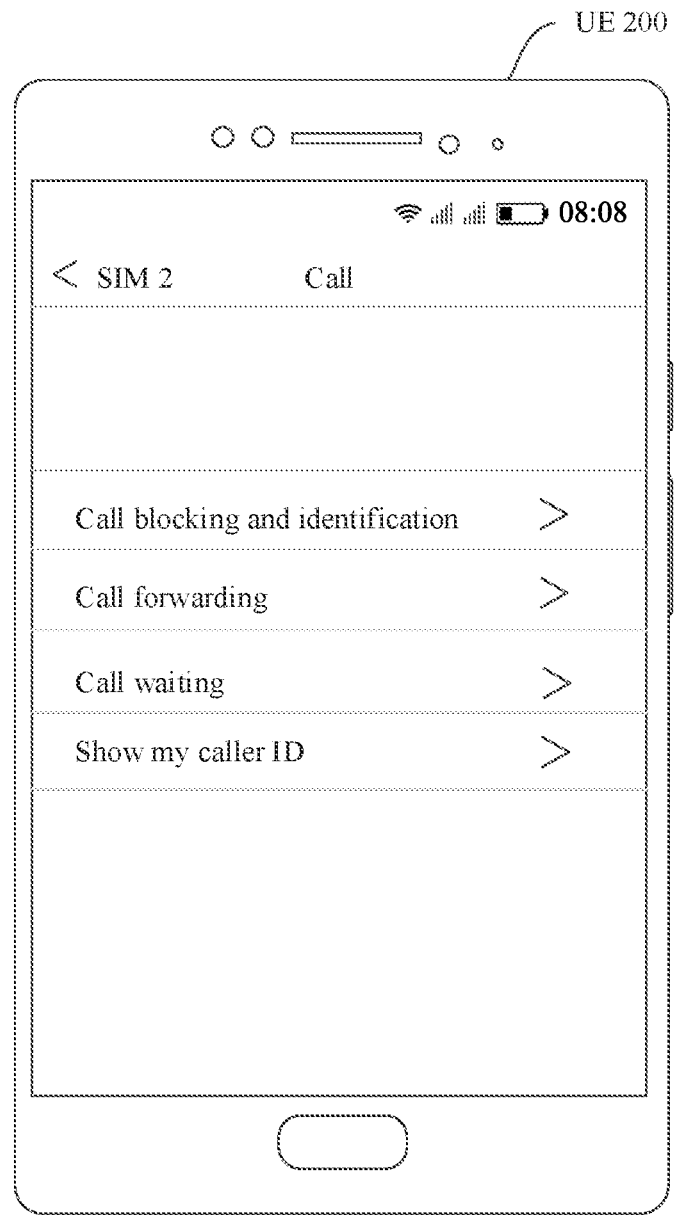
FIG. 15d is a schematic diagram 29 of an instance of a display interface of user equipment according to an embodiment of this application.
Figure 15E:
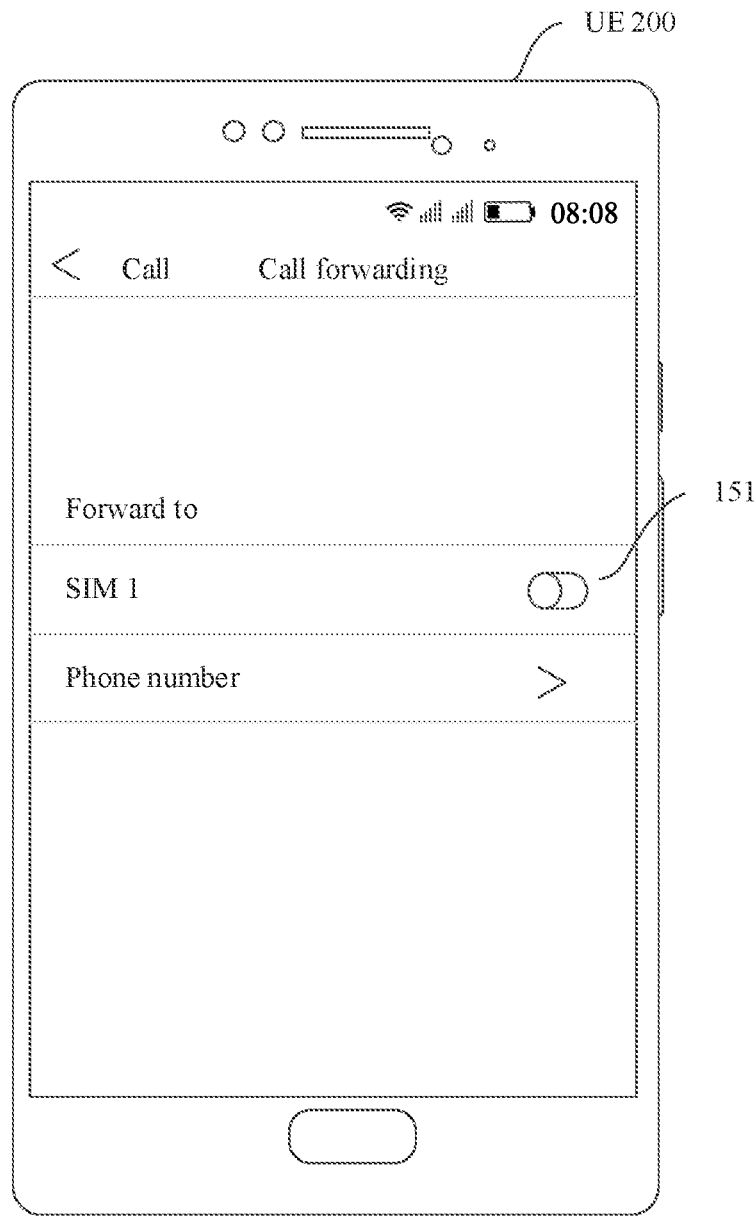
FIG. 15e is a schematic diagram 30 of an instance of a display interface of user equipment according to an embodiment of this application.

For example, call forwarding may be set to forward an incoming call of the card 2 to the card 1, and then the card 2 is powered off. In this way, the circuit switched services of the card 1 and the card 2 are forwarded to the card 1 for processing. For example, the UE displays an interface shown in FIG. 15a. A network mode and a call-related configuration of the card 1 or the card 2 may be set according to a user instruction. For example, the network mode of the card 1 is set according to a user instruction, the UE displays an interface shown in FIG. 15b, and the card 1 is set to support 4G and 3G networks. The network mode of the card 2 is set according to a user instruction, the UE displays an interface shown in FIG. 15c, and the card 2 is set to support a 3G network. A call of the card 2 may be also set according to a user instruction. The UE displays an interface shown in FIG. 15d, enters call forwarding setting according to a user instruction, and displays an interface shown in FIG. 15e. Then, the user may tap a selection button 151 to set call forwarding to the card 1. Then, the UE may power off the card 2 in response to a user operation.

It should be noted that the SIM card is used as an example for description. In an actual application, functions of the SIM card may be implemented by any card or module that has a subscriber identity function. For example, the card or module may be a SIM card used in a global system for mobile communications (Global System for Mobile Communication, GSM) network, a wideband code division multiple access (Wideband Code Division Multiple Access, W-CDMA) network, a time division-synchronous code division multiple access (Time Division-Synchronous Code Division Multiple Access, TD-SCDMA) network, and an LTE network, or may be a compatible module used in an integrated digital enhanced network (Integrated Digital Enhanced Network, IDEN) telephone, or may be a removable user identity module (Removable User Identity Module, RUIM) and a UIM for CDMA2000 and cdmaOne, or may certainly be a virtual SIM card, namely, an eSIM card, an eSIM module, or the like.

In an implementation, the UE includes a call processing module, a blacklist/whitelist identification module, and a baseband chip. The call processing module is configured to process a call-related procedure, and the blacklist/whitelist identification module is configured to manage a call blacklist and a call whitelist. The call processing module and the blacklist/whitelist identification module may be software modules, or may be hardware. For example, the call processing module or the blacklist/whitelist identification module may be a processing unit or a module at the application layer in FIG. 3. For example, the call processing module or the blacklist/whitelist identification module may be implemented by an application program in the memory 209 in FIG. 2. The baseband chip may be a hardware unit in a system on chip of the UE, and is mainly configured to perform signal processing and protocol processing, to implement a function related to mobile communication. For example, the baseband chip may be configured to implement a function related to mobile communication in the processor 110 in FIG. 2.

Figure 16A:
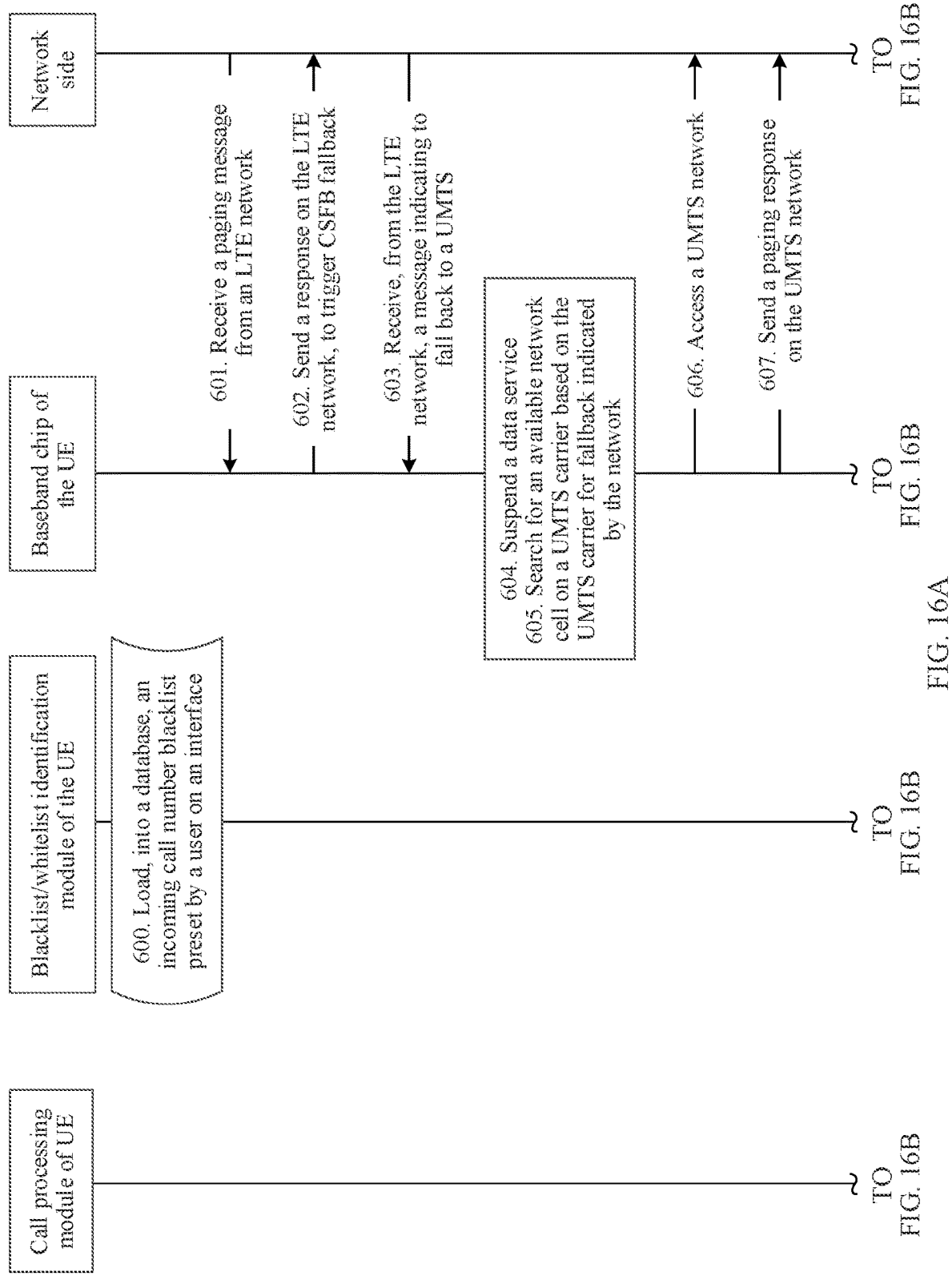
FIG. 16A to FIG. 16C are a schematic diagram 6 of a communications method according to an embodiment of this application.
Figure 16B:
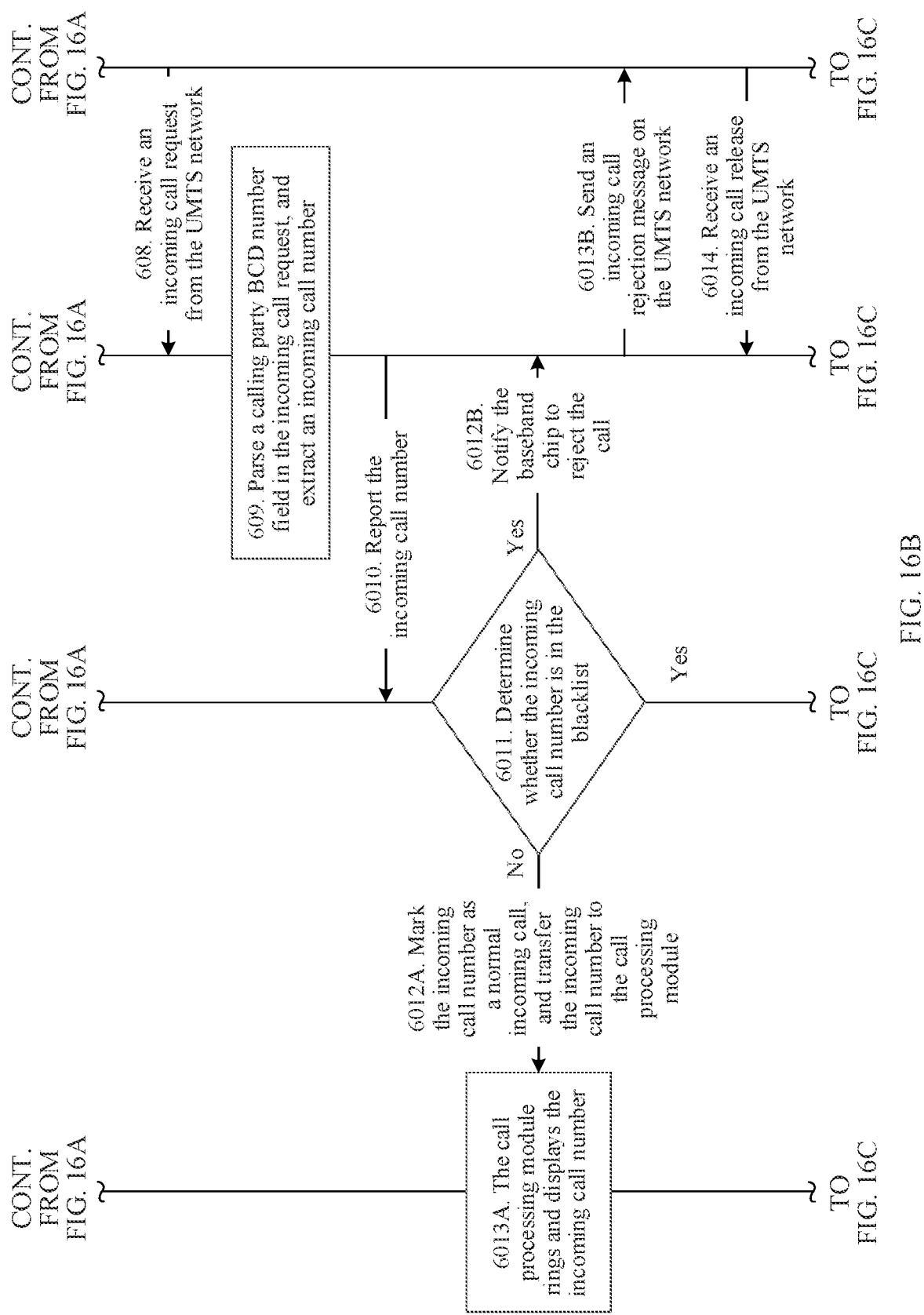
Figure 16C:
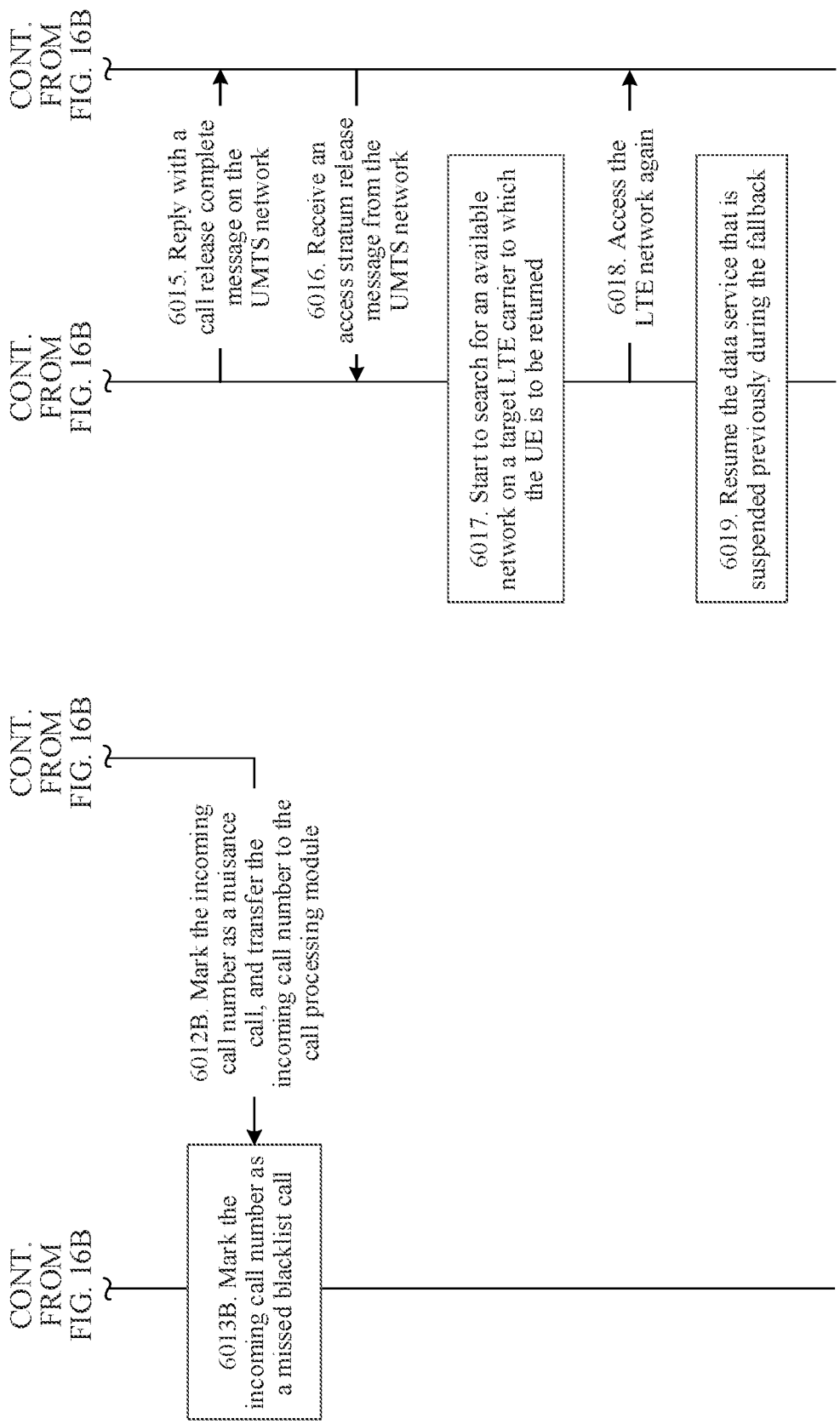

In some embodiments, as shown in FIG. 16A to FIG. 16C, a communications method provided in this embodiment of this application includes the following steps.

600. A blacklist/whitelist identification module loads, into a database, an incoming call blacklist and/or an incoming call whitelist preset by a user through an interface.

601. A baseband chip receives a paging message from an LTE network. For example, the paging message is a circuit switched service notification (CS Service Notification) and includes a CLI field, and the CLI field includes an incoming call number.

602. The baseband chip sends a response on the LTE network, to trigger CSFB fallback. For example, the response message may be an extended service request (Extended Service Request) including third information, and the third information is that the UE accepts the CSFB (CS Fallback Accept by the UE).

603. The baseband chip receives, from the LTE network, a message indicating to fall back to a UMTS. For example, the message indicating to fall back to the UMTS may be an RRC connection release (RRC Connection Release) message, and includes information about a UMTS carrier for fallback.

604. Suspend a data service of the baseband chip.

605. The baseband chip searches for an available network cell on the UMTS carrier based on the UMTS carrier for fallback indicated by the network.

606. UE accesses the UMTS network.

607. The baseband chip sends a paging response on the UMTS network. For example, the paging response may be a paging response.

608. The baseband chip receives an incoming call request from the UMTS network. For example, the incoming call request may be a call setup (Call Setup) request and includes a calling party BCD number field. The calling party BCD number field includes the incoming call number.

609. The baseband chip parses the calling party BCD number field in the incoming call request message and extracts the incoming call number. 6010. The baseband chip reports the incoming call number to the blacklist/whitelist identification module.

6011. The blacklist/whitelist identification module determines whether the incoming call number is in the blacklist.

If the incoming call number is not in the blacklist, 6012A and 6013A are performed. If the incoming call number is in the blacklist, 6012B and 6013B are performed.

6012A. The blacklist/whitelist identification module marks the incoming call number as a normal incoming call, and transfers the incoming call number to the call processing module.

6013A. The call processing module rings and displays the incoming call number. For example, a display interface of the UE displays an incoming call interface shown in FIG. 6-1. Then, an incoming call is answered in response to an operation of tapping an answer key in FIG. 6-1 by the user, or an incoming call is not answered in response to an operation of tapping a reject key in FIG. 6-1 by the user.

6012B. The blacklist/whitelist identification module marks the incoming call number as a nuisance call, and transfers the incoming call number to the call processing module. In addition, the blacklist/whitelist identification module notifies the baseband chip to reject the incoming call.

6013B. The call processing module marks the incoming call number as a missed blacklist incoming call. The baseband chip sends an incoming call rejection message on the UMTS network, and the incoming call rejection message may be a call disconnect (Call Disconnect) message.

6014. The baseband chip receives a call release (Call Release) message from the UMTS network.

6015. The baseband chip replies with a call release complete (Call Release Complete) message on the UMTS network.

6016. The baseband chip receives an access stratum release message from the UMTS network. If the baseband chip receives the access stratum release message on a GSM network, the access stratum release message may be a channel release (Channel Release) message. If the baseband chip receives the access stratum release message on a WCDMA network, the access stratum release message may be an RRC release (RRC Release) message. The access stratum release message includes information about a carrier of the LTE network to which the UE is to be returned.

6017. The baseband chip starts to search for an available network on the target LTE carrier for returning.

6018. The UE accesses the LTE network again.

6019. The baseband chip resumes the data service that is suspended previously during the fallback.

In the method in this embodiment, the UE receives the paging message on the LTE network, then falls back to the UMTS network, and determines, on the UMTS network, whether to answer the incoming call. The data service is suspended during fallback of the UE to the UMTS network.

Figure 17:
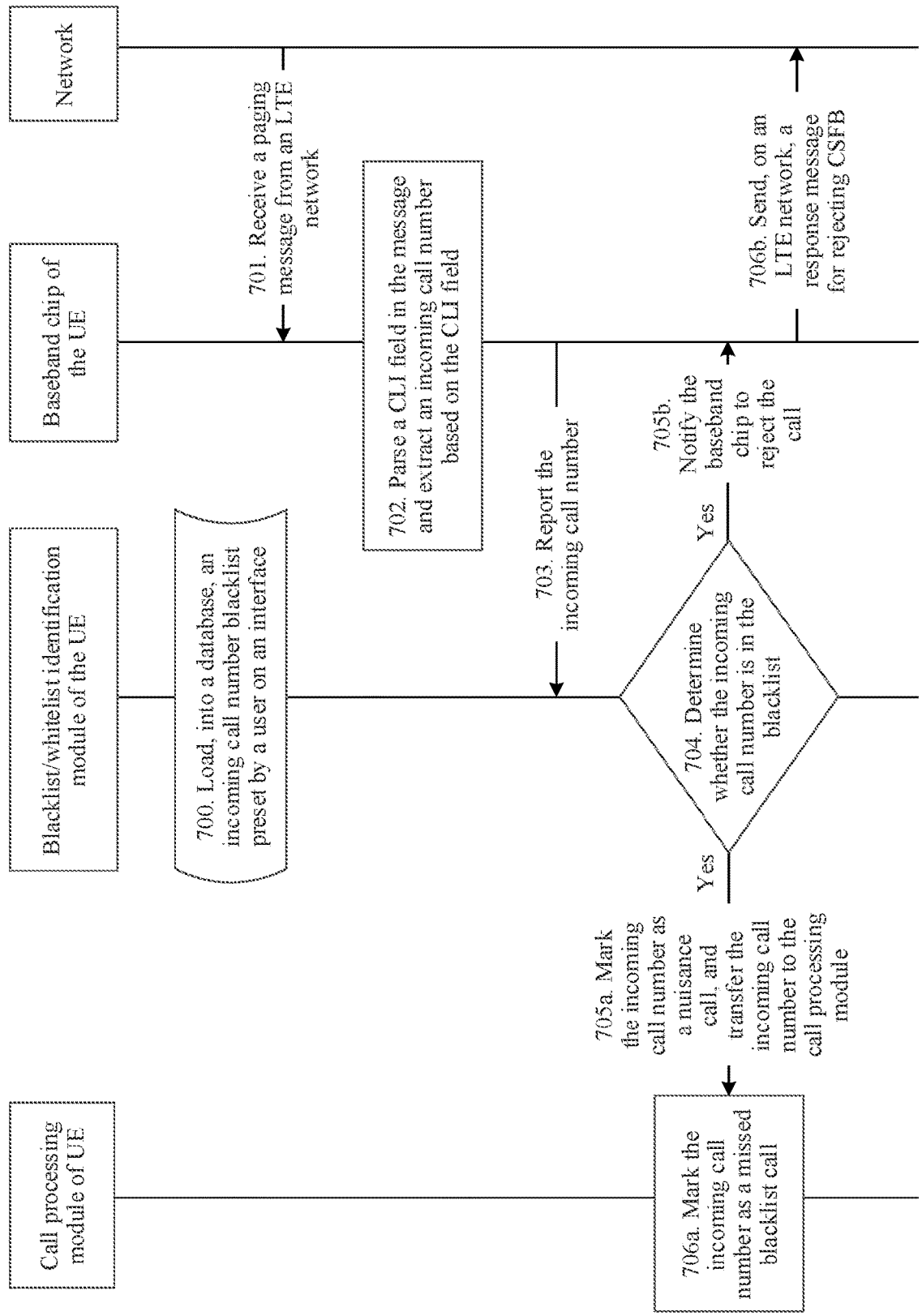
FIG. 17 is a schematic diagram 7 of a communications method according to an embodiment of this application.

In some other embodiments, as shown in FIG. 17, a communications method provided in this embodiment of this application includes the following steps.

700. A blacklist/whitelist identification module loads, into a database, an incoming call blacklist and/or an incoming call whitelist preset by a user through an interface.

701. A baseband chip receives a paging message from an LTE network. For example, the paging message is a circuit switched service notification (CS Service Notification) and includes a CLI field, and the CLI field includes an incoming call number.

702. The baseband chip parses the CLI field in the message and extracts the incoming call number based on the CLI field.

703. The baseband chip reports the incoming call number to the blacklist/whitelist identification module.

704. The blacklist/whitelist identification module determines whether the incoming call number is in the blacklist.

If the blacklist/whitelist identification module determines that the incoming call number is in the blacklist, the following steps are performed.

705a. The blacklist/whitelist identification module marks the incoming call number as a nuisance call, and transfers the incoming call number to the call processing module.

706a. The call processing module marks the incoming call number as a missed blacklist incoming call.

705b. The blacklist/whitelist identification module notifies the baseband chip to reject the incoming call.

706b. The baseband chip sends, on an LTE network, a response message for rejecting CSFB. For example, the response message may be an extended service request (Extended Service Request), the extended service request includes second information, and the second information is that the UE rejects the CSFB (CS Fallback Rejected by the UE).

In the method in this embodiment, after receiving the paging message on the LTE network, the UE parses the incoming call number in the message. If the incoming call number belongs to the blacklist, the UE directly replies, on the LTE network to the network, that the incoming call is rejected. This avoids network fallback, and a data service is not interrupted.

Figure 18A:
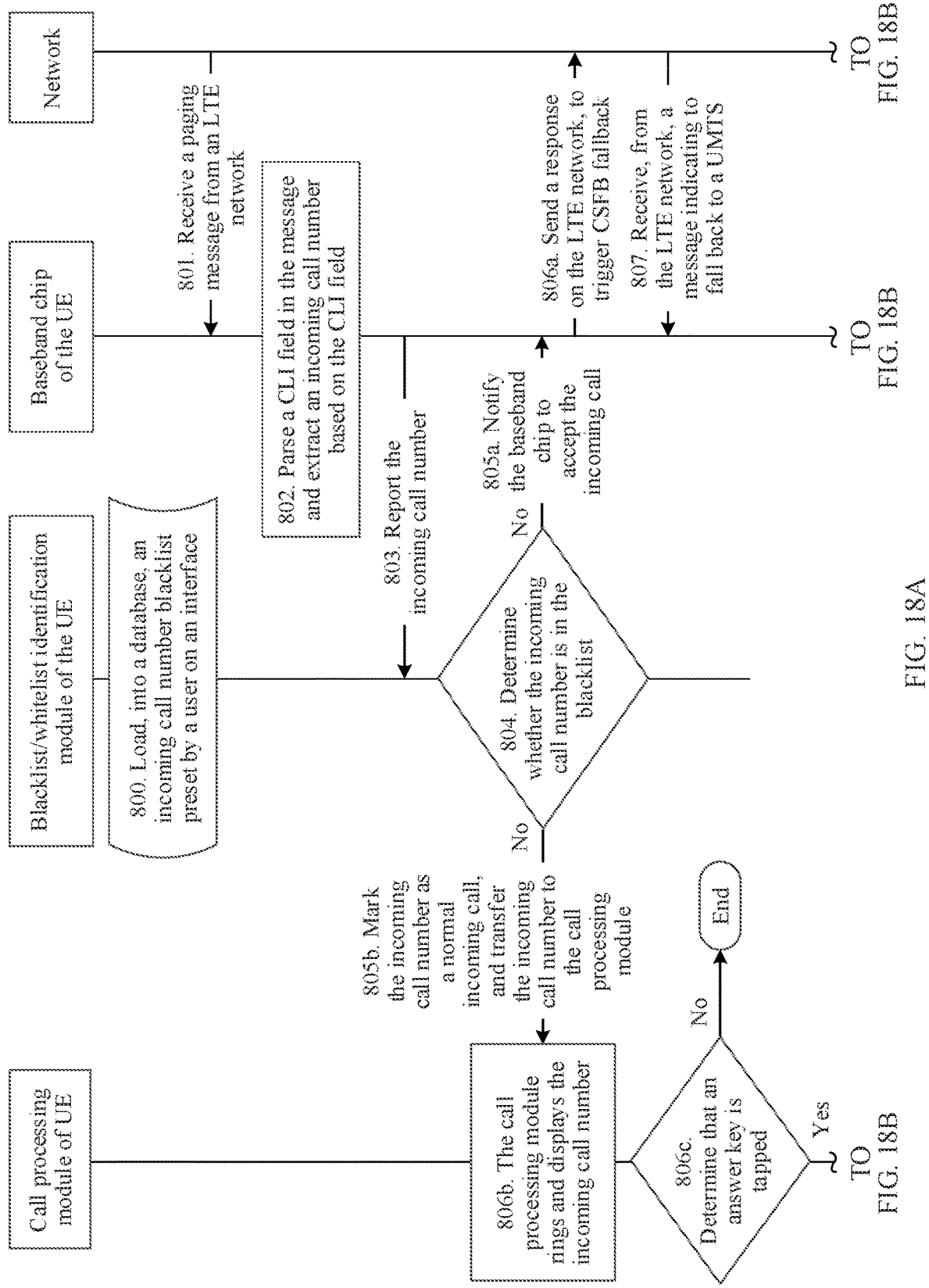
FIG. 18A and FIG. 18B are a schematic diagram 8 of a communications method according to an embodiment of this application.
Figure 18B:
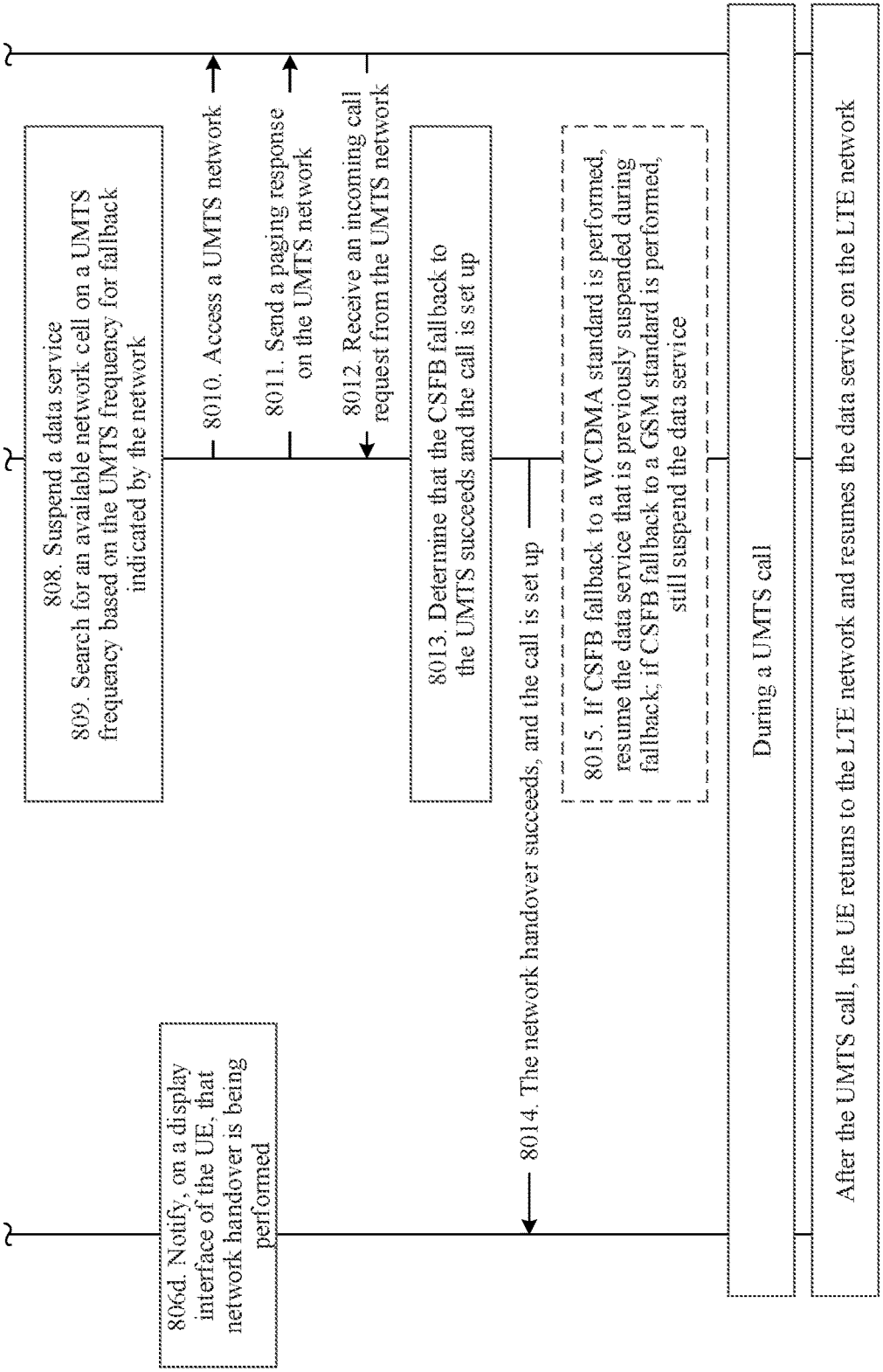

In some other embodiments, as shown in FIG. 18A and FIG. 18B, a communications method provided in this embodiment of this application includes the following steps.

800. A blacklist/whitelist identification module loads, into a database, an incoming call blacklist and/or an incoming call whitelist preset by a user through an interface.

801. A baseband chip receives a paging message from an LTE network. For example, the paging message is a circuit switched service notification (CS Service Notification) and includes a CLI field, and the CLI field includes an incoming call number.

802. The baseband chip parses the CLI field in the message and extracts the incoming call number based on the CLI field.

803. The baseband chip reports the incoming call number to the blacklist/whitelist identification module.

804. The blacklist/whitelist identification module determines whether the incoming call number is in the blacklist.

If the blacklist/whitelist identification module determines that the incoming call number is not in the blacklist, the following steps are performed.

805a. The blacklist/whitelist identification module notifies the baseband chip to accept the incoming call.

805b. The blacklist/whitelist identification module marks the incoming call number as a normal incoming call, and transfers the incoming call number to the call processing module.

806a. The baseband chip sends a response on the LTE network, to trigger CSFB fallback. For example, the response message may be an extended service request (Extended Service Request) including third information, and the third information is that the UE accepts the CSFB (CS Fallback Accept by the UE).

806b. The call processing module rings and displays the incoming call number. For example, a display interface of the UE displays an incoming call interface shown in FIG. 6-1. The incoming call interface includes an answer key and a reject key. A tap operation of the user is determined.

806c. The call processing module determines whether the tap operation of the user is tapping the answer key.

If it is determined that the tap operation of the user is tapping the answer key, 806d is performed. If it is determined that the tap operation of the user is not tapping the answer key, the process ends.

806d. The call processing module notifies, on the display interface of the UE, that network handover is being performed.

In response to the user operation of tapping the answer key, prompt information that network handover is performing is displayed on the display interface of the UE. For example, an interface shown in FIG. 6-1-1 is displayed on the display interface of the UE, and the interface includes first prompt information 602 "The mobile phone is performing network handover!".

807. The baseband chip receives, from the LTE network, a message indicating to fall back to a UMTS. For example, the message indicating to fall back to the UMTS may be an RRC connection release (RRC Connection Release) message, and includes information about a UMTS carrier for fallback (redirectedCarrierInfo).

808. Suspend a data service of the baseband chip.

809. The baseband chip searches for an available network cell on the UMTS carrier based on the UMTS carrier for fallback indicated by the network.

8010. UE accesses the UMTS network.

8011. The baseband chip sends a paging response on the UMTS network. For example, the paging response may be a paging response.

8012. The baseband chip receives an incoming call request from the UMTS network. For example, the incoming call request may be a call setup (Call Setup) request and includes a calling party BCD number field. The calling party BCD number field includes the incoming call number.

8013. The baseband chip determines that the CSFB fallback to the UMTS network succeeds and the call is set up.

8014. The baseband chip notifies the call processing module that the network handover succeeds and the call is set up.

8015. If CSFB fallback to a WCDMA standard is performed, resume the data service that is previously suspended during fallback. If CSFB fallback to a GSM standard is performed, still suspend the data service.

After the call ends in the UMTS, the UE returns to the LTE network and resumes the data service on the LTE network.

It should be noted that, in this embodiment, in an implementation, the blacklist/whitelist identification module performs 805a and 805b at the same time. In another implementation, the blacklist/whitelist identification module first transfers the incoming call number to the call processing module in 805b, after the call processing module determines that the tapping operation of the user is tapping the answer key in 806c, the blacklist/whitelist identification module performs 805a to notify the baseband chip to accept the incoming call. In some embodiments, the call processing module may alternatively notify the baseband chip to accept the incoming call.

In the method in this embodiment, in a process in which the network switches from the LTE standard to the UMTS standard, the UE may not respond to the tap operation of the user on the display interface. After the network is switched to the UMTS standard, an incoming call may be answered or rejected in response to the user operation.

Figure 19A:
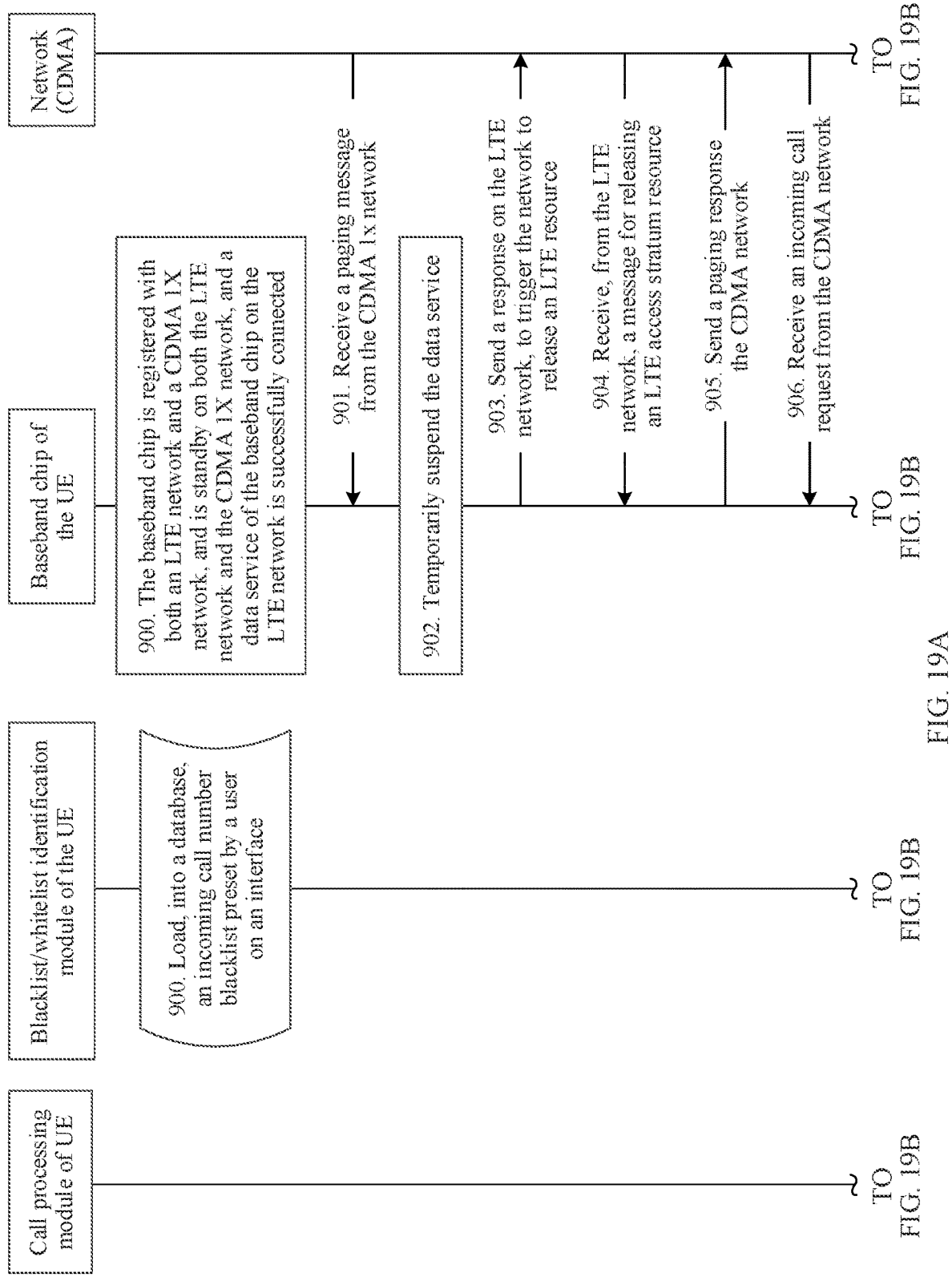
FIG. 19A and FIG. 19B are a schematic diagram 9 of a communications method according to an embodiment of this application.
Figure 19B:
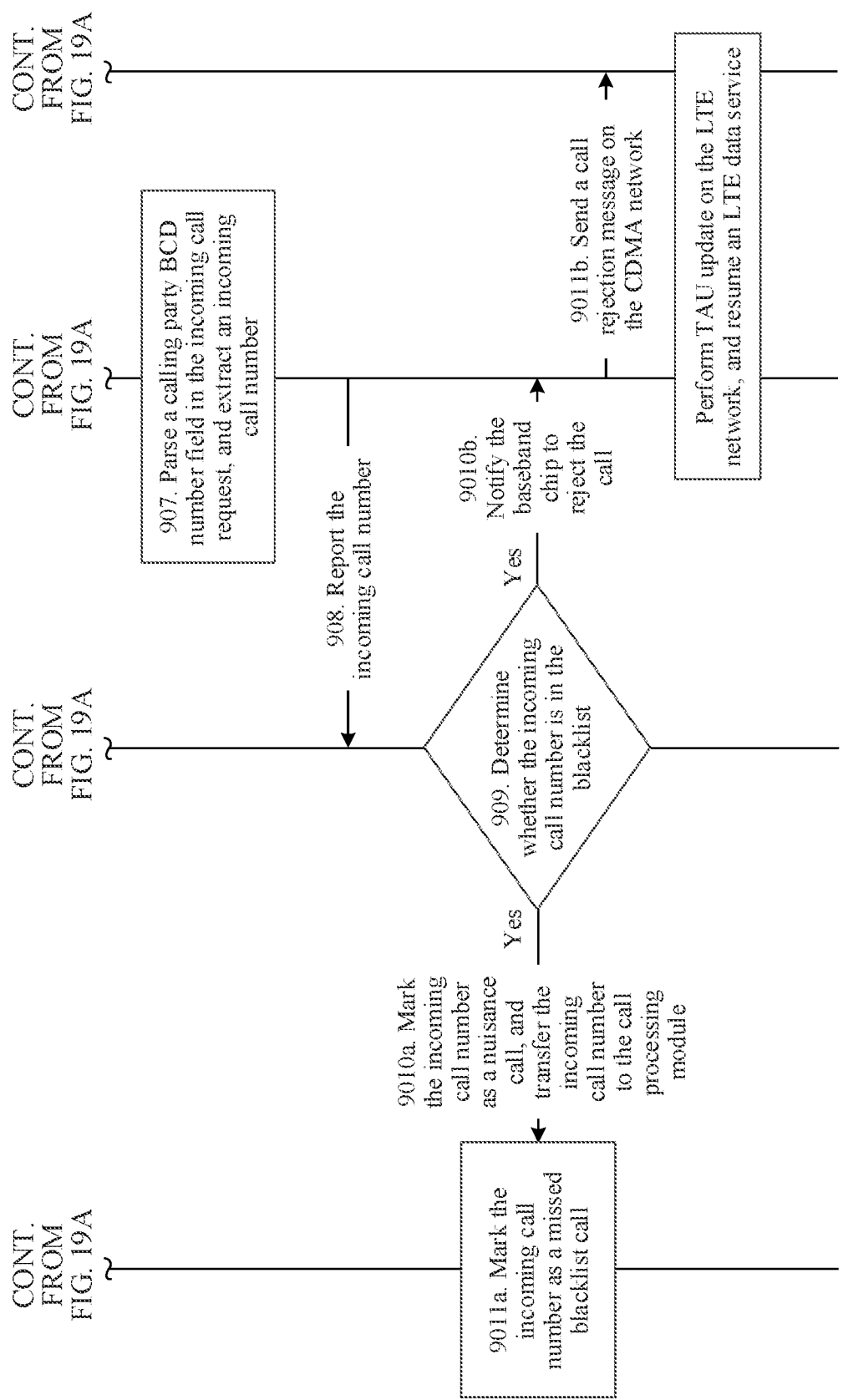

In some other embodiments, as shown in FIG. 19A and FIG. 19B, a communications method provided in this embodiment of this application includes the following steps.

900. A blacklist/whitelist identification module loads, into a database, an incoming call blacklist and/or an incoming call whitelist preset by a user through an interface. A baseband chip is registered with both an LTE network and a CDMA network, and is standby state on both the LTE network and the CDMA network (that is, UE supporting a CDMA standard uses a single-card dual-standby solution), and a data service of the baseband chip on the LTE network is successfully connected.

901. The baseband chip receives a paging message from the CDMA network. For example, the paging message may be a general page (General Page) message, and the general page message does not include an incoming call number. It should be noted that the general page message may alternatively include the incoming call number. In this case, a process similar to that in FIG. 18A and FIG. 18B is performed in this embodiment, and the data service may not be suspended.

902. The baseband chip temporarily suspends the data service.

903. The baseband chip sends a response message on the LTE network, to trigger the network to release an LTE resource. For example, the response message may be an extended service request (Extended Service Request) including third information, and the third information is that the UE accepts the CSFB (CS Fallback Accept by the UE).

904. The baseband chip receives, from the LTE network, a message for releasing an LTE access stratum resource. For example, the message for releasing an LTE access stratum resource may be an RRC connection release (RRC Connection Release) message. Different from the RRC connection release message in 807 in FIG. 18A and FIG. 18B, the RRC connection release message in 904 does not include information about a UMTS carrier for fallback.

905. The baseband chip sends a paging response on the CDMA network. For example, the paging response may be a page response (Page Response).

906. The baseband chip receives an incoming call request from the CDMA network. For example, the incoming call request message may be an alert message (Alert With Information) and includes a calling party BCD number field, and the calling party BCD number field includes the incoming call number.

907. The baseband chip parses the calling party BCD number field in the incoming call request message and extracts the incoming call number.

908. The baseband chip reports the incoming call number to the blacklist/whitelist identification module.

909. The blacklist/whitelist identification module determines whether the incoming call number is in the blacklist.

If the incoming call number is in the blacklist, the following steps are performed.

9010a. The blacklist/whitelist identification module marks the incoming call number as a nuisance call, and transfers the incoming call number to the call processing module.

9010b. The blacklist/whitelist identification module notifies the baseband chip to reject the incoming call.

9011a. The call processing module marks the incoming call number as a missed blacklist incoming call.

9011b. The baseband chip sends an incoming call rejection message on the CDMA network. For example, the incoming call rejection message may be an order (order), including disconnect (disconnect) information.

Then, the UE performs tracking area update (Tracking Area Update, TAU) on the LTE network, and resumes an LTE data service.

In the method of this embodiment, the UE supporting the CDMA standard uses the single-card dual-standby solution, but can use only one standard of the CDMA network and the LTE network to perform receiving and sending through a radio frequency antenna. In the CDMA, concurrency of a voice service and a data service is not supported, the data service is unavailable during a call, and the UE is in a network disconnected state. After the call ends, a connection between the UE and the LTE network can be recovered.

The foregoing mainly describes the solutions provided in the embodiments of this application from a perspective of the UE. It can be understood that, to implement the foregoing functions, the UE includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the UE may be divided into function modules based on the foregoing method examples. For example, each function module may be obtained through division based on each corresponding function, or two or more functions may be integrated into one processing module. The integrated module may be implemented in the form of hardware, or may be implemented in the form of a software function module. It should be noted that, in the embodiments of this application, division into the modules is used as an example, and is merely logical function division. In an actual implementation, another division manner may be used. An example in which function modules are obtained through division based on functions is used below for description.

Figure 11B:
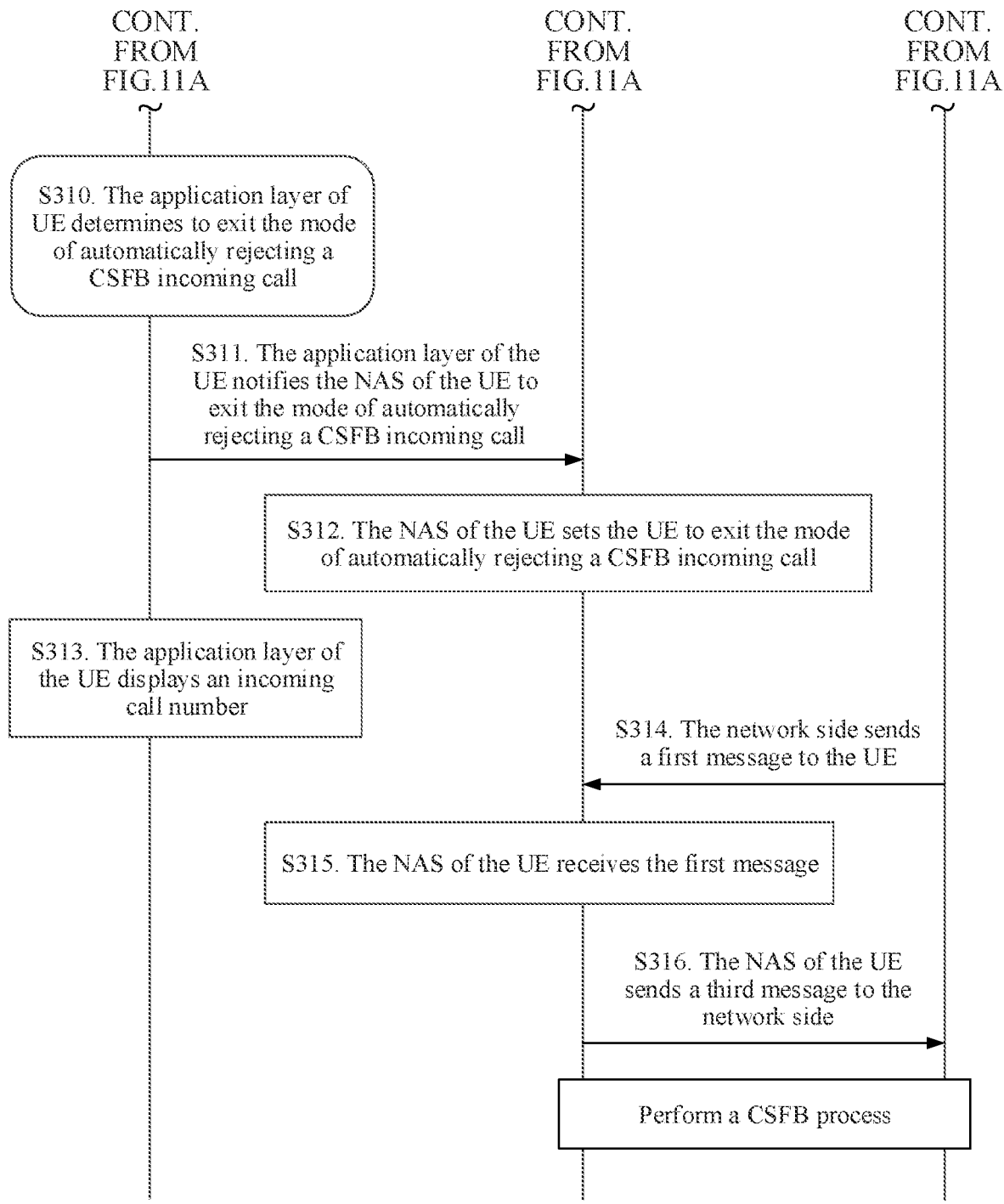
Figure 20:
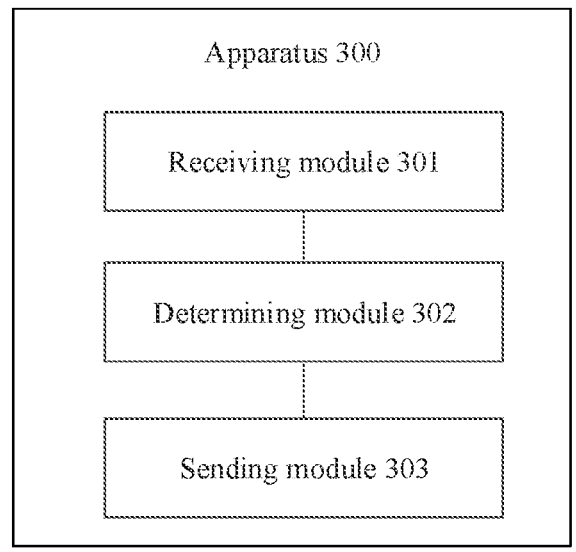
FIG. 20 is a schematic structural diagram 1 of a communications apparatus according to an embodiment of this application.

FIG. 20 is a schematic diagram of a logical structure of an apparatus 300 according to an embodiment of this application. The apparatus 300 may be user equipment, and can implement a function of the user equipment in the method provided in the embodiments of this application. The apparatus 300 may alternatively be an apparatus that can support user equipment in implementing a function of the user equipment in the method provided in the embodiments of this application. The apparatus 300 may be a hardware structure, a software module, or a combination of the hardware structure and the software module. The apparatus 300 may be implemented by a chip system. In this embodiment of this application, the chip system may include a chip, or may include a chip and another discrete component. As shown in FIG. 20, the apparatus 300 includes a receiving module 301, a determining module 302, and a sending module 303. The receiving module 301 may be configured to perform S102 in FIG. 5, or S202 and S204 in FIG. 10, or S305. S309, and S315 in FIG. 11A and FIG. 11B, and/or perform other steps described in this application. The determining module 302 may be configured to perform S103 in FIG. 5, or S202 in FIG. 10, or S301 and S310 in FIG. 11A and FIG. 11B, and/or perform other steps described in this application. The sending module 303 may be configured to perform S105 in FIG. 5, or S203, S205. S206, S207, and S208 in FIG. 10, or S302, S306. S308, S311, and S316 in FIG. 11A and FIG. 11B, and/or perform other steps described in this application. Details are not described herein again. The receiving module may also be referred to as a receiving unit or another name, the determining module may also be referred to as a determining unit or another name, and the sending module may also be referred to as a sending unit or another name.

Figure 21:
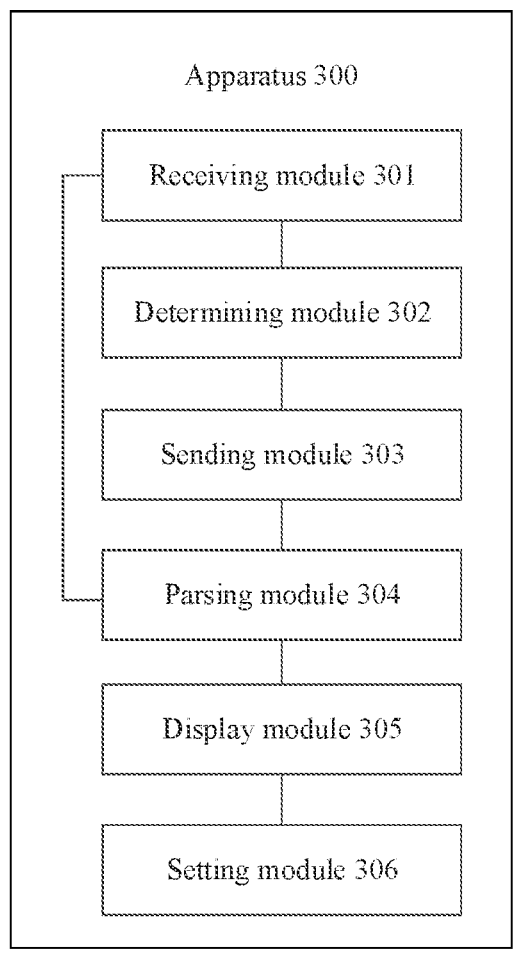
FIG. 21 is a schematic structural diagram 2 of a communications apparatus according to an embodiment of this application.

With reference to FIG. 20, as shown in FIG. 21, the apparatus 300 may further include a parsing module 304. The parsing module 304 may be configured to perform S102 in FIG. 5, or S202 in FIG. 10, or S307 in FIG. 11A and FIG. 11B, and/or perform other steps described in this application.

The apparatus 300 may further include a display module 305. The display module 305 may be configured to perform S106, or S313 in FIG. 11A and FIG. 11B, and/or other steps described in this application.

The apparatus 300 may further include a setting module 306. The setting module 306 may be configured to perform S103 in FIG. 5, or S303 and S312 in FIG. 11A and FIG. 11B, and/or perform other steps described in this application.

All related content of the steps in the foregoing method embodiments may be cited in function descriptions of corresponding function modules. Details are not described herein again.

In this embodiment, the apparatus 300 may be presented in the form of function modules obtained through division in an integrated manner. The "module" herein may be a specific ASIC, a circuit, a processor executing one or more software or firmware programs, a storage device, an integrated logic circuit, and/or another component that can provide the foregoing functions.

Figure 22:
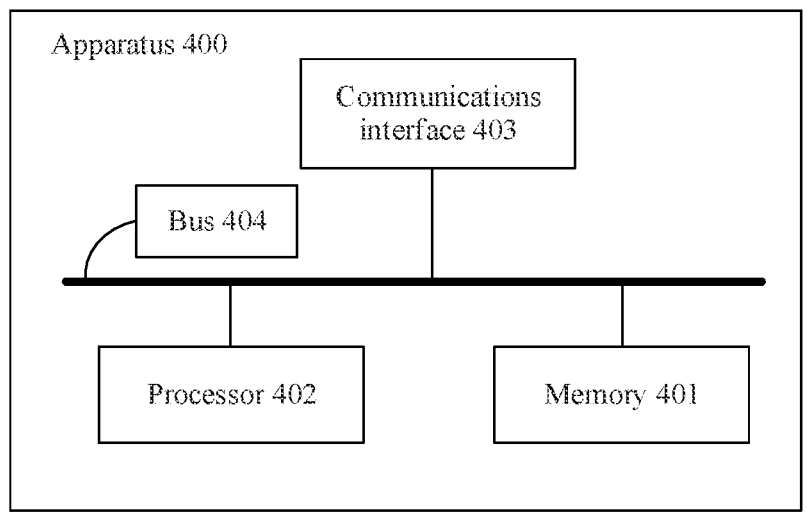
FIG. 22 is a schematic structural diagram 3 of a communications apparatus according to an embodiment of this application.

In a simple embodiment, the apparatus 300 may be in a form shown in FIG. 22.

As shown in FIG. 22, an apparatus 400 may include a memory 401, a processor 402, and a communications interface 403. The memory 401 is configured to store an instruction; and when the apparatus 400 runs, the processor 402 executes the instruction stored in the memory 401, so that the apparatus 400 is enabled to perform the communications method provided in the embodiments of this application. The memory 401, the processor 402, and the communications interface 403 are connected through a bus 404. For a specific communications method, refer to the foregoing descriptions and related descriptions in the accompanying drawings. Details are not described herein again. It should be noted that, in a specific implementation process, the apparatus 400 may further include other hardware components, which are not enumerated one by one in this specification. In a possible implementation, the memory 401 may be included in the processor 402.

In a possible implementation, the apparatus 400 may be implemented in a form shown in FIG. 2. For example, the memory 401 may be implemented by the memory 209 in FIG. 2, the processor 402 may be implemented by the processor 210 in FIG. 2, and the communications interface 403 may be implemented by the radio frequency unit 201 in FIG. 2.

In a possible implementation, the determining module 302 in FIG. 20 and FIG. 21 may be implemented by the processor 402 in FIG. 22 or the processor 210 in FIG. 2. The receiving module 301 and the sending module 303 in FIG. 20 and FIG. 21 may be implemented by the communications interface 403 in FIG. 22 or the radio frequency unit 201 in FIG. 2. The parsing module 304 in FIG. 21 may be implemented by the processor 402 in FIG. 22 or the processor 210 in FIG. 2. The display module 305 in FIG. 21 may be implemented by the display unit 206 in FIG. 2. The setting module 306 in FIG. 21 may be implemented by the processor 402 in FIG. 22 or the processor 210 in FIG. 2.

The communications interface 403 may be a circuit, a component, an interface, a bus, a software module, a transceiver, or any other apparatus that can implement communication. The processor 402 may be a field-programmable gate array (Field-Programmable Gate Array, FPGA), an application specific integrated chip (Application Specific Integrated Circuit, ASIC), a system on chip (System on Chip, SoC), a central processing unit (Central Processor Unit, CPU), a network processor (Network Processor, NP), a digital signal processor (Digital Signal Processor, DSP), a micro controller unit (Micro Controller Unit, MCU), or a programmable logic device (Programmable Logic Device, PLD) or another integrated chip. The memory 401 includes a volatile memory (Volatile Memory), for example, a random-access memory (Random-Access Memory, RAM). The memory may alternatively include a non-volatile memory (Non-Volatile Memory), for example, a flash memory (Flash Memory), a hard disk drive (Hard Disk Drive, HDD), or a solid-state drive (Solid-State Drive, SSD). The memory may alternatively include a combination of the foregoing types of memories. The memory may alternatively include any other apparatus having a storage function, for example, a circuit, a device, or a software module.

The apparatus provided in this embodiment of this application may be configured to perform the foregoing communications methods. Therefore, for technical effects that can be obtained by the apparatus, refer to the foregoing method embodiments. Details are not described herein again.

A person of ordinary skill in the art may understand that all or some of the steps of the foregoing methods may be implemented by a program instructing related hardware. The program may be stored in a computer readable storage medium. The storage medium includes a ROM, a RAM, and an optical disc.

An embodiment of this application further provides a storage medium. The storage medium may include a memory 401.

For explanations and beneficial effects of related content in any one of the foregoing provided apparatuses, refer to the corresponding method embodiment provided above. Details are not described herein again.

All or some of the foregoing embodiments may be implemented by using software, hardware, firmware, or any combination thereof. When a software program is used to implement the embodiments, the embodiments may be implemented completely or partially in the form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, a network device, user equipment, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc. DVD)), a semiconductor medium (for example, a solid-state drive (Solid State Disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clearly that various modifications and combinations may be made to them without departing from the spirit and scope of this application. Correspondingly, the specification and accompanying drawings are merely example description of this application defined by the appended claims, and is considered as any of or all modifications, variations, combinations, or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communications method, implemented by a user equipment (UE), wherein the communications method comprises:
   receiving a first message from a network side, wherein the first message requests the UE to perform circuit switched fallback (CSFB) as a called party, wherein the first message comprises first information, wherein the first information indicates an incoming call number, and wherein the first message is received from the network side through a non-access stratum of the UE;
   parsing the first message through the non-access stratum of the UE to obtain the first information;
   reporting the first information to an application layer of the UE; and
   sending a second message to the network side when a preset condition is met,
   wherein the second message indicates that the CSFB is rejected, and
   wherein the preset condition comprises at least one of the incoming call number is restricted or the UE is in a mode of automatically rejecting a CSFB incoming call.

2. The communications method of claim 1, wherein the preset condition comprises the incoming call number being restricted, and wherein the communications method further comprises receiving an indication that the incoming call is restricted from the application layer.

3. The communications method of claim 1, wherein the incoming call number is restricted when the incoming call number belongs to a preset incoming call blacklist or the incoming call number does not belong to a preset incoming call whitelist.

4. The communications method of claim 1, further comprising displaying the incoming call number when the preset condition is that the UE is in the mode and the UE exits the mode.

5. The communications method of claim 1, further comprising:
   setting the UE to be in the mode in response to an instruction from a user, wherein the instruction instructs the UE to be in the mode; or
   setting the UE to be in the mode in response to determining that the UE has a real-time packet switched data service.

6. The communications method of claim 5, wherein the real-time packet switched data service comprises a real-time game service or a network live broadcast service.

7. The communications method of claim 1, wherein the first message comprises a circuit switched service notification.

8. The communications method of claim 1, wherein the first information comprises a calling line identification field, and wherein the calling line identification field comprises a number type, a number display type, and the incoming call number.

9. A communications apparatus, comprising:
   a receiver configured to receive a first message from a network side, wherein the first message indicates to a user equipment (UE) to perform circuit switched fallback (CSFB) as a called party, wherein the first message comprises first information, wherein the first information indicates an incoming call number, and wherein the first message is received from the network side through a non-access stratum of the UE;
   a parser configured to parse the first message through the non-access stratum of the UE to obtain the first information;
   a processor coupled to the parser and the receiver and configured to determine whether a preset condition is met, wherein the preset condition comprises at least one of the incoming call number is restricted or the UE is in a mode of automatically rejecting a CSFB incoming call; and
   a transmitter coupled to the processor and configured to:
      send a second message to the network side when the preset condition is met, wherein the second message indicates that the CSFB is rejected; and
      report the first information from the non-access stratum of the UE to an application layer of the UE.

10. The communications apparatus of claim 9, wherein the preset condition comprises the incoming call number being restricted, and wherein the receiver is further configured to receive an indication that the incoming call is restricted from the application layer.

11. The communications apparatus of claim 9, wherein the incoming call number is restricted when the incoming call number belongs to a preset incoming call blacklist or the incoming call number does not belong to a preset incoming call whitelist.

12. The communications apparatus of claim 9, wherein when the preset condition is that the UE is in the mode, the processor is further configured to determine whether the UE exits the mode, and wherein the communications apparatus further comprises a display coupled to the processor and configured to display the incoming call number when the UE exits the mode.

13. The communications apparatus of claim 9, wherein the communications apparatus further comprises a setter coupled to the processor, wherein the receiver is further configured to receive an instruction entered by a user, wherein the instruction instructs the setter to set the UE to be in the mode, wherein the processor is further configured to determine whether the UE has a real-time packet switched data service, and wherein the setter is configured to either set, according to the instruction, the UE to be in the mode or set the UE to be in the mode when the processor determines that the UE has the real-time packet switched data service.

14. The communications apparatus of claim 13, wherein the real-time packet switched data service comprises a real-time game service or a network live broadcast service.

15. The communications apparatus of claim 9, wherein the first message comprises a circuit switched service notification.

16. The communications apparatus of claim 9, wherein the first information comprises a calling line identification field, and wherein the calling line identification field comprises a number type, a number display type, and the incoming call number.

17. A chip, comprising:
one or more processors; and
memory storing one or more programs and a first software application, wherein the one or more programs are configured to be executed by the one or more processors, and wherein the one or more programs include instructions for:
receiving, by user equipment (UE), a first message from a network side, wherein the first message requests the UE to perform circuit switched fallback (CSFB) as a called party, wherein the first message comprises first information, wherein the first information indicates an incoming call number, and wherein the first message is received from the network side through a non-access stratum of the UE;
parsing the first message through the non-access stratum of the UE to obtain the first information;
reporting the first information to an application layer of the UE; and
sending a second message to the network side when a preset condition is met, wherein the second message indicates that the CSFB is rejected, and wherein the preset condition comprises at least one of the incoming call number is restricted or the UE is in a mode of automatically rejecting a CSFB incoming call.

18. The chip of claim 17, wherein the preset condition comprises the incoming call number being restricted, and wherein the one or more programs include instructions for receiving an indication that the incoming call is restricted from the application layer.

19. The chip of claim 17, wherein the incoming call number is restricted when the incoming call number belongs to a preset incoming call blacklist or the incoming call number does not belong to a preset incoming call whitelist.

20. The chip of claim 17, wherein the one or more programs include instructions for displaying the incoming call number when the preset condition is that the UE is in the mode and the UE exits the mode.

* * * * *